(12) United States Patent
Lee et al.

(10) Patent No.: US 10,877,588 B2
(45) Date of Patent: Dec. 29, 2020

(54) ELECTRONIC APPARATUS COMPRISING FORCE SENSOR AND METHOD FOR CONTROLLING ELECTRONIC APPARATUS THEREOF

(71) Applicant: Samsung Electronics Co., Ltd., Suwon-si (KR)

(72) Inventors: Jong Moo Lee, Seoul (KR); Seung Min Choi, Seongnam-si (KR); Jung Hoon Choi, Suwon-si (KR); Hyung Sup Byeon, Suwon-si (KR); Jae Hwan Lee, Yongin-si (KR); Jae Bong Chun, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/054,410

(22) Filed: Aug. 3, 2018

(65) Prior Publication Data
US 2019/0042045 A1 Feb. 7, 2019

(30) Foreign Application Priority Data
Aug. 3, 2017 (KR) .................. 10-2017-0098580

(51) Int. Cl.
*G06F 3/041* (2006.01)
*G06F 1/16* (2006.01)
(Continued)

(52) U.S. Cl.
CPC .......... *G06F 3/0414* (2013.01); *G06F 1/1643* (2013.01); *G06F 1/1652* (2013.01);
(Continued)

(58) Field of Classification Search
CPC ...... G06F 3/0414; G06F 3/0416; G06F 3/016; G06F 1/1643; G06F 1/1652;
(Continued)

(56) References Cited

U.S. PATENT DOCUMENTS 7,088,342 B2 * 8/2006 Rekimoto ............. G06F 1/1626
345/169
7,800,592 B2 9/2010 Kerr et al.
(Continued)

FOREIGN PATENT DOCUMENTS

EP 2 282 256 A1 2/2011
KR 10-2007-0116065 A 12/2007
(Continued)

OTHER PUBLICATIONS

International Search Report dated Nov. 12, 2018 for related International Appln. No. PCT/KR2018/008837.
(Continued)

*Primary Examiner* — Grant Sitta
(74) *Attorney, Agent, or Firm* — Jefferson IP Law, LLP

(57) ABSTRACT

An electronic apparatus is provided. The electronic apparatus includes a housing including a first plate facing a first direction and a second plate facing a second direction opposite to the first direction, a display exposed through the first plate, a first force sensor disposed inside the housing and disposed under the display, a second force sensor physically spaced apart from the first force sensor and adjacent to the second plate, a processor positioned inside the housing and electrically connected to the display, the first force sensor, and the second force sensor, and a memory electrically connected to the processor and positioned inside the housing.

21 Claims, 39 Drawing Sheets

(51) Int. Cl.
  *G06F 3/0481* (2013.01)
  *G06F 3/01* (2006.01)
  *G06F 3/0488* (2013.01)

(52) U.S. Cl.
  CPC ............ *G06F 3/016* (2013.01); *G06F 3/0416* (2013.01); *G06F 3/04817* (2013.01); *G06F 3/0488* (2013.01); *G06F 2203/04806* (2013.01)

(58) Field of Classification Search
  CPC ....... G06F 3/04817; G06F 2203/04806; G06F 3/0488; G06F 1/1616
  See application file for complete search history.

(56) References Cited

U.S. PATENT DOCUMENTS

| | | | | |
|---|---|---|---|---|
| 8,259,083 B2* | 9/2012 | Kim | ............ | G06F 1/1626 345/173 |
| 8,400,414 B2* | 3/2013 | Seo | ............ | G06F 3/0485 345/173 |
| 8,810,524 B1* | 8/2014 | Rosenberg | ............ | G06F 1/1694 345/173 |
| 9,030,419 B1 | 5/2015 | Freed | | |
| 9,128,550 B2* | 9/2015 | Imada | ............ | G06F 3/04883 |
| 9,354,786 B2* | 5/2016 | Tsudik | ............ | G06F 3/0484 |
| 9,632,664 B2 | 4/2017 | Foss et al. | | |
| 9,645,709 B2 | 5/2017 | Foss et al. | | |
| 10,368,457 B2* | 7/2019 | Pakula | ............ | G02B 7/02 |
| 2003/0184528 A1* | 10/2003 | Kawasaki | ............ | G06F 3/041 345/173 |
| 2003/0234768 A1 | 12/2003 | Rekimoto et al. | | |
| 2006/0092355 A1* | 5/2006 | Yang | ............ | G02F 1/133555 349/114 |
| 2006/0132456 A1* | 6/2006 | Anson | ............ | G06F 3/0488 345/173 |
| 2006/0197750 A1 | 9/2006 | Kerr et al. | | |
| 2007/0152982 A1* | 7/2007 | Kim | ............ | G06F 3/04886 345/173 |
| 2008/0150903 A1* | 6/2008 | Chuang | ............ | G06F 1/1616 345/173 |
| 2008/0211783 A1* | 9/2008 | Hotelling | ............ | G06F 3/0488 345/173 |
| 2009/0256809 A1* | 10/2009 | Minor | ............ | G06F 3/03547 345/173 |
| 2009/0315834 A1* | 12/2009 | Nurmi | ............ | G06F 3/041 345/173 |
| 2010/0060605 A1* | 3/2010 | Rimas-Ribikauskas | ............ | G06F 3/04842 345/173 |
| 2010/0164904 A1* | 7/2010 | Kim | ............ | G06F 3/038 345/174 |
| 2010/0188353 A1* | 7/2010 | Yoon | ............ | G06F 3/04883 345/173 |
| 2010/0277439 A1* | 11/2010 | Charlier | ............ | G06F 1/1616 345/176 |
| 2011/0261058 A1* | 10/2011 | Luo | ............ | G06F 1/169 345/441 |
| 2013/0009882 A1* | 1/2013 | Salmela | ............ | G06F 3/016 345/173 |
| 2014/0028602 A1* | 1/2014 | Morinaga | ............ | G06F 1/1626 345/173 |
| 2014/0139472 A1* | 5/2014 | Takenaka | ............ | G06F 3/0488 345/173 |
| 2014/0337786 A1* | 11/2014 | Luo | ............ | G06F 3/0416 715/773 |
| 2016/0259413 A1 | 9/2016 | Anzures et al. | | |
| 2016/0259497 A1 | 9/2016 | Foss et al. | | |
| 2016/0259498 A1 | 9/2016 | Foss et al. | | |
| 2016/0259499 A1 | 9/2016 | Kocienda et al. | | |
| 2016/0259518 A1 | 9/2016 | King et al. | | |
| 2016/0259519 A1 | 9/2016 | Foss et al. | | |
| 2016/0259527 A1 | 9/2016 | Kocienda et al. | | |
| 2016/0259528 A1 | 9/2016 | Foss et al. | | |
| 2017/0017393 A1* | 1/2017 | Luo | ............ | G06F 3/04886 |
| 2017/0153738 A1* | 6/2017 | Ma | ............ | G01L 1/205 |
| 2017/0177211 A1 | 6/2017 | Yoon et al. | | |
| 2017/0372500 A1* | 12/2017 | Hashimoto | ............ | H04W 4/02 |
| 2019/0114067 A1* | 4/2019 | Xu | ............ | G06F 3/04817 |

FOREIGN PATENT DOCUMENTS

| | | |
|---|---|---|
| KR | 10-2010-0078234 A | 7/2010 |
| KR | 10-2012-0132147 A | 12/2012 |
| KR | 10-2014-0000932 A | 1/2014 |

OTHER PUBLICATIONS

Extended European Search Report dated May 25, 2020, issued in European Patent Application No. 18841102.9-1231.

* cited by examiner

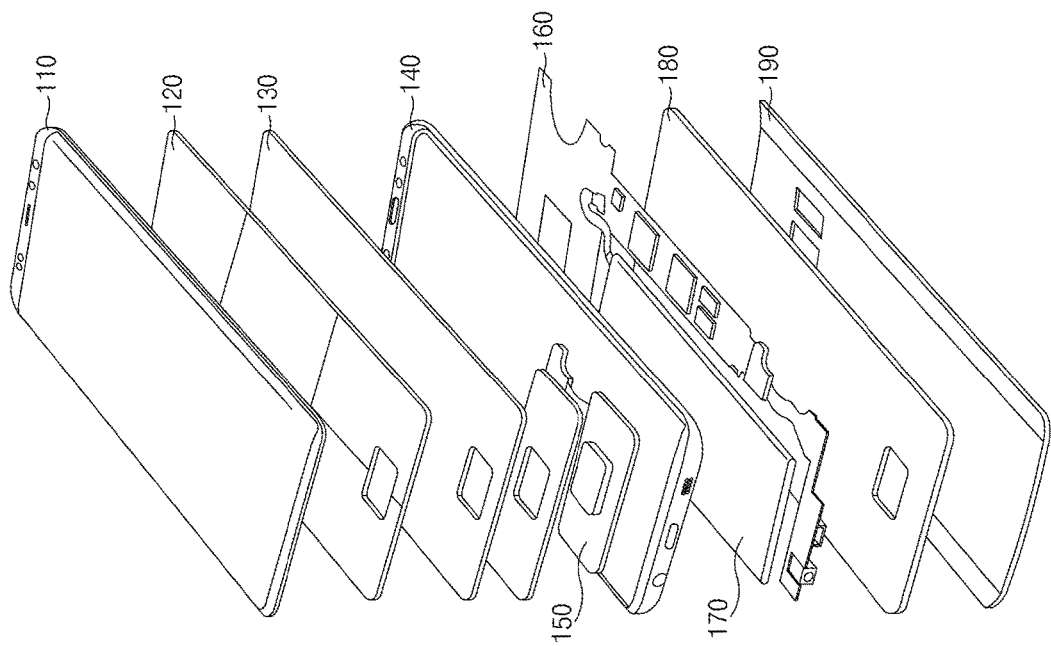
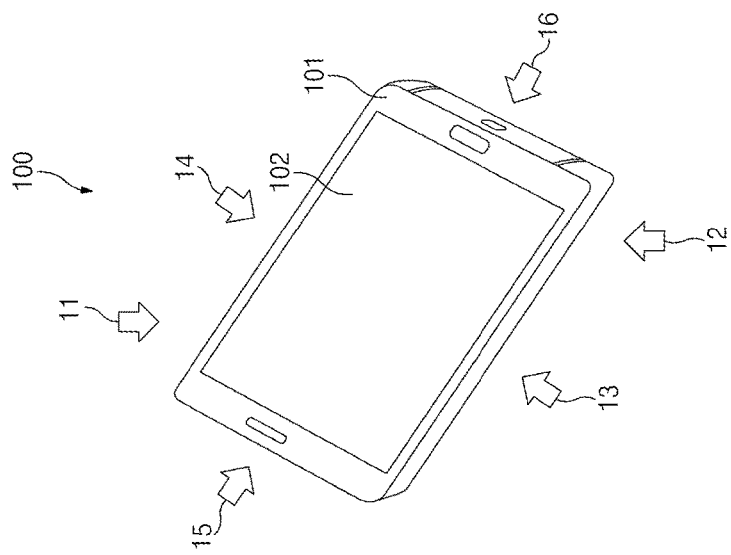
FIG. 1

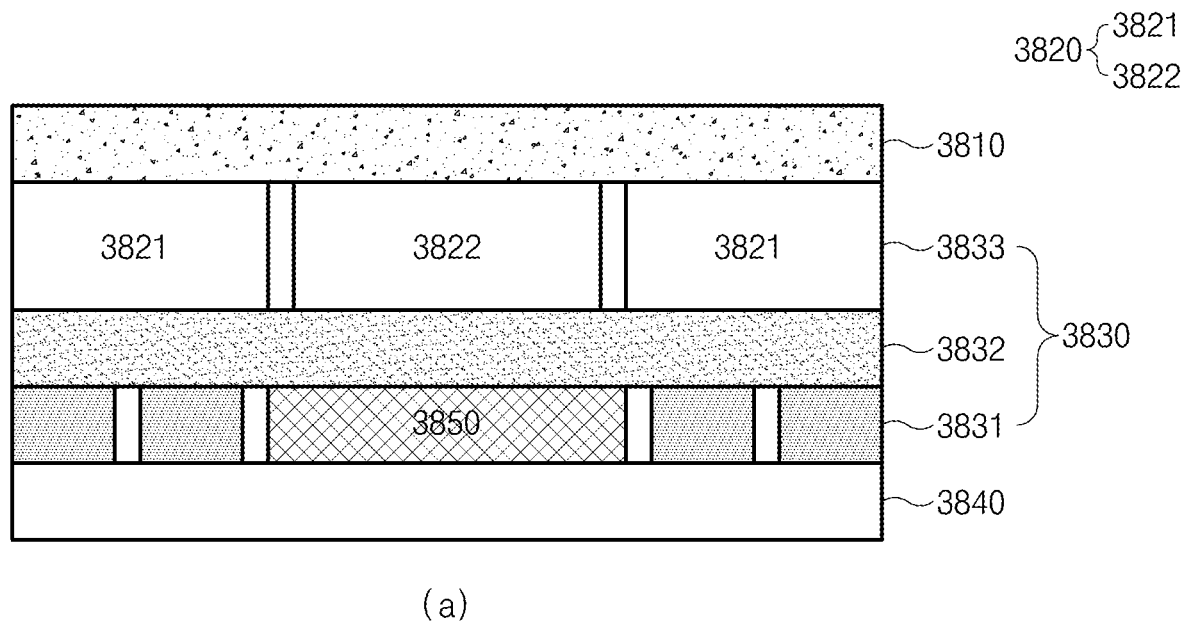
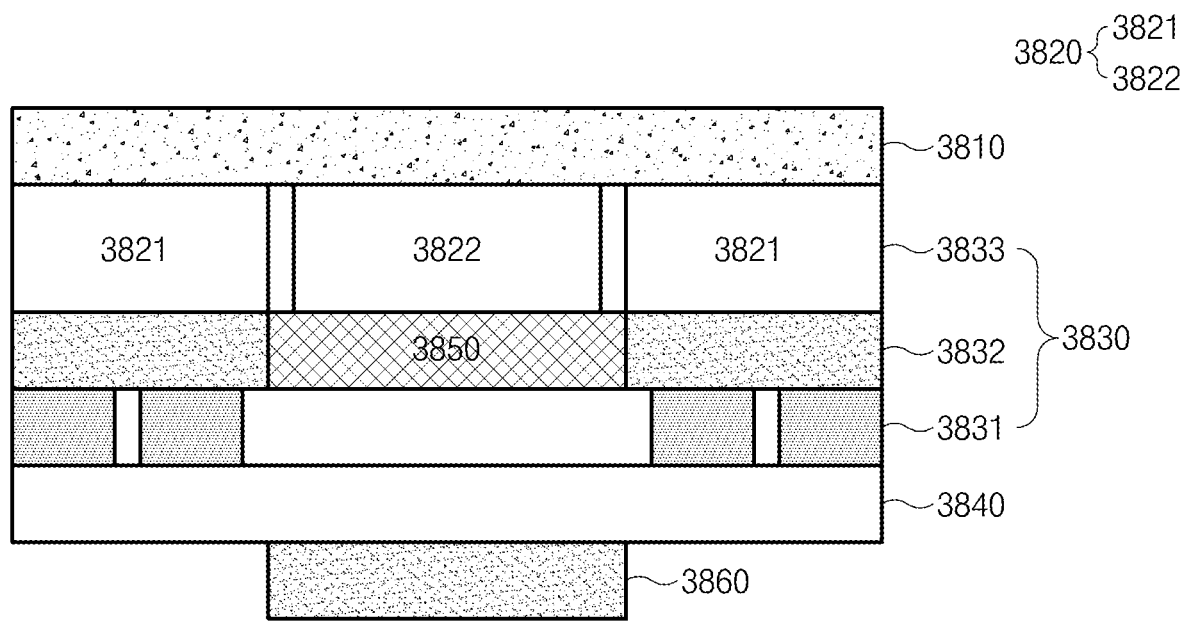
FIG. 31

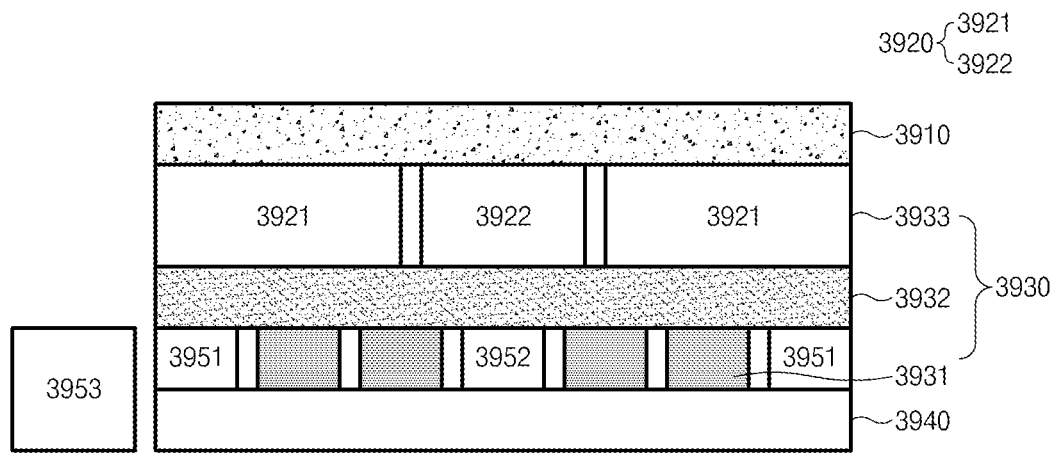
(a)
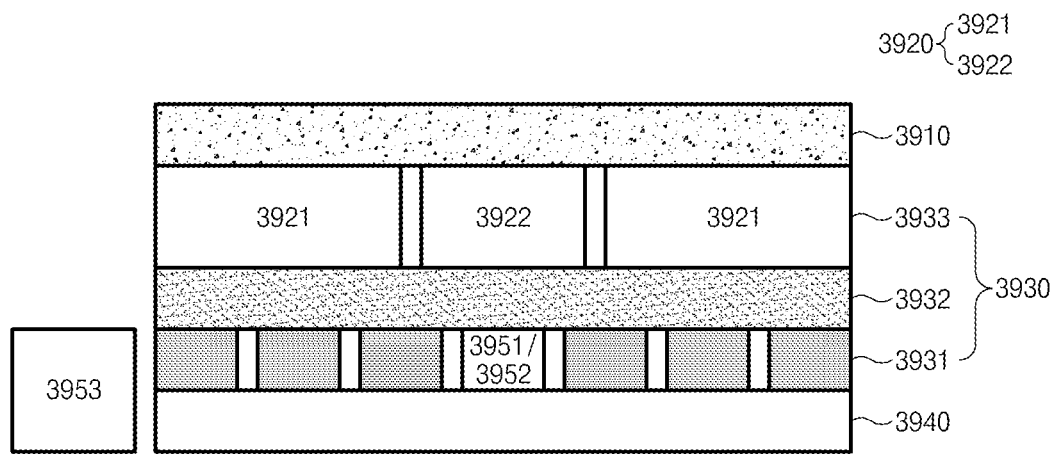
(b)
FIG. 3K

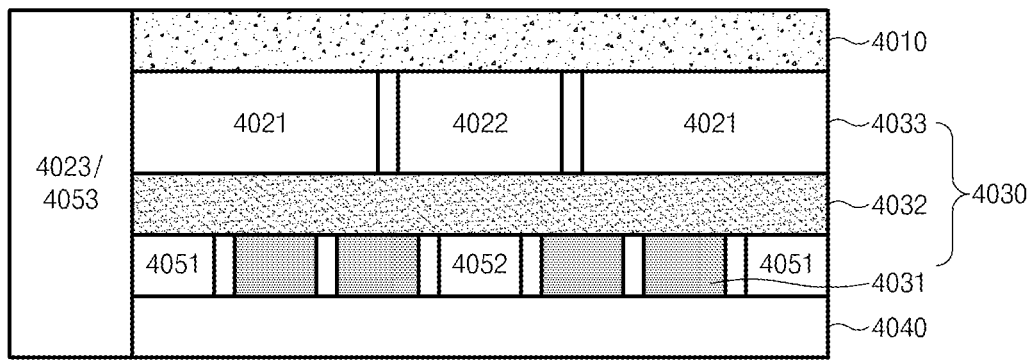
(a)
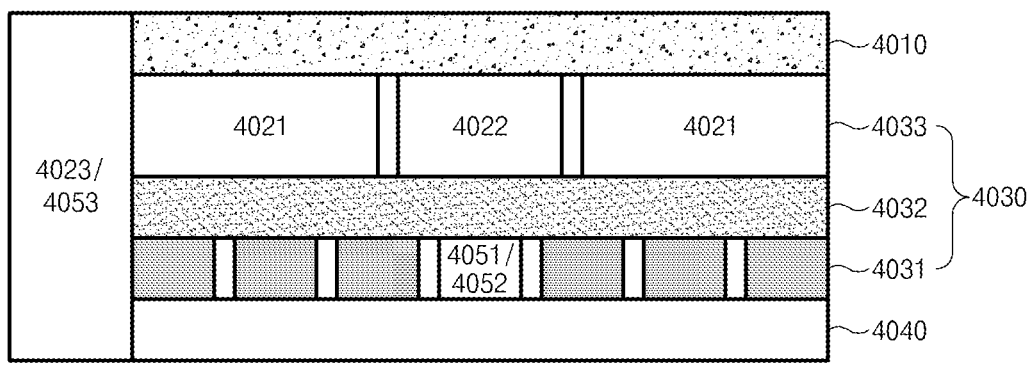
(b)
FIG. 3M

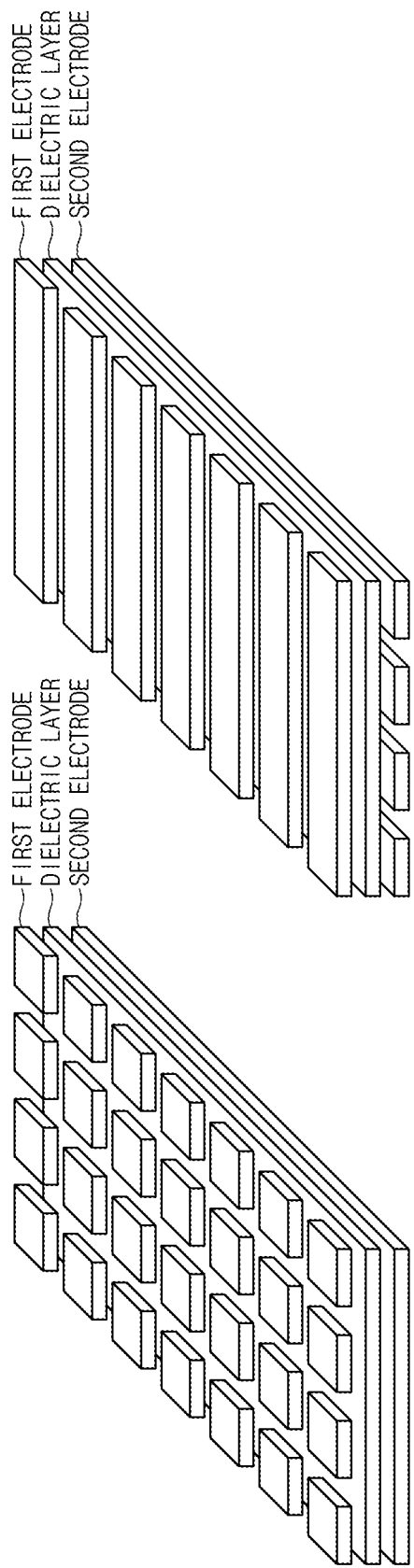

ELECTRONIC APPARATUS COMPRISING FORCE SENSOR AND METHOD FOR CONTROLLING ELECTRONIC APPARATUS THEREOF

CROSS-REFERENCE TO RELATED APPLICATION(S)

This application is based on and claims priority under 35 U.S.C. § 119(a) of a Korean patent application number 10-2017-0098580, filed on Aug. 3, 2017, in the Korean Intellectual Property Office, the disclosure of which is incorporated by reference herein its entirety.

BACKGROUND

1. Field

The disclosure relates to an electronic apparatus including a force sensor and a method for controlling the electronic apparatus.

2. Description of Related Art

With the development of mobile communication technologies, an electronic apparatus, which is equipped with a display, such as a smartphone, a wearable device, or the like has been widely supplied since the spread of personal computers.

A display of the electronic apparatus may be implemented with a so-called touch screen by additionally including a touch panel. The display may be implemented with the touch screen, and thus may act as an input device capable of receiving manipulation from a user, in addition to a role as a visual display device. In recent years, attempts have been made to utilize the pressure of the user as an input by using a pressure panel capable of obtaining a pressure input.

The above information is presented as background information only to assist with an understanding of the disclosure. No determination has been made, and no assertion is made, as to whether any of the above might be applicable as prior art with regard to the disclosure.

SUMMARY

An electronic apparatus may provide a function to use a pressure input, through a front display. In addition, the electronic apparatus has provided a service by using the deep link of an application, without providing usability to control various objects. As such, conventionally, since only the front display is used, the types of provided functions may be limited.

Aspects of the disclosure are to address at least the above-mentioned problems and/or disadvantages and to provide at least the advantages described below. Accordingly, an aspect of the disclosure is to provide an electronic apparatus including a force sensor capable of sensing a pressure in a rear surface to provide a user with various experiences and a method of providing various functions in response to a pressure input in the rear surface force sensor.

Additional aspects will be set forth in part in the description which follows and, in part, will be apparent from the description, or may be learned by practice of the presented embodiments.

In accordance with an aspect of the disclosure, an electronic apparatus is provided. The electronic apparatus includes a housing including a first plate facing a first direction and a second plate facing a second direction opposite to the first direction, a display exposed through the first plate, a first force sensor disposed inside the housing and disposed under the display, a second force sensor physically spaced apart from the first force sensor and adjacent to the second plate, a processor positioned inside the housing and electrically connected to the display, the first force sensor, and the second force sensor, and a memory electrically connected to the processor and positioned inside the housing. The memory may store instructions that, when executed, cause the processor to display a screen including an item on the display, to obtain a first pressure input for the item using the second force sensor, and to display an operation associated with the second force sensor on the display in response to the first pressure input.

In accordance with another aspect of the disclosure, an electronic apparatus is provided. The electronic apparatus includes a housing including a first plate, a second plate, and a side member surrounding a space between the first plate and the second plate and including a side surface member attached on or formed integrally with the second plate, a touch screen display exposed through the first plate, a force sensor detecting a pressure applied to the second plate by a user, a processor operatively connected to the touch screen display and the force sensor and disposed inside the housing, and a memory disposed inside the housing, operatively connected to the processor, and storing instructions. The instructions, when executed, may cause the processor to display a user interface on the touch screen display, to detect a location and a pressure of a user input on the second plate by using at least the force sensor, and to enlarge a part of the user interface based on the detected location and the detected pressure.

In accordance with another aspect of the disclosure, an electronic apparatus is provided. The electronic apparatus includes a housing including a first plate facing one direction and a second plate opposite to the first plate, in an unfolded state, a flexible display exposed through at least part of the first plate of the housing, the flexible display including a first area and a second area, which face different directions from each other, as the electronic apparatus is bent, a force sensor disposed inside the housing and obtaining a pressure applied by a user through the display, a processor positioned inside the housing and electrically connected to the display and the force sensor, and a memory electrically connected to the processor.

In accordance with another aspect of the disclosure, the memory is provided. The memory store instructions that, when executed, cause the processor to obtain a pressure through at least part of the second area of the display by using at least part of the force sensor in a state where the electronic apparatus is bent and to execute a function associated with at least part of the first area corresponding to the at least part of the second area, based on the obtained pressure.

According to various embodiments of the disclosure, it is possible to obtain a pressure input of a user by using a rear surface force sensor.

According to various embodiments of the disclosure, it is possible to provide a user with various functions by using a rear surface pressure input.

Besides, a variety of effects directly or indirectly understood through this disclosure may be provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1 illustrates an appearance of an electronic apparatus, according to an embodiment of the disclosure;

FIGS. 3A, 3B, 3C, 3D, 3E, 3F, 3G, 3H, 3I, 3J, 3K, 3L, 3M, and 3N illustrate stacked structures of an electronic apparatus including a rear surface force sensor, according to various embodiments of the disclosure;

FIGS. 4A and 4B are perspective views of a force sensor, according to various embodiments of the disclosure;

Throughout the drawings, it should be noted that like reference numbers are used to depict the same or similar elements, features, and structures.

DETAILED DESCRIPTION

Figure 2:
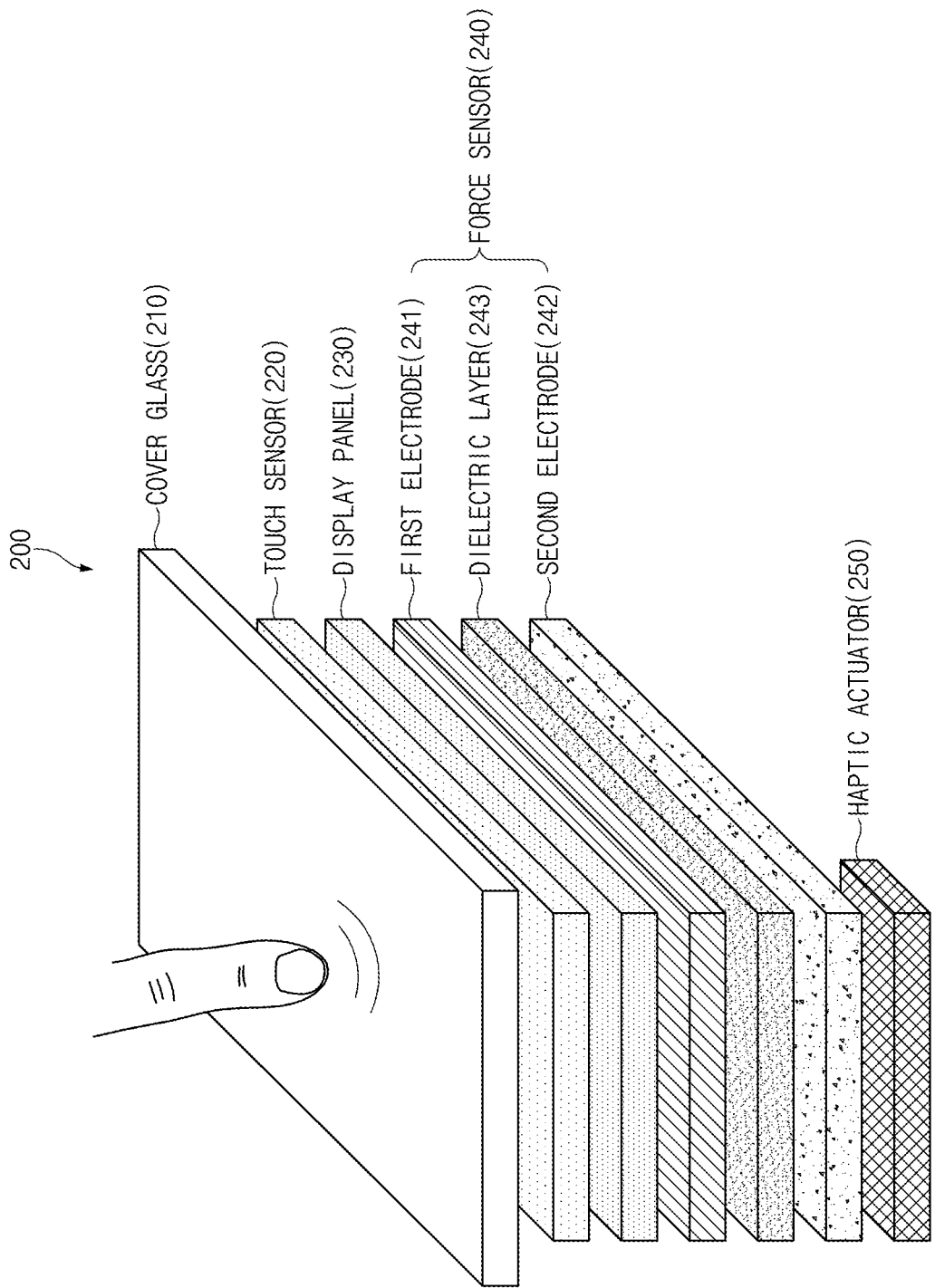
FIG. 2 illustrates a stacked structure of a display according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that that various changes and modification of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

FIG. 1 illustrates an appearance of an electronic apparatus, according to an embodiment of the disclosure.

Referring to FIG. 1, an electronic apparatus 100 according to an embodiment may include a display 102 and a housing 101 in appearance. Various circuits (e.g., a processor, a memory, or the like), modules, or the like may be disposed in an interior of the electronic apparatus 100 (i.e., an interior of the housing 101).

According to various embodiments the display 102 may be disposed on a front surface of the electronic apparatus 100. For example, the display 102 may be interposed between the first plate (e.g., front surface) facing an upper direction (first direction) 11 and a second plate (e.g., rear surface) facing a lower direction (second direction) 12 and may be exposed to the outside through at least part of the first plate. For example, the display 102 may output a plurality of items (e.g., a text, an image, a video, an icon, a widget, a symbol, or the like).

According to various embodiments, a touch screen display 110 may include a cover glass, a display panel, a touch sensor, or the like. For example, the cover glass, the display panel, the touch panel, and/or the force sensor may have areas (e.g., substantially the same area) corresponding to each other and may be positioned to be stacked (refer to FIG. 2).

According to various embodiments, the touch screen display 110 may be disposed on the first plate of the electronic apparatus 100 and may further extend to at least one side surface from the front plate. For example, the display 102 may extend in a left-side direction 13 and/or a right-side direction 14. Since the display 102 extends in the left-side direction 13 and/or the right-side direction 14, the display 102 may be exposed to the outside through the left-side surface and the right-side surface as well as the front surface.

According to various embodiments, the housing 101 may constitute at least part of the appearance of the electronic apparatus 100. For example, the housing 101 may include the first plate (e.g., front surface) facing the first direction 11 and the second plate (e.g., rear surface) facing the second direction 12 that is opposite to the first direction 11. A side surface of the housing 101, which surrounds the first plate and the second plate, may include a left-side surface facing the left-side direction 13, a right-side surface facing the right-side direction 14, an upper-side surface facing an upper-side direction 15, and a bottom-side surface facing a bottom-side direction 16.

According to various embodiments, to protect various components in the electronic apparatus 100 from an external shock or dust, the housing 101 may be formed of a non-conductive material (e.g., a plastic injection molding material, glass, ceramic, or the like), a conductive material (e.g., metal), or a combination thereof. According to an embodiment, the housing 101 may be used as meaning indicating outer surfaces of a plurality of components. For example, the front surface of the housing 101 may correspond to a cover glass disposed on the display 102, and the rear surface of the housing 101 may correspond to a rear cover 190 of the electronic apparatus 100. The cover glass (or back glass) may be disposed on the rear surface of the housing 101.

According to an embodiment, the electronic apparatus 100 may include the touch screen display 110, a digitizer panel 120, a first force touch panel 130, a support member 140, a fingerprint sensor 150, a printed circuit board (PCB) 160, a battery 170, a second force touch panel 180, and/or the rear cover 190 inside the housing 101. For example, the components of the electronic apparatus 100 may be interposed between the front surface (the first plate) and the rear surface (the second plate) of the electronic apparatus 100. In various embodiments of the disclosure, the internal configuration of the electronic apparatus 100 may be changed variously. For example, the electronic apparatus 100 may not include the digitizer panel 120.

According to an embodiment, a display panel may output at least one piece of content or at least one item (e.g., a text, an image, a video, an icon, a widget, a symbol, or the like). For example, the display panel may include a liquid crystal display (LCD) panel, a light-emitting diode (LED) display panel, an organic LED (OLED) display panel, a microelectromechanical systems (MEMS) display panel, or an electronic paper display panel.

According to an embodiment, the digitizer panel 120 may be coupled to at least part of the display panel to obtain an input associated with the touch screen display 110 or an input independent of the touch screen display 110.

According to an embodiment, the electronic apparatus 100 may include the first force touch panel 130 for obtaining a front surface pressure input and the second force touch panel 180 for obtaining a rear surface pressure input. The first force touch panel 130 may include a first force sensor, and the second force touch panel 180 may include a second force sensor.

According to an embodiment, the electronic apparatus 100 may sense and obtain the intensity (or pressure input) of a user's touch input to a display panel, by using the first force touch panel 130. The first force touch panel 130 may be interposed between the touch screen display 110 and the support member 140.

According to an embodiment, the electronic apparatus 100 may sense and obtain the intensity (or pressure input) of a user's touch input to the rear cover 190, by using the second force touch panel 180. The second force touch panel 180 may be disposed adjacent to the rear cover 190. The second force touch panel 180 may be interposed between the support member 140 and the rear cover 190. The second force touch panel 180 may be disposed integrally or separately with the rear cover 190.

According to an embodiment, the first force touch panel 130 and the second force touch panel 180 may be disposed over the entire area of the electronic apparatus 100 or may be disposed in a partial area. For example, the first force touch panel 130 may be disposed at a periphery of the fingerprint sensor 150. For example, the second force touch panel 180 may be disposed along the edge portion of the electronic apparatus 100 or at a periphery of a rear camera (not shown).

According to an embodiment, the first force touch panel 130 and the second force touch panel 180 may be implemented in a capacitive, inductive, strain gauge, or piezo manner (hereinafter, refer to FIGS. 5A to 5E).

According to an embodiment, the support member 140 (e.g., bracket) may support the internal configuration of the electronic apparatus 100. For example, the support member 140 may support the first force touch panel 130, the fingerprint sensor 150, the PCB 160, the battery 170, or the second force touch panel 180. The support member 140 may be formed integrally with the side member or may be formed in a manner to couple the side member.

According to an embodiment, the PCB 160 may include components for performing an operation depending on the obtained input. For example, the PCB 160 may include a processor or a memory.

According to an embodiment, the fingerprint sensor 150 may sense a user's fingerprint input. The fingerprint sensor 150 may be interposed between the touch screen display 110 and the support member 140 or between the first force touch panel 130 and the support member 140. The fingerprint sensor 150 may be disposed in the partial area of the electronic apparatus 100.

FIG. 2 illustrates a stacked structure of a display according to an embodiment of the disclosure.

Referring to FIG. 2, according to an embodiment, the stacked structure 200 of the display is illustrated. For example, the stacked structure may be applied to the display 102 illustrated in FIG. 1. Components illustrated in FIG. 2 may be interposed between a first plate (e.g., front surface) and a second plate (e.g., rear surface) of the electronic apparatus 100 of FIG. 1.

According to an embodiment, a cover glass 210 may pass light generated by a display panel 230. A user may touch the cover glass 210 by using a portion (e.g., a finger) of his/her body to perform a touch (including a contact using an electronic pen). The cover glass 210 may be formed of, for example, tempered glass, reinforced plastic, a flexible polymer material, or the like and may protect the display or an electronic apparatus equipped with the display from an external shock. According to various embodiments, the cover glass 210 may be also referred to as a "glass window" or "cover window".

According to an embodiment, in a touch sensor 220, a specified physical quantity (e.g., a voltage, the amount of light, resistance, the amount of charges, or capacitance) may vary due to a contact of an external object (e.g., a finger of the user or an electronic pen). The touch sensor 220 may detect at least one location of a touch on the display (e.g., on a surface of the cover glass 210) by an external object based on a change in the specified physical quantity. For example, the touch sensor 220 may include a capacitive touch sensor, a pressure sensitive touch sensor, an infrared touch sensor, a resistive touch sensor, a piezo touch sensor, or the like. According to various embodiments, the touch sensor 220 may be referred to as various names, such as a touch panel and the like, based on an implementation shape.

According to an embodiment, the display panel 230 may display at least one piece of content or at least one item. According to various embodiments of the disclosure, the display panel 230 may be integrally implemented with the touch sensor (or touch panel) 220. In this case, the display panel 230 may be also referred to as a touch screen panel (TSP) or a touch screen display panel.

According to an embodiment, a force sensor 240 may detect pressure (or force) on a display (e.g., a surface of the cover glass 210) by an external object (e.g., a finger of the user or an electronic pen). According to an embodiment, the force sensor 240 may include a first electrode 241, a second electrode 242, and a dielectric layer 243. For example, the force sensor 240 may sense the pressure of the touch based on capacitance between the first electrode 241 and the second electrode 242, which varies due to the touch. A configuration of the force sensor 240 will be more fully described with reference to FIG. 6. According to an embodiment, the force sensor 240 may be mounted in the first force touch panel 130 of FIG. 1. The force sensor 240 may be referred to as a "front surface force sensor", a "first force sensor", or the like.

According to an embodiment, when a touch (including a hovering and a "force touch") is input by an external object (e.g., a finger of the user or an electronic pen), a haptic actuator 250 may provide the user with a haptic feedback (e.g., vibration). To this end, the haptic actuator 250 may include a piezoelectric member and/or a vibration plate.

The stacked structure of the display above described with reference to FIG. 2 is an example and is able to be variously changed or modified. For example, the touch sensor 220 may be formed directly on a back surface of the cover glass 210 (a so-called cover glass integrated touch panel), may be inserted between the cover glass 210 and the display panel 230 after being separately manufactured (e.g., an add-on touch panel), may be formed directly on the display panel 230 (e.g., an on-cell touch panel), or may be included inside the display panel 230 (e.g., an in-cell touch panel). According to various embodiments, an area-type fingerprint sensor that is implemented to be transparent or opaque may be additionally included in the above-described stacked structure.

Figure 3A:
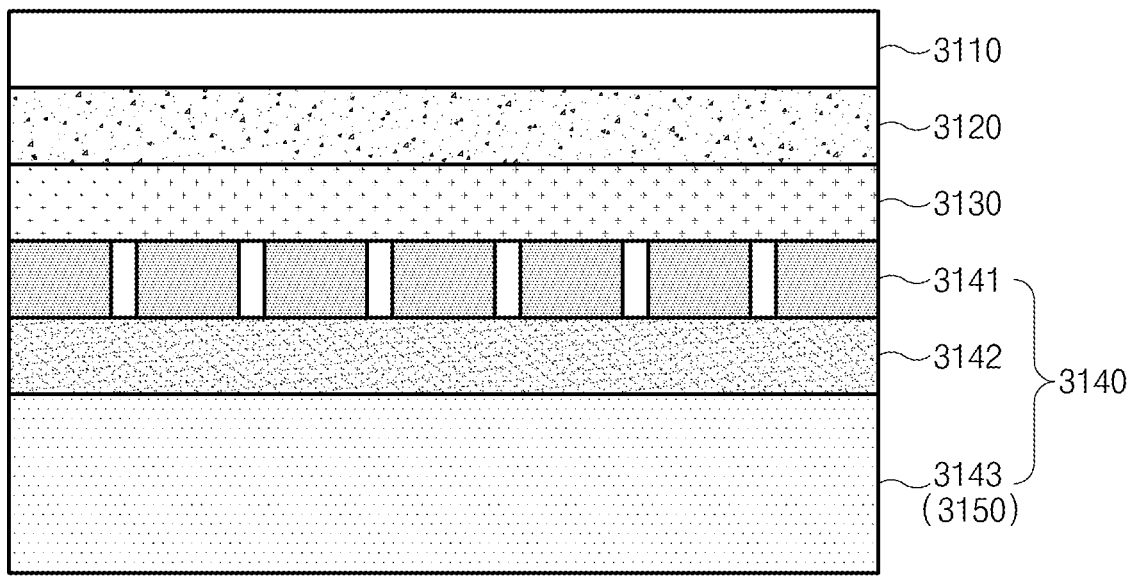
Figure 3B:
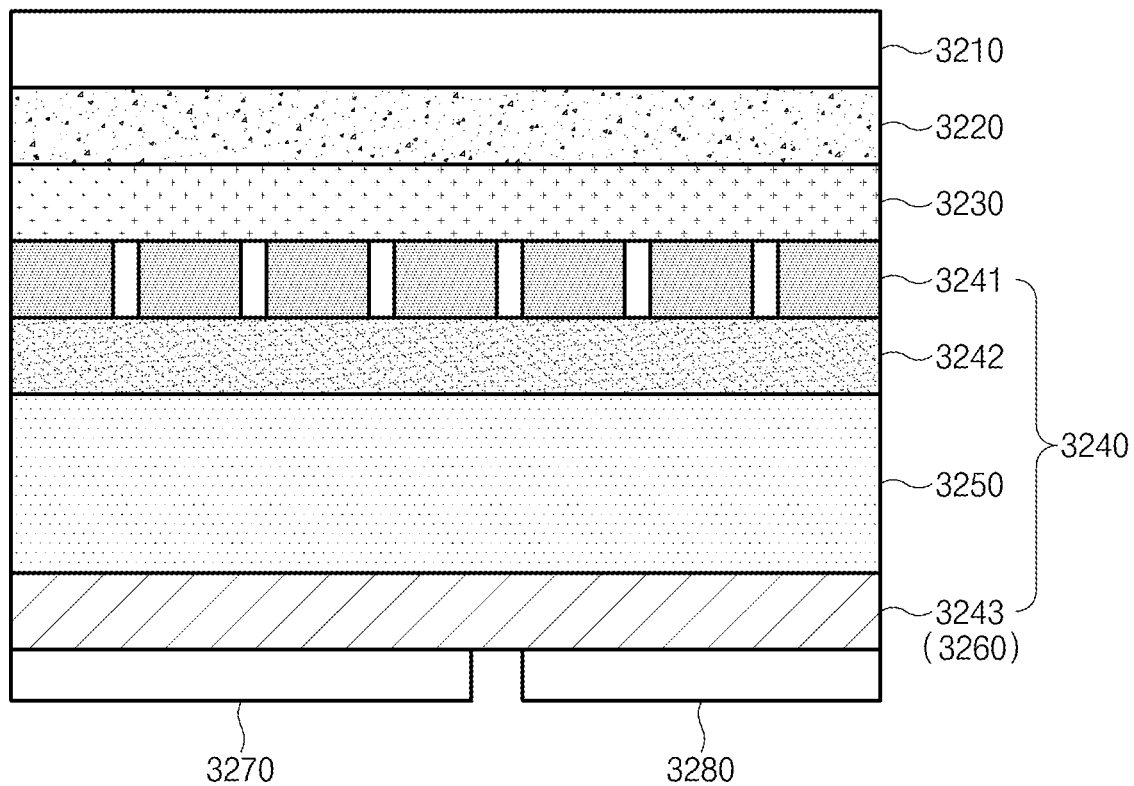
Figure 3C:
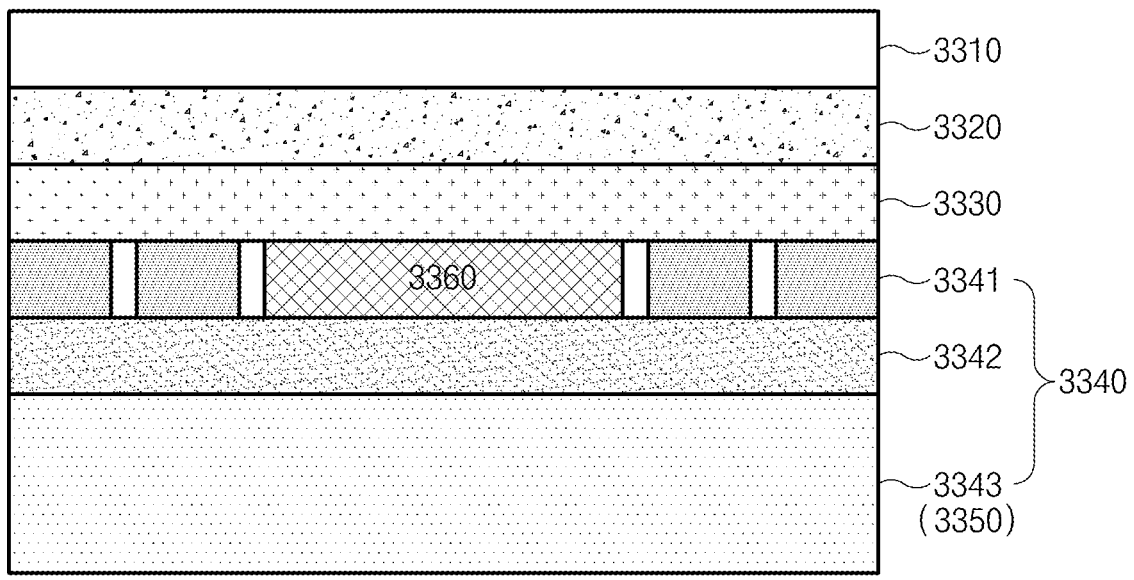
Figure 3D:
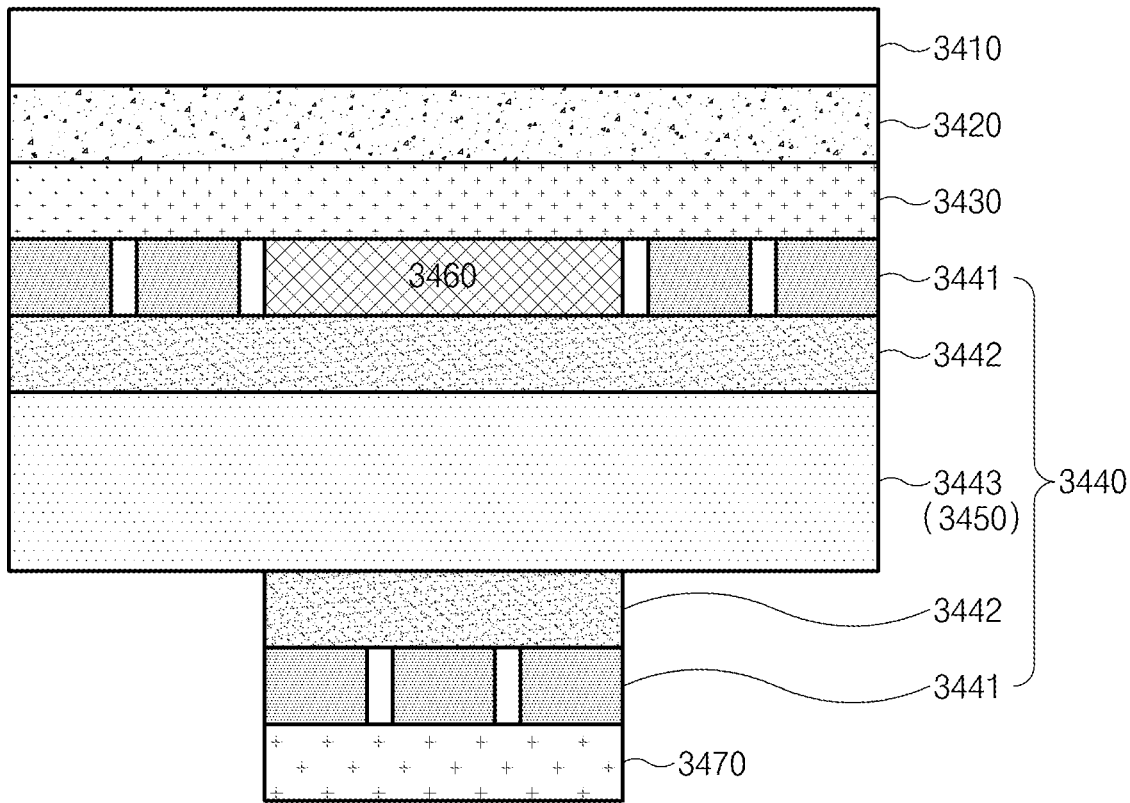
Figure 3E:
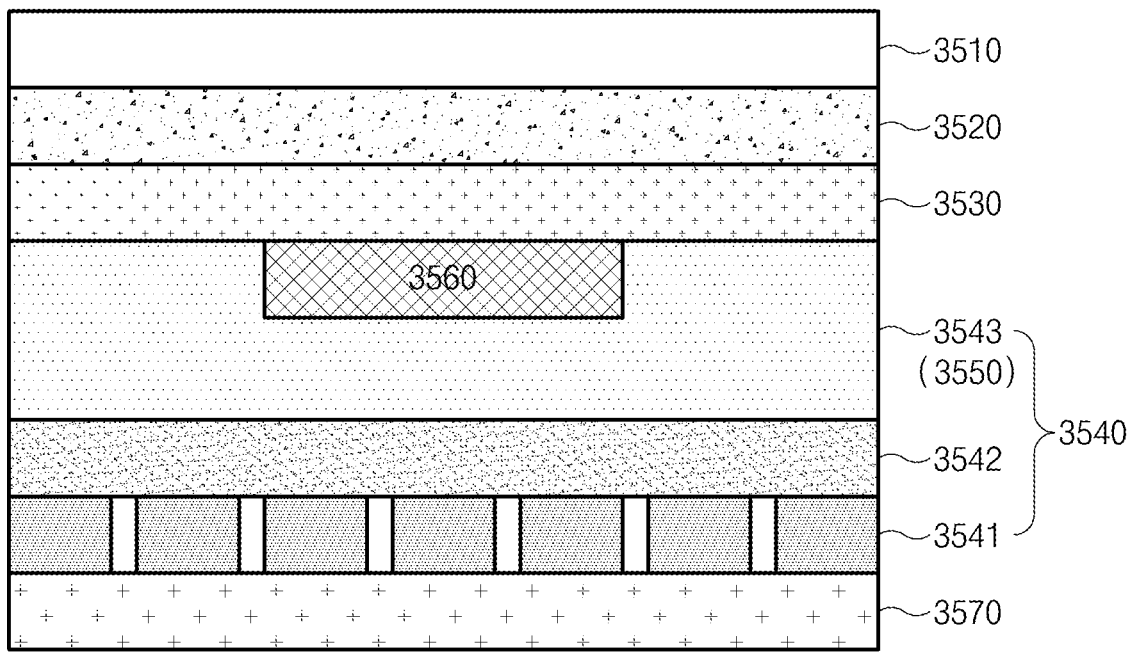
Figure 3F:
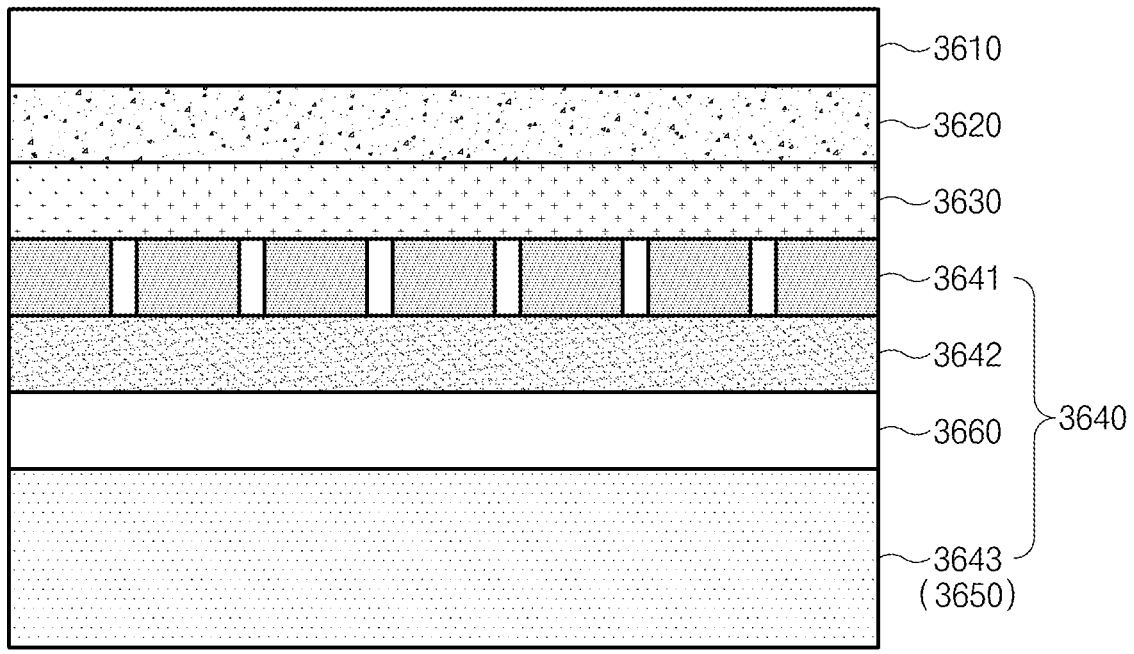
Figure 3G:
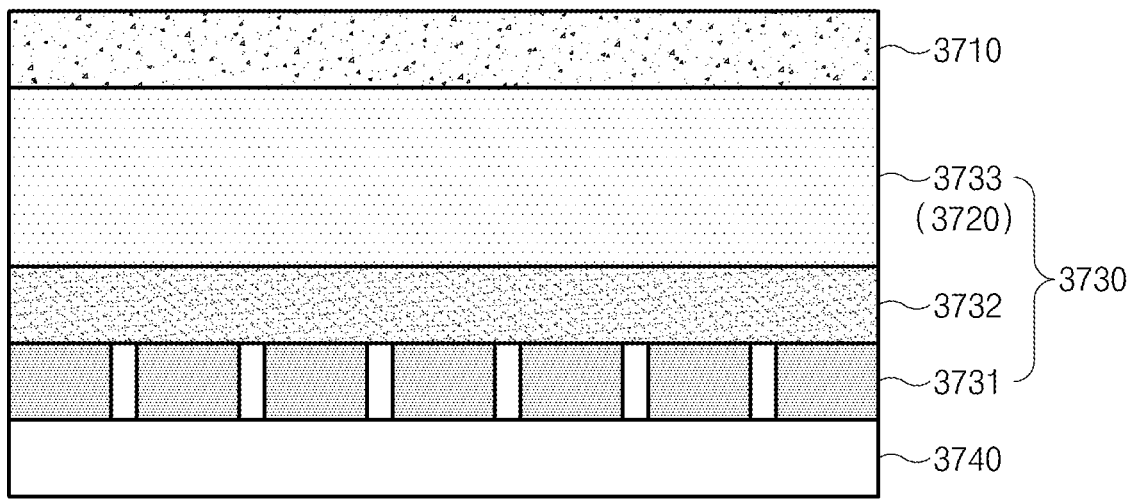
Figure 3H:
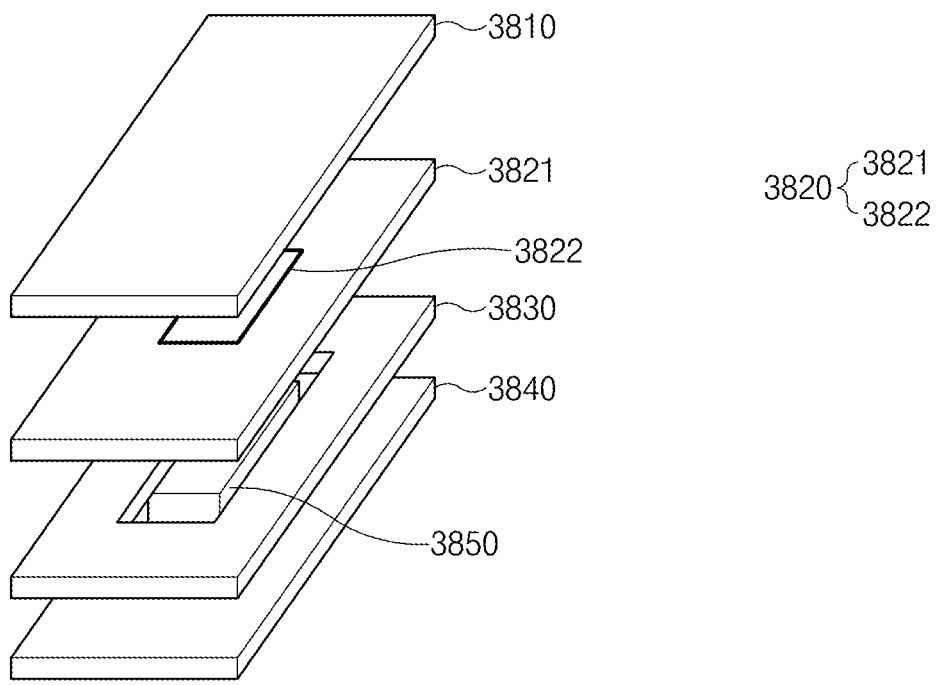
Figure 3J:
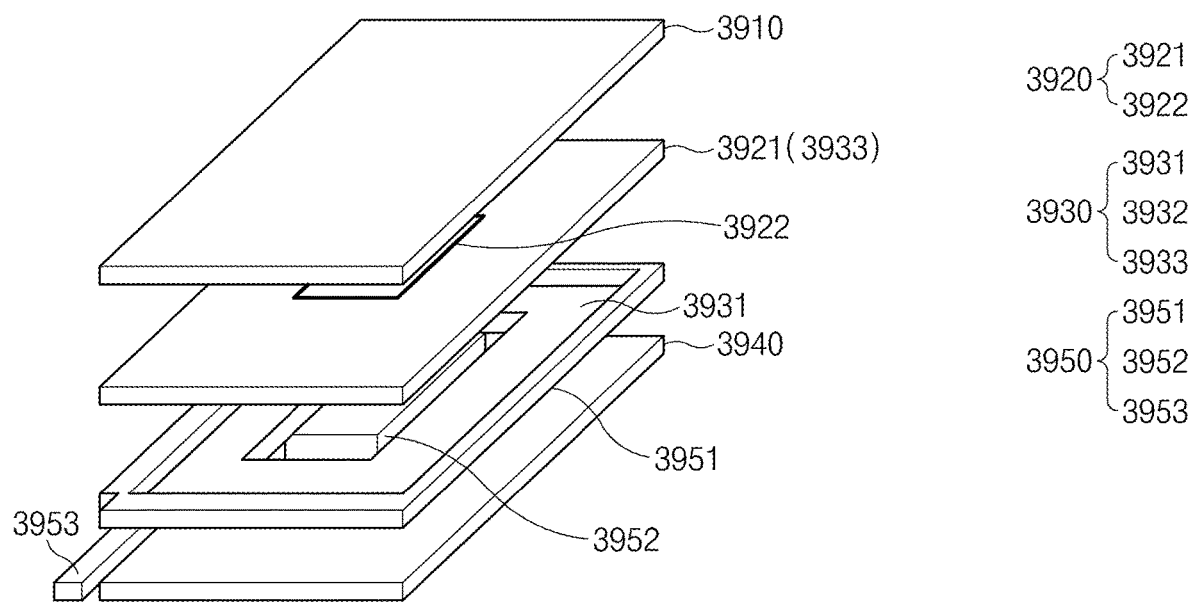
Figure 3L:
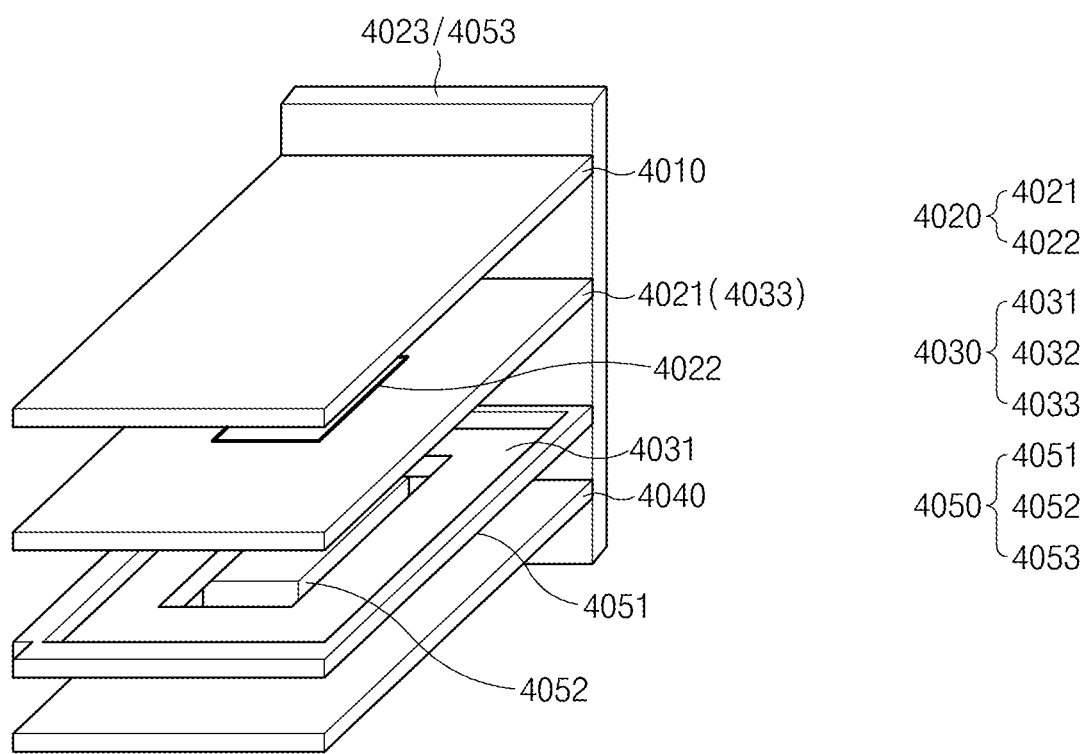
Figure 3N:
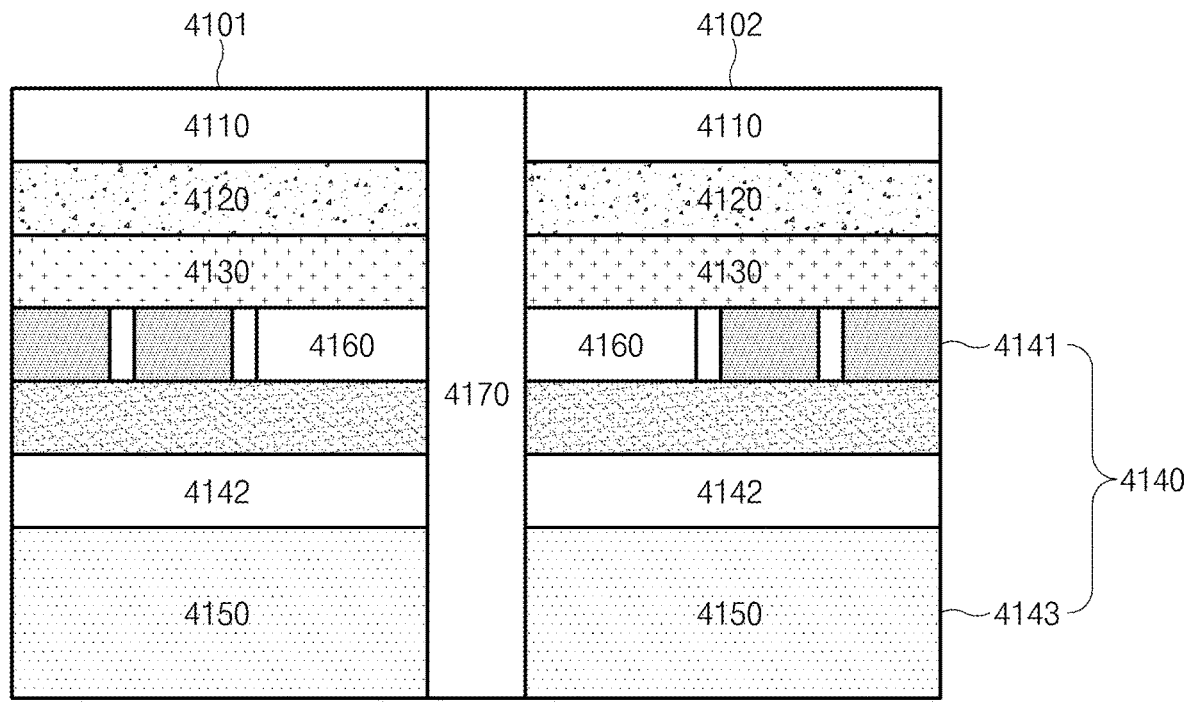

FIGS. 3A to 3N are structures of a rear surface force sensor in an electronic apparatus, according to various embodiments of the disclosure.

According to an embodiment, an electronic apparatus (e.g., the electronic apparatus 100 of FIG. 1) may include a rear surface force sensor disposed adjacent to a rear surface. The rear surface force sensor may be mounted in a second force touch panel (e.g., the second force touch panel 180 of FIG. 1). The rear surface force sensor may be referred to as a "second force sensor". Hereinafter, in descriptions of FIGS. 3A to 3N, the rear surface force sensor may be referred to a "force sensor".

In various embodiments of FIG. 3A to 3N, the force sensor (e.g., a force sensor 3140 of FIG. 3A) may include a first electrode (e.g., a first electrode 3141 of FIG. 3A), a dielectric layer (e.g., a dielectric layer 3142 of FIG. 3A), and a second electrode (e.g., a second electrode 3143 of FIG. 3A).

Referring to FIGS. 3A to 3F, the following items may be applied in common. An electronic apparatus (e.g., the electronic apparatus 100 of FIG. 1) of FIGS. 3A to 3F may include a second plate 3110 (e.g., a back glass); a printed layer (e.g., a printed layer 3120 of FIG. 3A) may be disposed under a second plate 3110; and a first support film layer (e.g., a support film layer 3130 in FIG. 3A) of a polymer material (e.g., polyethylene terephthalate (PET)) may be disposed under the printed layer.

Referring to FIG. 3A, the electronic apparatus may further include the force sensor 3140 and a support member 3150. The force sensor 3140 may be disposed under the first support film layer 3130, and the support member 3150 may be disposed under the force sensor 3140. The force sensor 3140 may include the first electrode 3141, the dielectric layer 3142, and the second electrode 3143.

According to an embodiment, the support member 3150 may be formed of metal. At this time, the electronic apparatus may use the support member 3150 as the ground GND. According to an embodiment, the support member 3150 may be the second electrode 3143 of the force sensor 3140. According to an embodiment, the support member 3150 may be the same as or similar to the support member 140 of FIG. 1.

According to an embodiment, the printed layer 3120 and/or the support film layer 3130 may operate as a part of the force sensor 3140. The first electrode 3141 may form the electrode of the force sensor 3140 integrally with the printed layer 3120 and/or the support film layer 3130, which is disposed under the back glass (e.g., second plate 3110).

Referring to FIG. 3B, an electronic apparatus may include a second plate 3210 (e.g., a back glass), a printed layer 3220, a first support film layer 3230, a force sensor 3240, a second support member 3250, a first support member 3260, a battery 3270, and a PCB 3280. According to an embodiment, the force sensor 3240 may include a first electrode 3241, a dielectric layer 3242, and a second electrode 3243.

According to an embodiment, the first support member 3260 may include a ground GND. The first support member 3260 may support the battery 3270 and the PCB 3280. The first support member 3260 may be interposed between the second support member 3250 and the battery 3270 or the PCB 3280. For example, the first support member 3260 and the second support member 3250 may be formed of different processes or materials.

According to an embodiment, the first electrode 3241 may form the electrode of the force sensor 3240 integrally with the printed layer 3220 and/or the first support film layer 3230. According to an embodiment, the first support member 3260 may be the second electrode 3243 of the force sensor 3240. The second electrode 3243 may include at least part of the first support member 3260.

An electronic apparatus in FIGS. 3C to 3F may include at least one of a first antenna, a second antenna, or a third antenna. Hereinafter, the at least one antenna may refer to as an "antenna". According to an embodiment, the first antenna may be an inductive wireless charging antenna, and the second antenna may be at least one of a magnetic secure transmission (MST) antenna or a resonant wireless charging antenna. The third antenna may be a near field communication (NFC) antenna.

Referring to FIG. 3C, a printed layer 3320, a first support film layer 3330, or a force sensor 3340 may be interposed between a second plate 3310 (e.g., a back glass) and a support member 3350. Since the components are the same as or similar to the components of FIG. 3A, the detailed description thereof is thus omitted.

According to an embodiment, the electronic apparatus may further include an antenna 3360. The antenna 3360 may be surrounded by a first electrode 3341 of the force sensor 3340. The first electrode 3341 may not be disposed in an area in which the antenna 3360 is disposed. When viewed from above the second plate 3310 (e.g., a back glass) of the housing (e.g., the housing 101 of FIG. 1) of an electronic apparatus, the first electrode 3341 may not overlap with the antenna 3360.

According to an embodiment, the support member 3350 may be made of metal. The support member 3350 may operate as a ground. According to an embodiment, the support member 3350 may operate as a part of a second electrode 3343.

A part of components in FIG. 3D may be the same as or similar to a part of components in FIG. 3C. Referring to FIG. 3D, compared with the configuration of FIG. 3C, an electronic apparatus may include a dielectric layer 3442, and/or a first electrode 3441 between a support member 3450 and a second support film layer 3470. For example, a printed layer 3420, a first support film layer 3430, or a force sensor 3440 may be interposed between a second plate 3410 (e.g., a back glass) and the support member 3450, and the dielectric layer 3442 or the first electrode 3441 may be interposed between the support member 3450 and the second support film layer 3470. According to an embodiment, the second support film layer 3470 may be a flexible PCB (FPCB).

According to an embodiment, the force sensor 3440 may include the first electrode 3441 including two layers. The first electrode 3441 may include a first layer interposed between the second plate 3410 (e.g., a back glass) and the support member 3450 and a second layer disposed under the support member 3450. The second layer may be interposed between the second support film layer 3470 and the support member 3450.

According to an embodiment, the force sensor 3440 may include a dielectric layer 3442 including two layers. The first layer of the dielectric layer 3442 may be interposed between the first layer of the first electrode 3441 and the support member 3450; and the second layer of the dielectric layer 3442 may be disposed under the support member 3450. The second layer of the dielectric layer 3442 may be interposed between the second layer of the first electrode 3441 and the support member 3450.

According to an embodiment, the support member 3450 may be formed of a metal material and may operate as a second electrode 3443 of the force sensor 3440.

Referring to FIG. 3E, an electronic apparatus may include a second plate 3510 (e.g., a back glass), a printed layer 3520, a first support film layer 3530, a force sensor 3540, a support member 3550, and a second support film layer 3570. The force sensor 3540 may be interposed between the support member 3550 and the second support film layer 3570. For example, according to an embodiment, the second support film layer 3570 may be a FPCB. A part of components in FIG. 3E may be the same as or similar to a part of components in FIG. 3C.

According to an embodiment, an antenna 3560 may be disposed adjacent to the force sensor 3540. According to an embodiment, the antenna 3560 may be interposed between the first support film layer 3530 and a dielectric layer 3542. The antenna 3560 may be disposed in the support member 3550 or may be included in at least part of the support member 3550. The antenna 3560 may be adjacent to the first support film layer 3530.

According to an embodiment, the support member 3550 may be formed of a metal material and may include a ground.

According to an embodiment, the components of the force sensor 3540 may include a second electrode 3543, the dielectric layer 3542, and a first electrode 3541. The components of the force sensor 3540 may be interposed between the first support film layer 3530 and the second support film layer 3570. The second electrode 3543 may include at least part of the support member 3550. The first electrode 3541 of the force sensor 3540 may be interposed between the second support film layer 3570 and the dielectric layer 3542, and the dielectric layer 3542 may be interposed between the first electrode 3541 and the support member 3550.

Referring to FIG. 3F, an electronic apparatus may include a second plate 3610 (e.g., a back glass), a printed layer 3620, a first support film layer 3630, a force sensor 3640, and a support member 3650. According to an embodiment, the force sensor 3640 may be interposed between the first support film layer 3630 and the support member 3650. A first electrode 3641 or a dielectric layer 3642 may be interposed between the first support film layer 3630 and the support member 3650. A part of components in FIG. 3F may be the same as or similar to a part of components in FIG. 3E.

According to an embodiment, the support member 3650 may operate as a ground and may be formed of a metal material. The support member 3650 may be the second electrode 3643 of the force sensor 3640.

According to an embodiment, an antenna 3660 may be interposed between a dielectric layer 3642 of the force sensor 3640 and the support member 3650 (or a second electrode 3643).

FIGS. 3G to 3M illustrate a configuration of an electronic apparatus including a force sensor in the case where a second plate does not include a back glass according to various embodiments of the disclosure.

Referring to FIG. 3G, according to an embodiment, an electronic apparatus may include a printed layer 3710, a second plate 3720 (e.g., rear surface housing), a force sensor 3730, and a support film layer 3740 of a FPCB material. For example, the printed layer 3710 may not be included. According to an embodiment, at least part of the second plate 3720 may be formed of a metal material.

According to an embodiment, the second plate 3720 may be interposed between the printed layer 3710 and a dielectric layer 3732, and the force sensor 3730 may be interposed between the second plate 3720 and the support film layer 3740.

According to an embodiment, the dielectric layer 3732 and a first electrode 3731 may be interposed between the second plate 3720 and the support film layer 3740. According to an embodiment, the second plate 3720 may be a second electrode 3733. The second electrode 3733 of the force sensor 3730 may be formed inside the second plate 3720. According to an embodiment, at least part of the second plate 3720 may operate as a ground.

Electronic apparatuses of FIGS. 3H to 3N may further include an antenna.

FIG. 3H illustrates the stacked structure of a rear surface of an electronic apparatus including a force sensor according to an embodiment of the disclosure. FIG. 3I briefly illustrates the structure of a rear surface according to an embodiment of the disclosure.

Referring to FIG. 3H, an antenna 3850 may be surrounded by a force sensor 3830. According to an embodiment, a second plate 3820 (e.g., rear surface housing) may be interposed between a printed layer 3810 and the force sensor 3830, and the force sensor 3830 may be interposed between the second plate 3820 and a support film layer 3840. For example, the support film layer 3840 may be formed of a FPCB material. According to an embodiment, at least part of the second plate 3820 may be formed of a metal material.

According to an embodiment, at least part of the force sensor 3830 and the antenna 3850 may be interposed between the second plate 3820 and the support film layer 3840. The electrode of the force sensor 3830 may be formed inside the second plate 3820.

According to an embodiment, the second plate 3820 may include a first area 3821, at least part of which operates as a ground, and a second area 3822 that is floated. The second area 3822 may be divided from the first area 3821 by a slit. When viewed from above the printed layer 3810 of the electronic apparatus, the second area 3822 of the second plate 3820 may overlap with the antenna 3850, and the first area 3821 may not overlap with the antenna 3850. The second area 3822 may be surrounded by the first area 3821.

Referring to FIG. 3I, the antenna 3850 may be interposed between a first electrode 3831 and a dielectric layer 3832.

According to an embodiment, the force sensor 3830 and the second plate 3820 (e.g., rear surface housing) may be interposed between the printed layer 3810 and the support film layer 3840. According to an embodiment, the support film layer 3840 may be a FPCB. The first electrode 3831 of the force sensor 3830 may be interposed between the second plate 3820 and the support film layer 3840.

Referring to (a) of FIG. 3I, the antenna 3850 may be surrounded by the first electrode 3831 of the force sensor 3830, and a second electrode 3833 may be implemented inside the first area 3821 of the second plate 3820. The dielectric layer 3832 and the first electrode 3831 may be interposed between the second plate 3820 and the support film layer 3840. According to an embodiment, at least part of the second plate 3820 may be formed of a metal material.

According to an embodiment, when viewed from above the second plate 3820 of the electronic apparatus, the antenna 3850 may overlap with the second area 3822 without overlapping with the first area 3821 of the second plate 3820.

Referring to (b) of FIG. 3I, the antenna 3850 may be surrounded by the dielectric layer 3832. In this case, the antenna 3850 may be interposed between the second plate 3820 (e.g., rear surface housing) and the first electrode 3831.

According to an embodiment, when viewed from above the second plate, the antenna 3850 may overlap with the second area 3822 of the second plate 3820.

According to an embodiment, a ground electrode may be further disposed under the support film layer 3840 or in the support film layer 3840. The ground electrode may be a part of the second electrode 3833 of the force sensor 3830. The second electrode 3833 of the force sensor 3830 may include at least part of the first area 3821 of the second plate 3820 and a ground electrode 3860.

FIG. 3J illustrates the stacked structure of a rear surface of an electronic apparatus including a force sensor according to an embodiment of the disclosure. FIG. 3K briefly illustrates the structure of a rear surface according to an embodiment of the disclosure.

Referring to FIGS. 3J and 3K, an antenna 3950 may include at least one of a first antenna 3951, a second antenna 3952, or a third antenna 3953, which is different from each other. According to an embodiment, the first antenna 3951 may be an inductive wireless charging antenna, and the second antenna 3952 may be at least one of an MST antenna or a resonant wireless charging antenna. The third antenna 3953 may be an NFC antenna.

According to an embodiment, an electronic apparatus may include a printed layer 3910, a second plate 3920 (e.g., rear surface housing), a force sensor 3930, or a support film layer 3940. The support film layer 3940 may be a FPCB. According to an embodiment, at least part of the second plate 3920 may be formed of a metal material.

According to an embodiment, a part of antennas may be interposed between the second plate 3920 and the support film layer 3940, and another part of antennas that do not pass through the second plate 3920 may be disposed adjacent to the side surface of the electronic apparatus.

Referring to FIG. 3J, the first antenna 3951 may surround a first electrode 3931 of the force sensor 3930, and the first electrode 3931 may surround the second antenna 3952. The first antenna 3951 and the second antenna 3952 may be disposed on the support film layer 3940, and the third antenna 3953 may be disposed on the side of the support film layer 3940.

According to an embodiment, the first electrode 3931 may be interposed between the first antenna 3951 and the second antenna 3952. A second electrode 3933 may be disposed in the second plate 3920.

According to an embodiment, the second plate 3920 may include a first area 3921 that operates as a ground, and a second area 3922 that is floated. When viewed from above the second plate of the electronic apparatus, the second area 3922 of the second plate 3920 may overlap with at least part of the antenna 3950. For example, the second area 3922 may overlap with the second antenna 3952. The second area 3922 may be divided from the first area 3921 by a slit. The first area 3921 may operate as the second electrode 3933 of the second plate 3920.

Referring to FIG. 3K, at least part of the antenna 3950 may be interposed between the support film layer 3940 and a dielectric layer 3932.

Referring to (a) of FIG. 3K, the first antenna 3951 may be disposed to surround the first electrode 3931, and the first electrode 3931 may be disposed to surround the second antenna 3952.

According to an embodiment, the first antenna 3951, the second antenna 3952, and the first electrode 3931 may be interposed between the dielectric layer 3932 and the support film layer 3940. For example, the second antenna 3952 may be disposed in an area corresponding to the second area 3922 of the second plate 3920. When viewed form above the second plate of an electronic apparatus, the second area 3922 and the second antenna 3952 may overlap with each other.

According to an embodiment, when viewed form above the second plate of an electronic apparatus, the first electrode 3931 and the first antenna 3951 may not overlap with the second area 3922, and may overlap with the first area 3921.

According to an embodiment, the third antenna 3953 may be disposed on the side of the support film layer 3940. For example, the third antenna 3953 may be disposed over the first electrode 3931 and the support film layer 3940.

Referring to (b) of FIG. 3K, at least one of the first antenna 3951 or the second antenna 3952 may be disposed to overlap with the second area 3922 and may be surrounded by the first electrode 3931.

FIGS. 3L and 3M illustrate a configuration of an electronic apparatus including a rear surface force sensor according to various embodiments of the disclosure. The electronic apparatus may not include the back glass, and a side surface housing 4023 of a metal material may be disposed.

Referring to FIGS. 3L and 3M, the remaining components other than the side surface housing 4023 and a third antenna 4053 of the electronic apparatus may be the same as or similar to components of an electronic apparatus of FIGS. 3J and 3K. The electronic apparatus may include a printed layer 4010, a second plate 4020 (e.g., rear surface housing), a rear surface force sensor 4030, or a support film layer 4040, and the components may be the same as or similar to the components of FIG. 3J, respectively. An antenna 4050 may include a first antenna 4051 to the third antenna 4053, and the first antenna 4051 and a second antenna 4052 among the first antenna 4051 to the third antenna 4053 may be the same as or similar to the first antenna 3951 and the second antenna 3952 of FIGS. 3J and 3K.

Referring to FIGS. 3L and 3M, a part of antennas that does not pass through the second plate 4020 of a metal material may be disposed on the side surface housing 4023. The third antenna 4053 (e.g., an NFC antenna) may be disposed on the side surface housing 4023 or may include at least part of the side surface housing 4023.

FIG. 3N illustrates arrangement of a force sensor of an electronic apparatus, according to an embodiment of the disclosure.

According to an embodiment, the configuration of an electronic apparatus of FIG. 3N may be applied to a foldable or flexible electronic apparatus. The foldable or flexible electronic apparatus may include a hinge 4170 that allows the foldable or flexible electronic apparatus to be folded or to be bent. The electronic apparatus may be divided by the hinge 4170 into two areas such as a first area 4101 and a second area 4102 (refer to FIG. 18). According to another embodiment, the flexible electronic apparatus may be divided into the first area 4101 and the second area 4102 without the hinge 4170.

According to an embodiment, the foldable or flexible electronic apparatus may include a force sensor in the remaining area other than the hinge 4170. For example, the electronic apparatus may include one force sensor or may include two force sensors. For example, two force sensors may be divided by the hinge 4170. The force sensor may be disposed in the first area 4101 and the second area 4102.

According to an embodiment, the arrangement of the force sensor in the first area 4101 and/or the second area 4102 of the electronic apparatus may be the same as the arrangement of the force sensor of FIG. 3D. Referring to FIG. 3N, the electronic apparatus may include a back glass 4110, a printed layer 4120, a support film layer 4130, a force sensor 4140, an antenna 4160, and a support member 4150. The detailed description thereof is thus omitted, because the components are respectively the same as or similar to the components of FIG. 3D, respectively.

FIGS. 4A and 4B are perspective views of a force sensor, according to various embodiments of the disclosure.

FIG. 4A is a perspective view of a self-capacitance type force sensor. FIG. 4B is a perspective view of a mutual capacitance type force sensor.

Referring to FIG. 4A, the self-capacitance-type force sensor may include a first electrode in the form of a plurality of repeating polygons (or circles), a second electrode extending over the entire area corresponding to the repeated plurality of polygons, and a dielectric layer interposed between the first electrode and the second electrode. The force sensor may sense the pressure based on a change in capacitance between each partial electrode in the first electrode and the second electrode. The locations or the shapes of the first electrode and the second electrode may be reversed.

Referring to FIG. 4B, the mutual-capacitance-type force sensor may include a first electrode extending in a first direction, a second electrode extending in a second direction substantially perpendicular to the first direction, and a dielectric layer interposed between the first electrode and the second electrode. The force sensor may sense the pressure based on a change in capacitance between the first electrode and the second electrode at the intersection of the first electrode and the second electrode. The locations or the shapes of the first electrode and the second electrode may be reversed.

According to an embodiment, the first electrode or the second electrode may be opaque or transparent. For example, when a user views the force sensor, objects positioned on the opposite side of the force sensor may not be visible (opaque) or visible (transparent). In the case where the first electrode or the second electrode is opaque, the first electrode or the second electrode may include at least one or the combination of two or more among Cu, Ag, Mg, or Ti. In the case where the first electrode or the second electrode is transparent, the first electrode or the second electrode may include at least one or the combination of two or more among indium tin oxide (ITO), indium zinc oxide (IZO), a polymer conductor, Graphene, an opaque wiring pattern having a specific line width or less (Ag Nanowire, Metal mesh, or the like).

According to an embodiment, the dielectric layer may include at least one of silicon, air, foam, membrane, optically clear adhesive (OCA), sponge, rubber, ink, or polymer (polycarbonate (PC), PET, or the like).

Hereinafter, a force sensor (e.g., the force touch panel 130 or 160 of FIG. 1) according to various embodiments will be described with reference to FIGS. 5A to 5E.

Figure 5A:
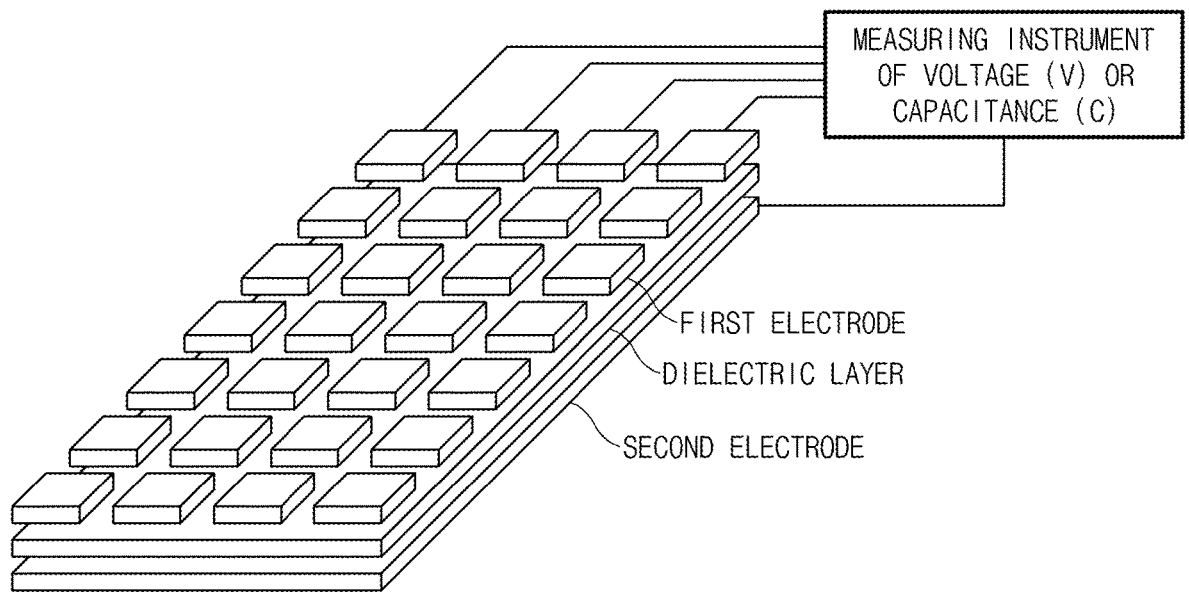
FIGS. 5A, 5B, 5C, 5D, and 5E illustrate force sensors, according to various embodiments of the disclosure.

FIG. 5A is a view illustrating a capacitive-type force sensor, according to an embodiment of the disclosure.

Referring to FIG. 5A, a capacitive-type force sensor including a self-capacitance scheme may sense the pressure based on the change in capacitance formed between the two electrodes depending on a user's pressure. The capacitance may increase as the distance between the two electrodes gets closer by the pressure of the user.

Figure 5B:
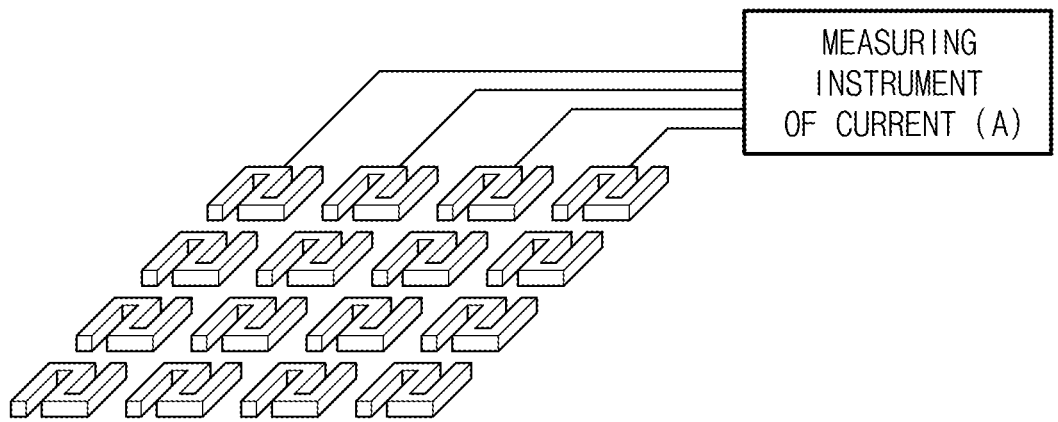

FIG. 5B is a view illustrating an inductive-type force sensor, according to an embodiment of the disclosure.

Referring to FIG. 5B, an inductive-type force sensor may sense the pressure based on changes in the current induced in an inductor (e.g., coil) depending on a user's pressure. The current may increase as the conductor (e.g., metal housing, a user's finger, or the like) approaches the inductor (e.g., coil), which is disposed inside the housing, by the pressure of the user.

Figure 5C:
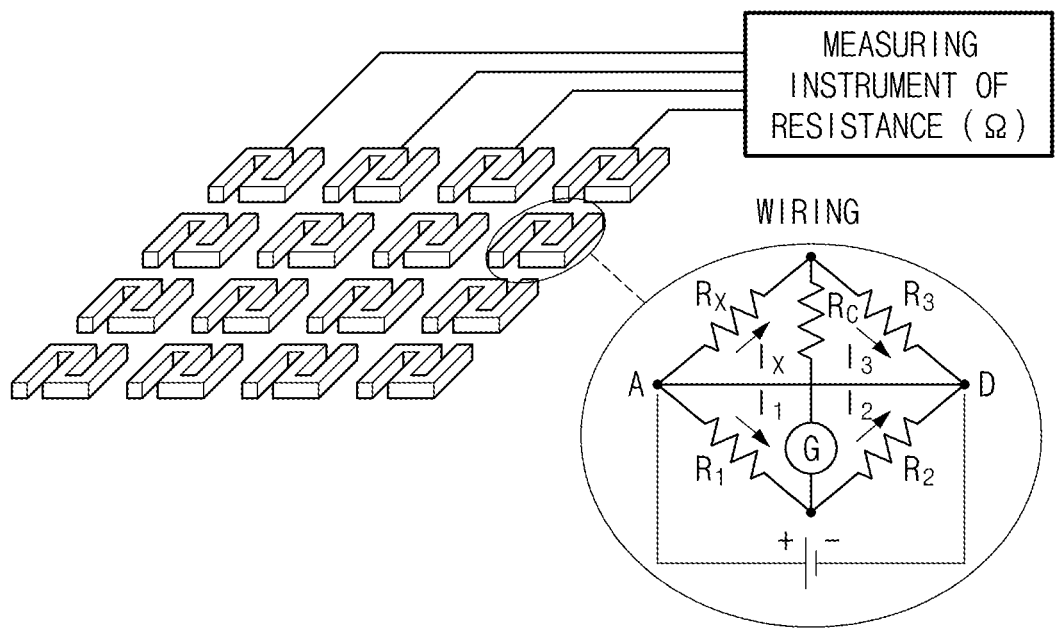

FIG. 5C is a view illustrating a strain-gauge-type force sensor, according to an embodiment of the disclosure.

Referring to FIG. 5C, a strain-gauge-type force sensor may sense the pressure based on the change in resistance of the conductor depending on a user's pressure. As the length of the conductor increases by the user's pressure, the cross-sectional area of the conductor may decrease. Therefore, the resistance may increase. The wiring may be formed in the form of a Wheatstone bridge such as a circuit diagram illustrated in the right.

Figure 5D:
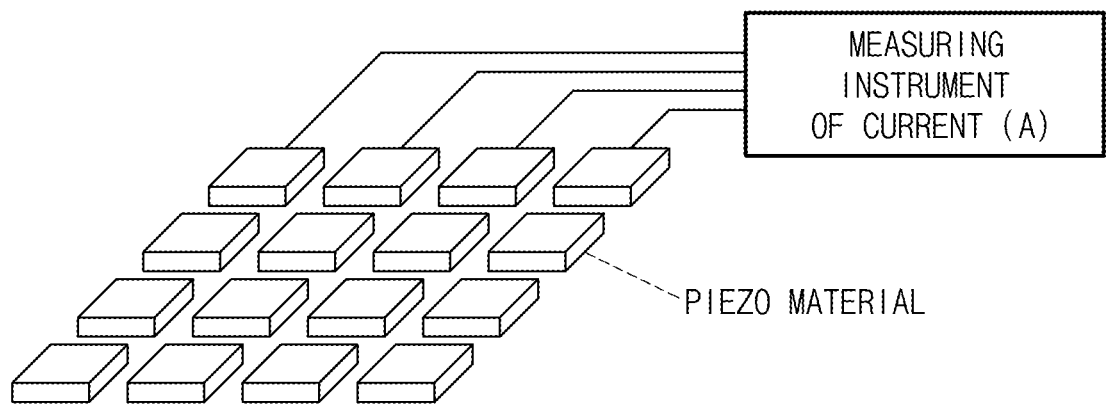
Figure 5E:
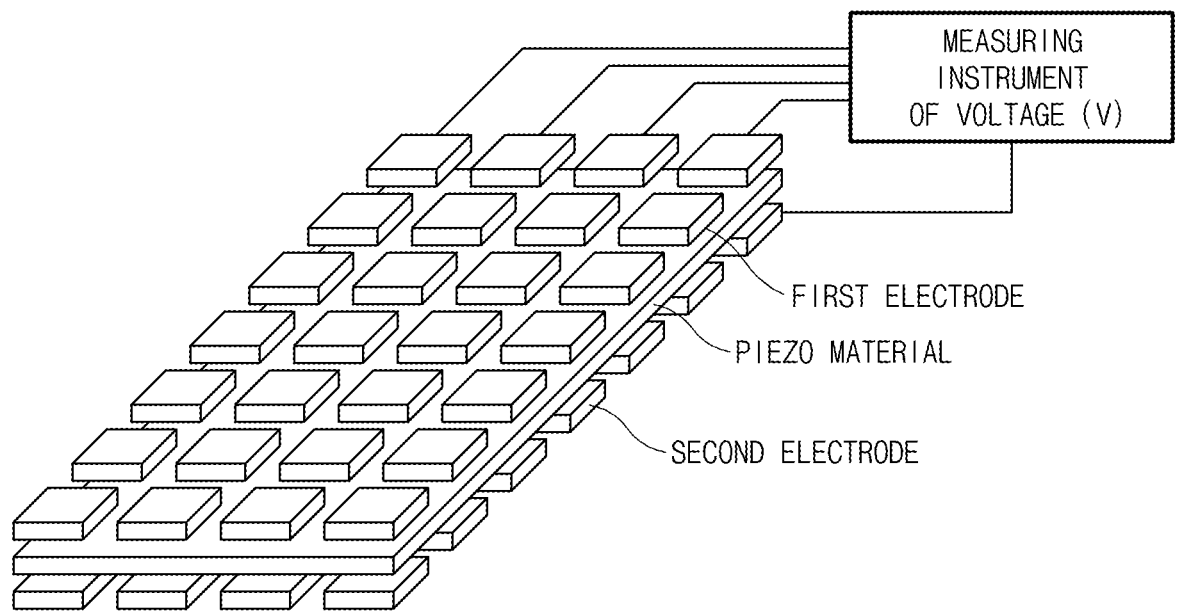

FIGS. 5D and 5E are views illustrating a piezo-type force sensor, according to various embodiments of the disclosure.

Referring to FIGS. 5D and 5E, a piezo-type force sensor may sense the pressure based on the current difference or the voltage difference generated by the piezo material according to a user's pressure. The current difference or the voltage difference may increase as the amount of current converted by the piezo material increases depending on the pressure of the user.

Figure 6:
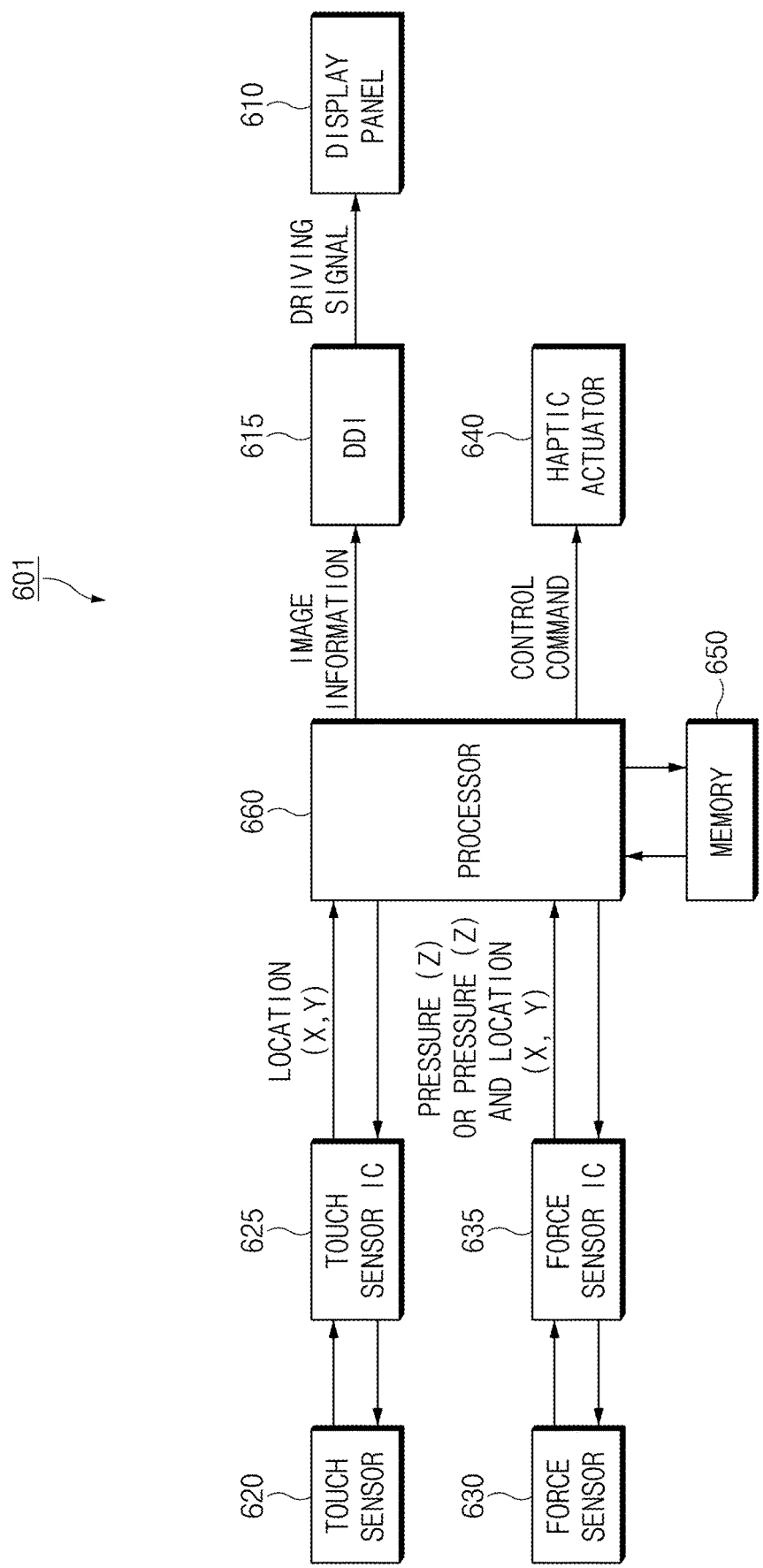
FIG. 6 illustrates a block diagram of an electronic apparatus according to an embodiment of the disclosure.

FIG. 6 illustrates a block diagram of an electronic apparatus according to an embodiment of the disclosure.

Referring to FIG. 6, an electronic apparatus 601 according to an embodiment may include a display panel 610, a display driving integrated circuit (IC) (DDI) 615, a touch sensor 620, a touch sensor IC 625, a force sensor 630, a force sensor IC 635, a haptic actuator 640, a memory 650, and a processor 660. With regard to FIGS. 1 to 5, duplicated descriptions of corresponding configurations may be omitted.

According to an embodiment, the display panel 610 may receive an image driving signal supplied with the DDI) 615. The display panel 610 may display a variety of content and/or item (e.g., a text, an image (object), a video, an icon, a functional object, a symbol, or the like) in response to the image driving signal. In the disclosure, the display panel 610 may be combined to overlap with the touch sensor 620 and/or the force sensor 630 (e.g., refer to FIG. 2), which is simply referred to as a "display".

According to an embodiment, the DDI 615 may supply the display panel 610 with an image driving signal corresponding to image information received from the processor (host) 660, at a set frame rate. Although not illustrated in FIGS. 4A and 4B, according to various embodiments, the DDI 615 may include a graphic RAM, an interface module, an image processing unit, a multiplexer, a display timing controller (T-con), a source driver, a gate driver, and/or an oscillator.

According to an embodiment, in the touch sensor 620, a specified physical quantity (e.g., a voltage, the amount of light, resistance, the amount of charge, capacitance, or the like) may vary due to a touch from the user. According to an embodiment, the touch sensor 620 may be disposed to overlap with the display panel 610.

According to an embodiment, the touch sensor IC 625 may sense a change in the physical quantity in the touch sensor 620 and may calculate a location (X,Y), at which a touch is made, based on the change in the physical quantity (e.g., voltage, resistance, capacitance, or the like). The calculated location (or coordinates) may be provided (or reported) to the processor 660.

According to an embodiment, the touch sensor 620 may include a front surface touch sensor and a rear surface touch sensor. For example, the touch sensor IC 625 may include a first touch sensor IC and a second touch sensor IC for the front surface touch sensor and the rear surface touch sensor, respectively.

According to various embodiments of this disclosure, when a portion (e.g., a finger) of a user's body, an electronic pen, or the like makes contact with a cover glass (e.g., the cover glass 210 of FIG. 2) of a display, a coupling voltage between a transmitting terminal Tx and a receiving terminal Rx included in the touch sensor 620 may vary. For example, the variation in the coupling voltage may be sensed by the touch sensor IC 625, and the touch sensor IC 625 may provide coordinates (X, Y) of a position, at which the touch is made, to the processor 660. The processor 660 may obtain data of the coordinates (X, Y) as an event associated with a user input.

According to an embodiment, the touch sensor IC 625 may be referred to as a touch IC, a touch screen IC, a touch controller, a touch screen controller IC, or the like. According to various embodiments, in an electronic apparatus in which the touch sensor IC 625 is not included, the processor 660 may perform a role of the touch sensor IC 625. According to various embodiments, the touch sensor IC 625 and the processor 660 may be implemented with one configuration (e.g., one-chip).

According to an embodiment, the force sensor 630 may detect pressure (or force) by an external object (e.g., a finger or an electronic pen). According to an embodiment, in the force sensor 630, a physical quantity (e.g., capacitance) between the transmitting terminal Tx (e.g., the first electrode of FIG. 5A) and the receiving terminal Rx (e.g., the second electrode of FIG. 5A) may vary due to the touch.

According to an embodiment, the force sensor IC 635 may sense the change in the physical quantity (e.g., capacitance, or the like) in the force sensor 630 and may calculate pressure "Z", which is applied by the touch of the user, based on the change in the physical quantity. The pressure "Z" may be provided to the processor 660. The pressure "Z" may be provided to the processor 660 together with the location (X, Y) at which the touch is made. The force sensor IC 635 may calculate the location (X, Y) at which the touch is made or at which a pressure is generated, as well as the pressure 'Z'. The pressure "Z" may be provided to the processor 660. The pressure "Z" may be provided to the processor 660 together with the location (X, Y) at which the pressure input is entered.

According to an embodiment, the force sensor 630 may include the front surface force sensor and the rear surface force sensor. For example, the force sensor IC 635 may include a first force sensor IC and a second force sensor IC for the front surface force sensor and the rear surface force sensor, respectively.

According to various embodiments, the force sensor IC 635 may be referred to as a "force touch controller", a "force sensor IC", a "pressure panel IC", or the like. According to various embodiments, the force sensor IC 635 and the touch sensor IC 625 may be implemented with one configuration (e.g., one-chip).

According to an embodiment, the haptic actuator 640 may provide a user with a haptic feedback (e.g., vibration) in response to a control command of the processor 660. For example, when a touch input (e.g., including a touch, a hovering, and a "force touch") is received from the user, the haptic actuator 640 may provide the user with a haptic feedback.

According to an embodiment, the memory 650 may store commands or data associated with an operation of a component included in the electronic apparatus 601. According to various embodiments of the disclosure, the memory 650 may store at least one application program that includes a user interface configured to display a plurality of items on a display. For example, the memory 650 may store instructions that, when executed, cause the processor 660 to perform various operations (e.g., refer to FIGS. 7 to 8) disclosed in this specification.

According to an embodiment, the processor 660 may be electrically connected with the components 610 to 650 included in the electronic apparatus 601 to perform operations or data processing associated with control and/or communication of the components 610 to 650 included in the electronic apparatus 601.

According to an embodiment, the processor 660 may launch (or execute) an application program (also referred simply to as an "application") that displays a user interface in the display panel 610. The processor 660 may output the item to a user interface displayed in the display panel 610 in response to the launching of the application.

The above-described operations of the processor 660 are, but are not limited to, an example. For example, operations of a processor described in other parts of this specification should be understood as operations of the processor 660. In the disclosure, at least some of operations described as operations of an "electronic apparatus" should be understood as operations of the processor 660.

According to an embodiment, an electronic apparatus (e.g., the electronic apparatus 601 of FIG. 1) may include a housing (e.g., the housing 101 of FIG. 1) including a first plate facing a first direction and a second plate facing a second direction opposite to the first direction, a display (e.g., the display 102 of FIG. 1) exposed through the first plate, a first force sensor (e.g., the first force touch panel 130 of FIG. 1) disposed inside the housing and disposed under the display, a second force sensor (e.g., the second force touch panel 180 of FIG. 1) physically spaced apart from the first force sensor and adjacent to the second plate, a processor (e.g., the processor 660 of FIG. 6) positioned inside the housing and electrically connected to the display, the first force sensor, and the second force sensor, and a memory (e.g., the memory 650 of FIG. 6) electrically connected to the processor and positioned inside the housing.

According to an embodiment, the memory may store instructions that, when executed, cause the processor to display a screen including an item (e.g., the target object 1011 of FIG. 9) on the display, to obtain a first pressure input (e.g., the pressure input 1000 of FIG. 10) for the item in the second force sensor, and to display an operation associated with the second force sensor on the display in response to the first pressure input.

According to an embodiment, the instructions, when executed, may cause the processor to obtain a pressure level of the first pressure input and to determine a variation in the item based on the pressure level.

According to an embodiment, the instructions, when executed, may cause the processor to obtain a second pressure input (e.g., the pressure input 900 of FIG. 9) from the first force sensor and to display an operation associated with the first force sensor on the display in response to the second pressure input.

According to an embodiment, the instructions, when executed, may cause the processor to obtain a third pressure input (e.g., the front surface input 1100a of FIG. 11) from the first force sensor and a fourth pressure input (e.g., the rear surface input 1100b of FIG. 11) from the second force sensor and to display an operation associated with the third pressure input and the fourth pressure input on the display.

According to an embodiment, an operation associated with the first force sensor may be a magnification operation.

According to an embodiment, an operation associated with the second force sensor may be a reduction operation.

According to an embodiment, an operation associated with the third pressure input and the fourth pressure input may be a selection operation.

According to an embodiment, the instructions, when executed, may cause the processor to determine an operation associated with a type based on the type of the item.

According to an embodiment, the item may be a two-dimensional (2D) item or a three-dimensional (3D) item.

According to an embodiment, the instructions, when executed, may cause the processor to determine a range of an operation associated with the first force sensor, based on the first pressure input.

According to an embodiment, a range of the operation may include a first range including the item and a second range not including the item.

According to an embodiment, the instructions, when executed, may cause the processor to determine a variation of the item for the respective range.

According to an embodiment, a pressure input may include a pressure location at which a pressure is generated, and the instructions, when executed, may cause the processor to determine a range of an operation associated with the first force sensor, based on the pressure location.

According to an embodiment, the instructions, when executed, may cause the processor to determine an operation to be performed based on a pressure area in which a pressure is generated.

According to an embodiment, the instructions, when executed, may cause the processor to determine the operation depending on a combination of a pressure input of the first force sensor or a pressure input of the second force sensor.

According to an embodiment, the item may include at least one of an image, a text, an icon, or a folder.

According to an embodiment, an electronic apparatus (e.g., the electronic apparatus 601 of FIG. 6) may include a housing (e.g., the housing 101 of FIG. 1) including a first plate, a second plate, and a side member surrounding a space between the first plate and the second plate and including a side surface member attached on or formed integrally with the second plate, a touch screen display (e.g., the touch screen display 110 of FIG. 1) exposed through the first plate, a force sensor (e.g., the second force touch panel 180 of FIG. 1) detecting a pressure applied to the second plate by a user, a processor (e.g., the processor 660 of FIG. 6) operatively connected to the display and the force sensor and disposed inside the housing; and a memory (e.g., the memory 650 of FIG. 6) disposed inside the housing, operatively connected to the processor, and storing instructions.

According to an embodiment, the instructions, when executed, may cause the processor to display a user interface on the display, to detect a location and a pressure of a user input on the second plate by using at least the force sensor, and to enlarge a part of the user interface based on the detected location and the detected pressure.

According to an embodiment, the user interface may include a text (e.g., the target object 911 of FIG. 9), and the part of the user interface may include a part of the text.

According to an embodiment, the user interface may include at least one icon and a text associated with the icon, and the part of the user interface may include the at least one icon and the text.

According to an embodiment, the instructions may cause the processor to reduce the enlarged part to a normal size, based on a change in the detected pressure, after enlarging the part.

According to an embodiment, an electronic apparatus (e.g., the electronic apparatus 601 of FIG. 18) may include a housing (e.g., the housing 101 of FIG. 1) including a first plate facing one direction and a second plate opposite to the first plate, in an unfolded state, a flexible display (e.g., the touch screen display 110 of FIG. 1) exposed through at least part of the first plate of the housing and including a first area (e.g., the first area 1801 of FIG. 18) and a second area (e.g., the second area 1802 of FIG. 18), which face different directions from each other, as the electronic apparatus is bent, a force sensor (e.g., the first force touch panel 130 of FIG. 1 or the second force touch panel 180 of FIG. 1) disposed inside the housing and obtaining a pressure applied by a user through the display, a processor (e.g., the processor 660 of FIG. 6) positioned inside the housing and electrically connected to the display and the force sensor, and a memory (e.g., the memory 650 of FIG. 6) electrically connected to the processor.

According to an embodiment, the memory may store instructions that, when executed, cause the processor to obtain a pressure through at least part of the second area of the display by using at least part of the force sensor in a state where the electronic apparatus is bent and to execute a function associated with at least part of the first area corresponding to the at least part of the second area, based on the obtained pressure.

Figure 7:
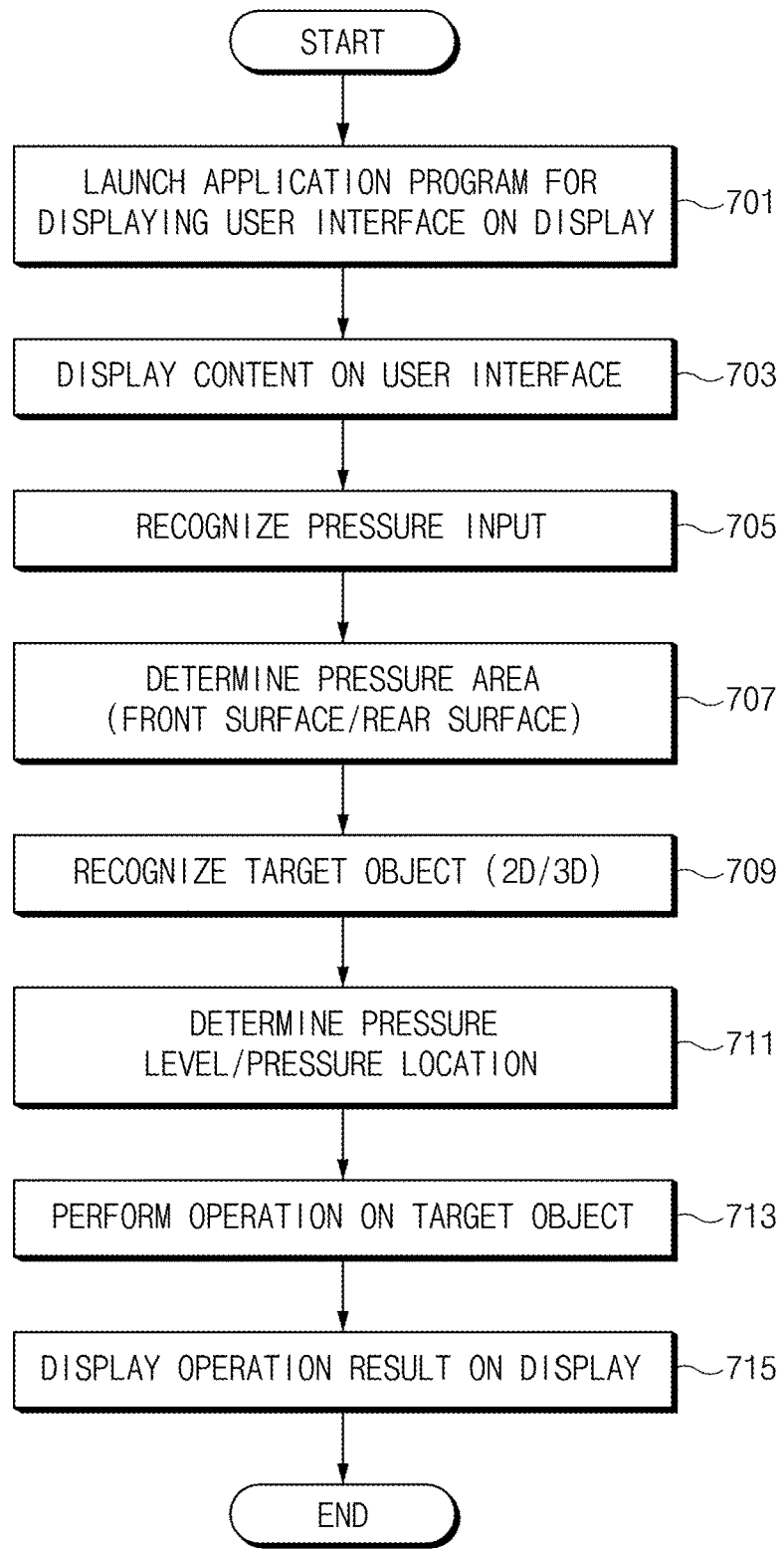
FIG. 7 illustrates an operation flowchart of an electronic apparatus for a pressure input, according to an embodiment of the disclosure.

FIG. 7 illustrates an operation flowchart of an electronic apparatus for a pressure input, according to an embodiment the disclosure.

Referring to FIG. 7, an electronic apparatus (e.g., the electronic apparatus 601 or the processor 660 of FIG. 6) may perform at least part of operation 701 to operation 715 described below. For example, each of operation 701 to operation 715 may be implemented with instructions capable of being performed (or executed) by the processor of the electronic apparatus. The instructions may be stored in, for example, a computer-readable recording medium or the memory (e.g., the memory 650 of FIG. 6) of the electronic apparatus illustrated in FIG. 6.

In operation 701, the electronic apparatus may launch (or execute) an application program to display a user interface on a display (e.g., the display panel 610 of FIG. 6). For example, the electronic apparatus may render the user interface on a display depending on the activity included in the application program.

In operation 703, the electronic apparatus may display at least one item (e.g., an icon, an image (object), a text (object), or a functional object) on the user interface. The electronic apparatus may display the arrangement of the item. For example, the at least one item may be displayed simultaneously with the user interface.

In operation 705, the electronic apparatus may recognize a pressure input. The electronic apparatus may obtain the pressure input and may recognize the pressure input. For example, the electronic apparatus may obtain a pressure intensity 'z' or a pressure location (x, y) from a force sensor or may obtain the pressure intensity 'z' from the force sensor and then may obtain the pressure location (x, y) from a touch sensor. When obtaining the pressure input, the electronic apparatus may recognize the pressure input.

In operation 707, the electronic apparatus may determine a pressure area. The pressure area may be an area in which a pressure is generated. For example, the pressure area may include a front surface or a rear surface. For example, the electronic apparatus may determine whether the pressure area is the front surface, the rear surface, or the front surface and the rear surface, based on the pressure input. For example, when the pressure location is (x, y), the electronic apparatus may determine that the pressure is generated on the front surface; when the pressure location is (−x, −y), the electronic apparatus may determine that the pressure is generated on the rear surface.

In operation 709, the electronic apparatus may recognize a target object. For example, the target object may include an item that is the target of the operation of an electronic apparatus. For example, the electronic apparatus may determine the target object based on the pressure input obtained in operation 705. According to an embodiment, the target object may correspond to the pressure location (x, y). According to an embodiment, the electronic apparatus may determine the type of the target object. For example, the target object may be a 2D item or a 3D item.

In operation 711, the electronic apparatus may determine at least one of a pressure level, a pressure location, or a pressure movement range. For example, the electronic apparatus may determine at least one of the pressure level, the pressure location, or the pressure movement range, based on the pressure input. At least one of the pressure level, the pressure location, and the pressure movement range may be referred to as an operating parameter. The pressure level may be determined based on the pressure 'Z' of FIG. 6.

In operation 713, the electronic apparatus may perform an operation on the target object. For example, the electronic apparatus may perform an operation on the target object based on at least part of a pressure area obtained in operation 707, a target object recognized in operation 709, and/or an operating parameter (e.g., the pressure level, the pressure location, or the pressure movement range) obtained in operation 711. For example, when the pressure area obtained in operation 705 is a front surface pressure, the electronic apparatus may reduce the target object depending on the pressure level determined in operation 711. The electronic apparatus may perform an operation based on the type of the target object obtained in operation 709. For example, when the target object is a 2D item, the electronic apparatus may enlarge or reduce the target object based on the pressure level. For another example, when the target object is a 3D item, the electronic apparatus may apply a 3D effect to the 3D item based on the pressure level.

In operation 715, the electronic apparatus may display the operation result on a display. For example, the electronic apparatus may display the change of the item on the display. For example, when a front surface input is generated, the electronic apparatus may reduce the target object to display the reduced target object on the display.

According to various embodiments of the disclosure, the operations performed by the electronic apparatus or the processor may be variously changed. A part of operations may be skipped and the sequence of a part of operations may be changed. For example, operation 701 and operation 703 may be skipped. In a state where a screen is turned off, the electronic apparatus may recognize a front or rear surface pressure input.

Figure 8:
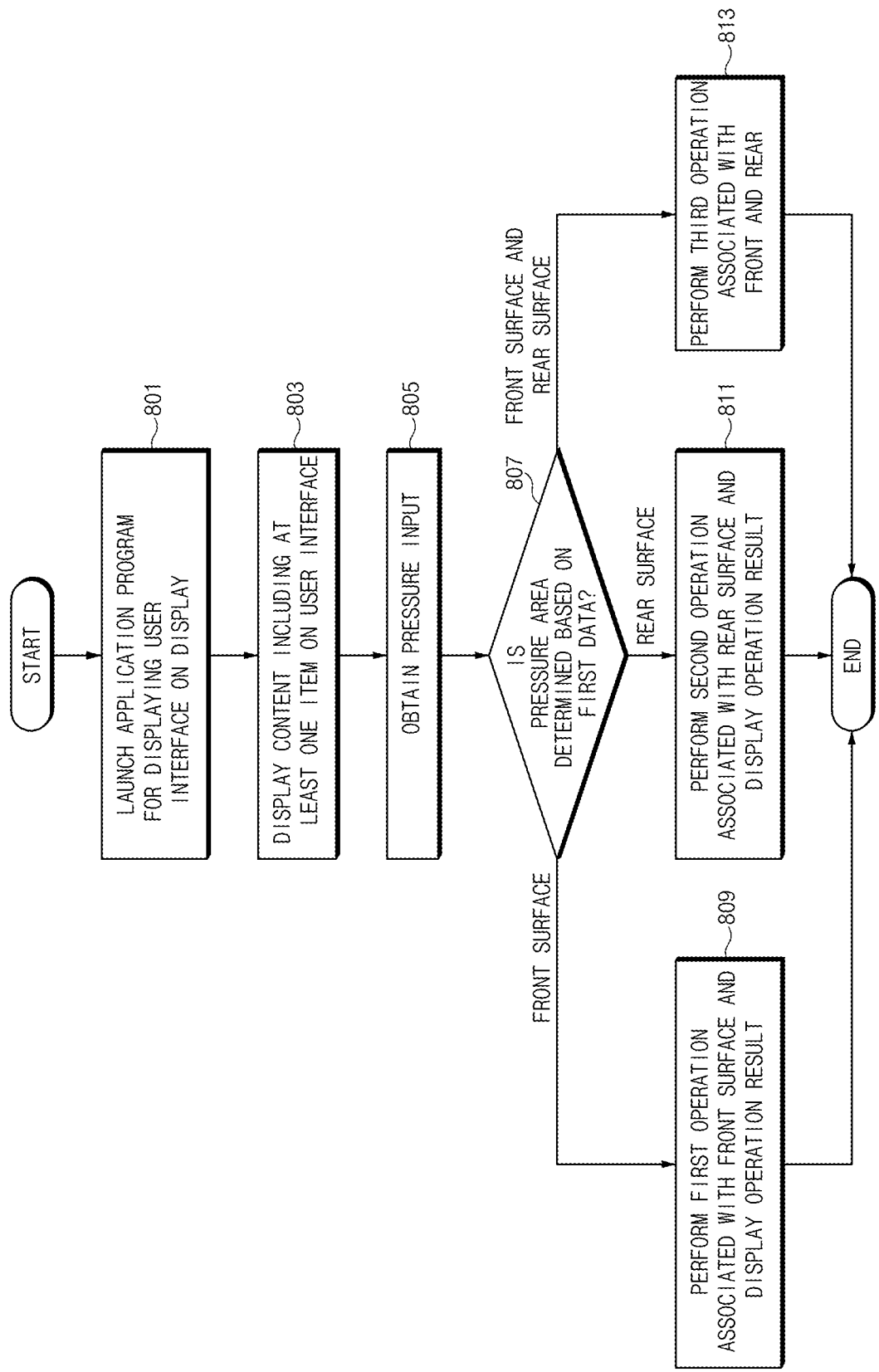
FIG. 8 illustrates an operation flowchart of an electronic apparatus for a pressure input, according to an embodiment of the disclosure.

FIG. 8 illustrates an operation flowchart of an electronic apparatus for a pressure input, according to an embodiment the disclosure.

Referring to FIG. 8, an electronic apparatus (e.g., the electronic apparatus 601 or the processor 660 of FIG. 6) may perform at least part of operation 801 to operation 813 described below. For example, each of operation 801 to operation 813 may be implemented with instructions capable of being performed (or executed) by the processor of the electronic apparatus. The instructions may be stored in, for example, a computer-readable recording medium or the memory (e.g., the memory 650 of FIG. 6) of the electronic apparatus illustrated in FIG. 6.

According to an embodiment, the electronic apparatus may perform an operation different depending on a pressure area. Herein, the type of an operation performed for each pressure area may be set. The type of an operation performed for each pressure area may be stored in the memory.

In operation 801, the electronic apparatus may launch (or execute) an application program to display a user interface on a display (e.g., the display panel 610 of FIG. 6).

In operation 803, the electronic apparatus may display at least one item (e.g., an icon, an image (object), a text (object), or a functional object) on the user interface.

In operation 805, the electronic apparatus may obtain a pressure input. For example, the electronic apparatus may obtain the pressure input from the touch sensor 620 of FIG. 6 and/or the force sensor 630 of FIG. 6. The pressure input may include the location coordinates (X, Y) of the pressure and/or the magnitude of the pressure 'Z'. According to an embodiment, the touch sensor may include a front surface touch sensor and a rear surface touch sensor. According to an embodiment, the force sensor may include a front surface force sensor and a rear surface force sensor. At this time, the electronic apparatus may simultaneously receive pressure inputs from sensors disposed on the front surface and the rear surface.

In operation 807, the electronic apparatus may determine a pressure area. The electronic apparatus may determine whether the pressure is generated on the front surface or the rear surface, based on the pressure input.

Hereinafter, in operation 809 to operation 813, the electronic apparatus may perform an operation associated with the pressure area in response to the pressure input. According to an embodiment, an electronic apparatus may perform an operation associated with the combination of pressure areas from sensors. The operation associated with the pressure area may be a set operation.

When the pressure input is a front surface input, in operation 809, the electronic apparatus may perform a first operation associated with the front surface input and may display the result obtained by performing the first operation, on a display. For example, the first operation may be an operation of reducing an item.

When the pressure input is a rear surface input, in operation 811, the electronic apparatus may perform a second operation associated with the rear surface input. The electronic apparatus may display the result obtained by performing the second operation, on the display. For example, the second operation may be an operation of enlarging an item.

When the pressure input is the front surface input and the rear surface input, in operation 813, the electronic apparatus may perform a third operation associated with the front surface input and rear surface input. The electronic apparatus may perform the third operation depending on the combination of the front surface input and the rear surface input and may display the result obtained by performing the third operation, on the display. For example, the third operation may be an operation of selecting an item and enlarging the selected item.

According to various embodiments of the disclosure, the operations performed by the electronic apparatus or the processor may be variously changed. A part of operations may be skipped and the sequence of a part of operations may be changed. For example, operation 801 and operation 803 may be skipped. In a state where a screen is turned off, the electronic apparatus may recognize a front or rear surface pressure input.

Figure 9:
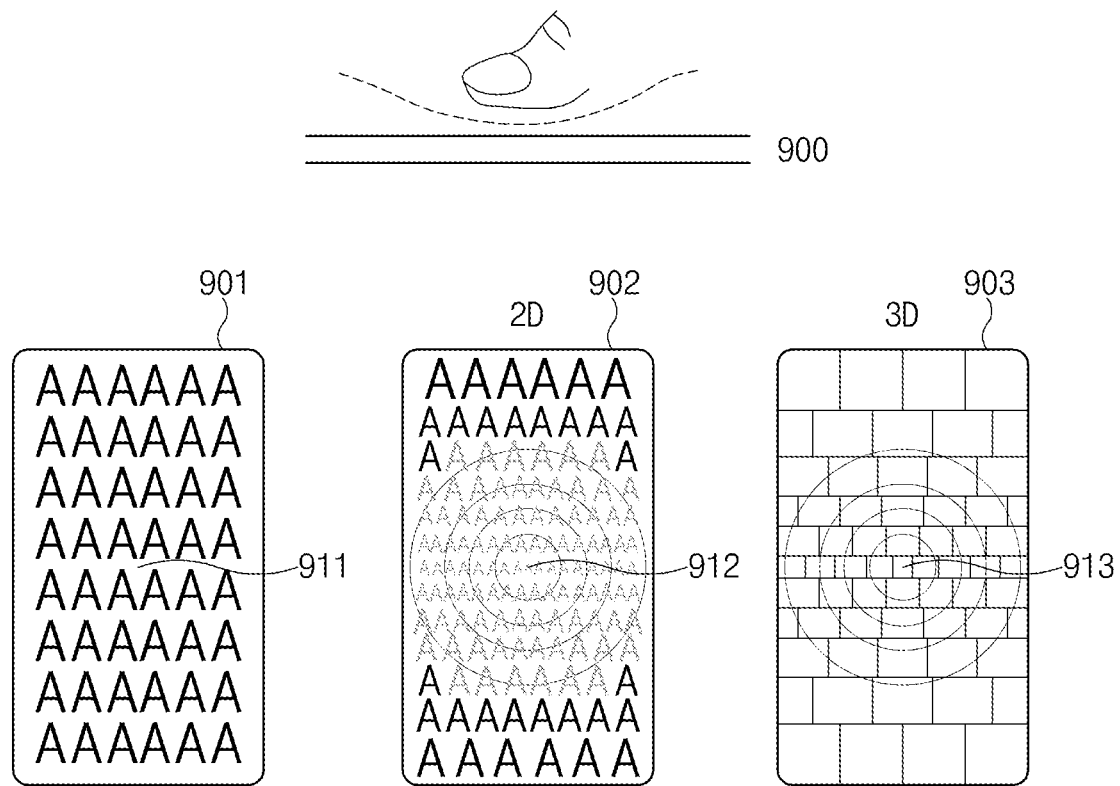
FIGS. 9, 10, and 11 are views for describing an operation execution result of an electronic apparatus for a pressure input, according to various embodiments of the disclosure.
Figure 10:
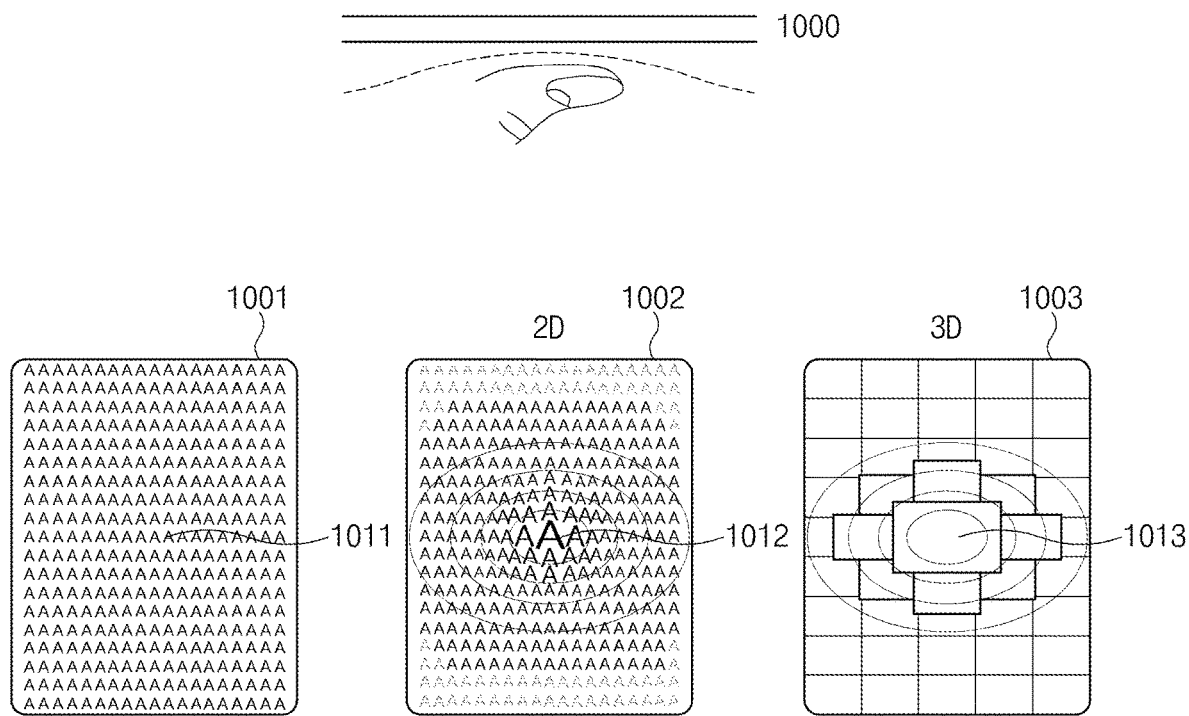
Figure 11:
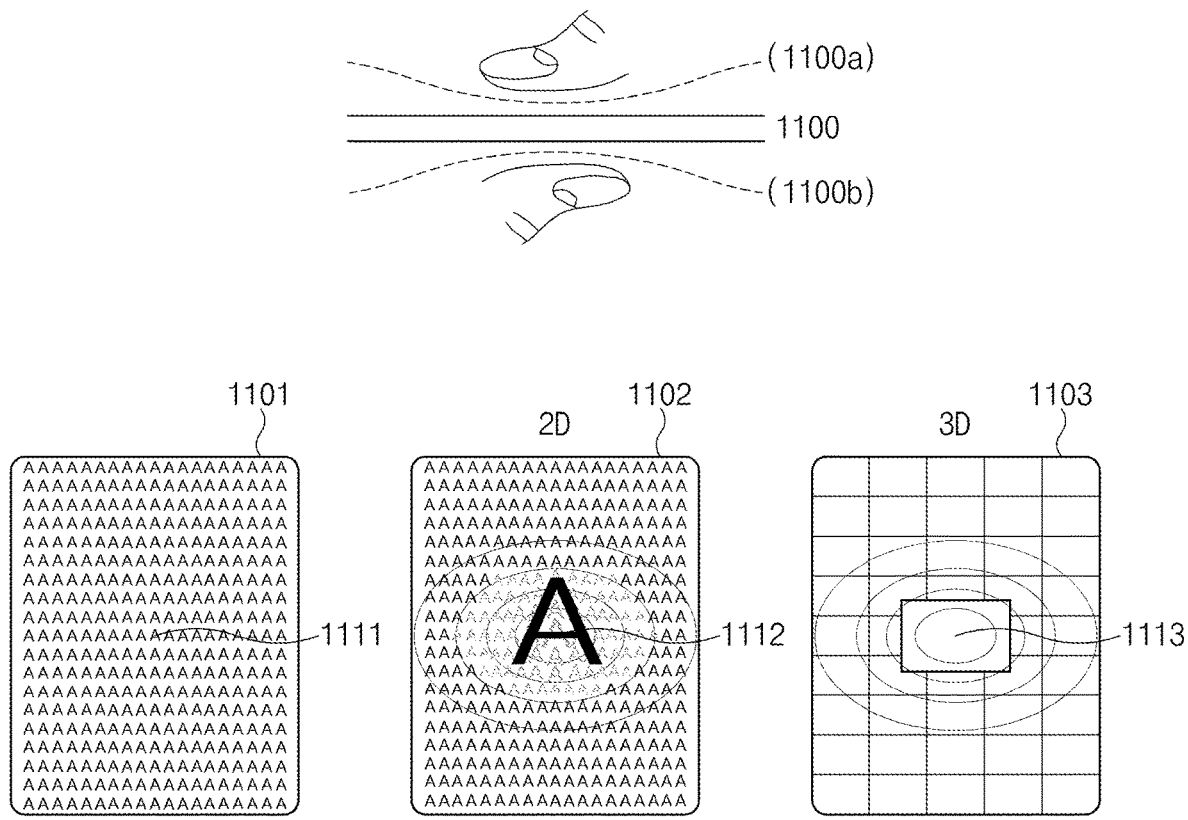

FIGS. 9 to 11 are views for describing an operation execution result of an electronic apparatus for a pressure input, according to various embodiments the disclosure. FIG. 9 illustrates a response of an electronic apparatus for a front surface input according to an embodiment of the disclosure. FIG. 10 illustrates a response of an electronic apparatus for a rear surface input according to an embodiment of the disclosure. FIG. 11 illustrates a response of an electronic apparatus for the front surface input and the rear surface input according to an embodiment of the disclosure.

Referring to FIG. 9, an electronic apparatus (e.g., the electronic apparatus 601 of FIG. 6) may execute an application program. Screen 901 may be displayed on the display (e.g., the display panel 610 of FIG. 6) of the electronic apparatus by the execution.

According to an embodiment, the electronic apparatus may determine a pressure location and a pressure level based on the pressure input 900 sensed by a touch sensor (e.g., the touch sensor 620 of FIG. 6) and/or force sensor (e.g., the force sensor 630 of FIG. 6).

According to an embodiment, the electronic apparatus may determine the target object 911 based on the pressure input 900. The electronic apparatus may determine the target object 911 based on the pressure location and/or the pressure area. For example, the electronic apparatus may determine the target object 911 based on the pressure location. For example, the target object 911 may include an item corresponding to at least one pressure location. According to an embodiment, the electronic apparatus may determine the target object 911 based on the pressure area. For example, as illustrated in FIG. 9, when the pressure area corresponds to a front surface pressure or a rear surface pressure, the target object 911 may be the determined specific range; as illustrated in FIG. 11, when the pressure area corresponds to a front or rear surface pressure, the target object 911 may be a specific item.

According to an embodiment, the electronic apparatus may perform an operation associated with the pressure area obtained with respect to the determined target object 911 and may display the operation execution result on a screen.

According to an embodiment, when the pressure input 900 is a front surface input, a first operation associated with the front surface input may be a reduction operation. When obtaining the front surface pressure input 900, the electronic apparatus may perform the first operation associated with the front surface input and may display screen 902 or screen 903 including results 912 and 913 obtained by performing the first operation, on a display. When obtaining the front surface pressure input 900, the electronic apparatus may reduce the target object 911 and may display screen 902 or screen 903 including the reduction of the target object 911 or the result in which the target object 911 is reduced, on a display. The first operation associated with the front surface input may include a transparency operation. For example, when obtaining the front surface pressure input 900, the electronic apparatus may reduce the target object 911 and may make the target object 911 transparent. The operation associated with the front surface input may be an operation associated with the front surface force sensor.

According to an embodiment, the electronic apparatus may perform an operation different depending on the type of the target object 911. For example, the electronic apparatus may determine a reduction operation, may determine whether the target object 911 is a 2D item or a 3D item, and may perform a related operation based on the determination result. When determining the first operation, the electronic apparatus may further consider the type of the target object 911. When the target object 911 is the 2D item, the electronic apparatus may perform the first operation (e.g., processing of reduction or processing of transparency) associated with the 2D item and may display screen 902 including the result 912 obtained by performing the second operation, on the display. When the target object 911 is the 3D item, the electronic apparatus may perform the first operation associated with the 3D item and may display screen 903 including the result 913 obtained by performing the first operation, on the display.

According to an embodiment, the target object 911 may be a specific item corresponding to the pressure location or the pressure input 900 and may be a specific range determined based on the pressure location or the pressure input 900. The range may include a range determined based on at least the magnitude or the location of the pressure.

According to an embodiment, the electronic apparatus may determine an operation level for the respective plurality of ranges with respect to the target object 911. The operation level may be an operation level for the first operation.

According to an embodiment, the electronic apparatus may determine a plurality of ranges based on the magnitude of the pressure input 900. For example, the plurality of ranges may include a first range and a second range. The electronic apparatus may determine the plurality of ranges based on the magnitude of the pressure input 900 or the radius from a location at which the pressure input 900 is generated. For example, in the case where the magnitude of the pressure input 900 satisfies a first condition, the electronic apparatus may determine that a range within a first radius from the generation location is a first range; in the case where the magnitude of the pressure input 900 satisfies a second condition, the electronic apparatus may determine that a range between the first radius and a second radius is a second range.

According to an embodiment, the electronic apparatus may determine a first operation level with respect to the first range and may determine a second operation level with respect to the second range. For example, the amount of operation or the amount of change of the target object 911 according to the first operation level may be greater than the amount of operation or the amount of change of the target object 911 according to a second operation level.

Referring to FIG. 10, an electronic apparatus (e.g., the electronic apparatus 601 of FIG. 6) may execute an application program. Screen 1001 may be displayed on the display (e.g., the display panel 610 of FIG. 6) of the electronic apparatus by the execution.

According to an embodiment, the electronic apparatus may determine a pressure location and a pressure level based on the pressure input 1000 sensed by a touch sensor (e.g., the touch sensor 620 of FIG. 6) and/or force sensor (e.g., the force sensor 630 of FIG. 6). The electronic apparatus may determine the target object 1011 based on the pressure input 1000. For example, the electronic apparatus may determine the target object 1011 based on the pressure location. For example, the target object 1011 may include an item corresponding to the pressure location.

According to an embodiment, the electronic apparatus may perform an operation associated with the pressure area obtained with respect to the determined target object 1011 and may display a screen including the operation execution result on a display.

According to an embodiment, when the pressure input 1000 is a rear surface input, the electronic apparatus may perform a second operation associated with the rear surface input. The second operation may be a magnification operation. When obtaining the rear surface input, the electronic apparatus may enlarge the target object 1011 and may display screen 1002 or screen 1003 indicating a magnification operation of the target object 1011 and/or the magnification results 1012 and 1013 on a display. The second operation associated with the rear surface input may include a transparency operation. For example, when obtaining the rear surface input, the electronic apparatus may enlarge the target object 1011. For another example, the electronic apparatus may make the peripheral area of the target object 1011 transparent. The second operation associated with the rear surface input may be an operation associated with the rear surface force sensor.

According to an embodiment, the electronic apparatus may perform an operation different depending on the type of the target object 1011. For example, when determining the second operation, the electronic apparatus may determine whether the target object 1011 is a 2D item or a 3D item, and may perform a related operation based on the determination result. When the target object 1011 is the 2D item, the electronic apparatus may perform the second operation (e.g., processing of magnification or processing of transparency) associated with the 2D item and may display screen 1002 including the result 1012 obtained by performing the second operation, on the display. When the target object 1011 is the 3D item, the electronic apparatus may perform the second operation associated with the 3D item and may display screen 1003 including the result 1013 obtained by performing the second operation, on the display.

According to an embodiment, the electronic apparatus may determine the operation level for each range determined based on the level of the pressure input 1000. The operation level may be an operation level for the second operation.

According to an embodiment, the electronic apparatus may determine a plurality of ranges based on the level of the pressure input 1000. For example, the plurality of ranges may include a first range and a second range. The electronic apparatus may determine the plurality of ranges based on the magnitude of the pressure input 1000 or the radius from a location at which the pressure input 900 is generated. For example, in the case where the magnitude of the pressure input 1000 satisfies a first condition, the electronic apparatus may determine that a range within a first radius from the generation location is a first range; in the case where the magnitude of the pressure input 900 satisfies a second condition, the electronic apparatus may determine that a range between the first radius and a second radius is a second range.

According to an embodiment, the electronic apparatus may determine a first operation level with respect to the first range and may determine a second operation level with respect to the second range. For example, the operation level may indicate the amount of operation (or the amount of change) or an increment. For example, the increment of the second range may be greater than the increment of the first range.

Referring to FIG. 11, an electronic apparatus (e.g., the electronic apparatus 601 of FIG. 6) may execute an application program. Screen 1101 may be displayed on the display (e.g., the display panel 610 of FIG. 6) of the electronic apparatus by the execution.

According to an embodiment, the electronic apparatus may determine a pressure location and a pressure level based on a pressure input 1100 sensed by a touch sensor (e.g., the touch sensor 620 of FIG. 6) and/or force sensor (e.g., the force sensor 630 of FIG. 6). The electronic apparatus may determine a target object 1111 based on the pressure input 1100.

According to an embodiment, the electronic apparatus may determine the target object 1111 based on the pressure input 1100. For example, the electronic apparatus may determine the target object 1111 based on a pressure location and/or a pressure area.

According to an embodiment, the pressure input 1100 may include a front surface input 1100a and a rear surface input 1100b. When obtaining the front surface input 1100a and the rear surface input 1100b, the electronic apparatus may determine the target object 1111. For example, the electronic apparatus may determine that the target object 1111 is a specific item corresponding to the pressure input 1100.

According to an embodiment, the electronic apparatus may perform a third operation associated with the pressure input 1100 in response to the front surface input 1100a and the rear surface input 1100b. The electronic apparatus may perform the third operation on the determined target object 1111 and may display screen 1102 or screen 1103 including results 1112 and 1113 obtained by performing the first operation, on a display. The third operation may be an operation associated with a front surface force sensor and a rear surface force sensor.

According to an embodiment, the third operation may be a selection operation. The third operation may include an operation of enlarging only the selected target object 1111. According to an embodiment, the third operation may perform an operation of selecting the target object 1111 and may display screen 1102 including the selected result, on the display. The third operation associated with the front surface input 1100*a* and the rear surface input 1100*b* may include magnification and transparency operations. For example, when obtaining the pressure input 1100, the electronic apparatus may select the target object 1111 and may enlarge and display the selected target object 1111. For another example, the electronic apparatus may make at least part of an area in which the selected target object 1111 is displayed, transparent and may display the at least part of the area.

According to an embodiment, in a state where the electronic apparatus maintains screen 1101, the electronic apparatus may display additional screen 1102 including the result 1112 obtained by performing a third operation, on the display. The electronic apparatus may overlap the result 1112 obtained by performing a third operation, with screen 1101 including the target object 1111.

According to an embodiment, the electronic apparatus may perform an operation different depending on the type of the target object 1111. The electronic apparatus may differently perform the third operation depending on whether the target object 1111 is a 2D item or a 3D item. For example, the third operation may include an operation of determining whether the item is a 2D item or a 3D item and determining the third operation based on the item type.

According to an embodiment, the electronic apparatus may determine the type (e.g., 2D item or 3D item) of the target object 1111 and may determine an operation based on the determination result. When the target object 1111 is the 2D item, the electronic apparatus may perform the third operation associated with the 2D item and may display screen 1102 including the result 1112 obtained by performing the third operation, on the display. When the target object 1111 is the 3D item, the electronic apparatus may perform the third operation associated with the 3D item and may display screen 1103 including the result 1113 obtained by performing the third operation, on the display.

According to an embodiment, after displaying the result 1112 obtained by performing the third operation, the electronic apparatus may maintain additional screen 1102 or additional screen 1103 even though the pressure input 1100 is not made any more. For another example, the electronic apparatus may move the result 1112 obtained by performing the third operation, by using a touch. For another example, in a state where the electronic apparatus maintains screen 1101, the electronic apparatus may move screen 1102 or may move the result 1112 obtained by performing the third operation, on screen 1102.

Figure 12:
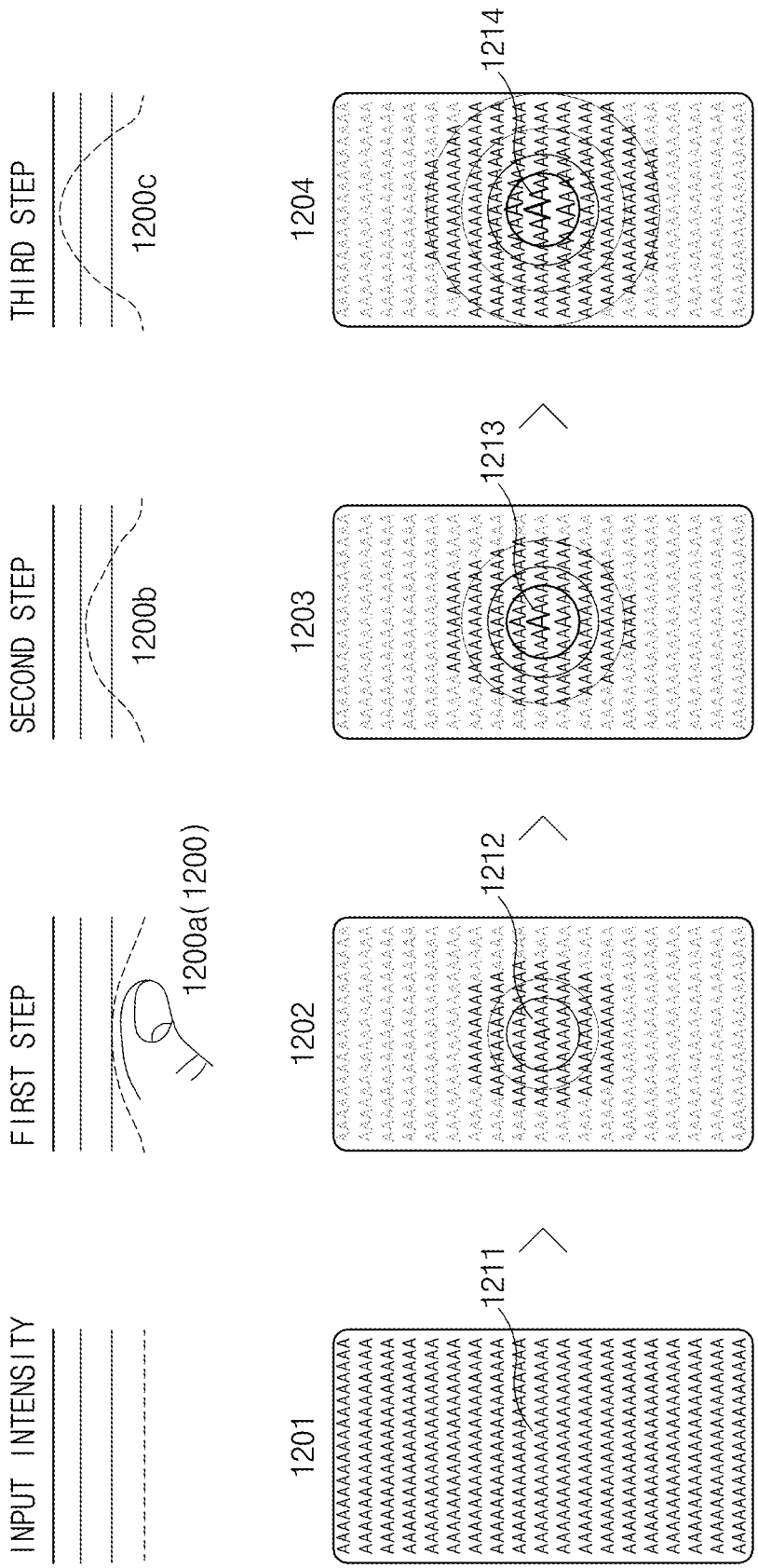
FIG. 12 is a view for describing an operation execution result of an electronic apparatus according to a pressure level, according to an embodiment of the disclosure.

FIG. 12 is a view for describing an operation execution result of an electronic apparatus according to a pressure level, according to an embodiment of the disclosure.

As illustrated in FIG. 10, FIG. 12 may illustrate an operation of an electronic apparatus (e.g., the electronic apparatus 601 of FIG. 6) in the case where a pressure input 1200 is a rear surface input. A part of operations of the electronic apparatus in FIG. 12 may be the same as or similar to the operation of the electronic apparatus in FIG. 10. However, the part of operations to be described below may be performed on the electronic apparatus of FIG. 9 or 11 as well as the rear surface input of FIG. 10.

According to an embodiment, the electronic apparatus may determine a pressure level based on a pressure input 1200 sensed by a touch sensor (e.g., the touch sensor 620 of FIG. 6) and/or force sensor (e.g., the force sensor 630 of FIG. 6). According to an embodiment, the electronic apparatus may determine the operation level of a first operation (e.g., magnification operation) based on a pressure level. For example, the operation level may indicate the increment of the target object 1211.

According to an embodiment, the operation level may include a plurality of operation levels, for example, first to third operation levels. For example, the first to third operation levels may be values different from each other. Each of the first to third operation levels may be a specified value for each pressure level.

According to an embodiment, when a pressure intensity 'z' in a force sensor (e.g., the force sensor 630 of FIG. 6) increases, the pressure level may increase from pressure level 1 to pressure level 3, and the operation level may increase from operation level 1 to operation level 3. For example, as the operation level increases, the variation of a result 1212 obtained by performing a first operation may increase. For example, the target object 1211 of display screen 1201 may be enlarged and displayed at level 3 rather than level 1.

According to an embodiment, when the pressure level is a first level 1200*a*, the electronic apparatus may determine that the operation level is a first operation level. The electronic apparatus may perform the first operation on the target object 1211 depending on the first operation level and may display screen 1202 including a result 1212 obtained by performing the first operation, on a display.

According to an embodiment, when the pressure level is a second level 1200*b*, the electronic apparatus may determine that the operation level is a second operation level. The electronic apparatus may perform the first operation on the target object 1211 depending on the second operation level and may display screen 1203 including a result 1213 obtained by performing the first operation, on the display.

According to an embodiment, when the pressure level is a third level 1200*c*, the electronic apparatus may determine that the operation level is a third operation level. The electronic apparatus may perform the first operation on the target object 1211 depending on the third operation level and may display screen 1204 including a result 1214 obtained by performing the first operation of the third operation level, on the display.

Figure 13:
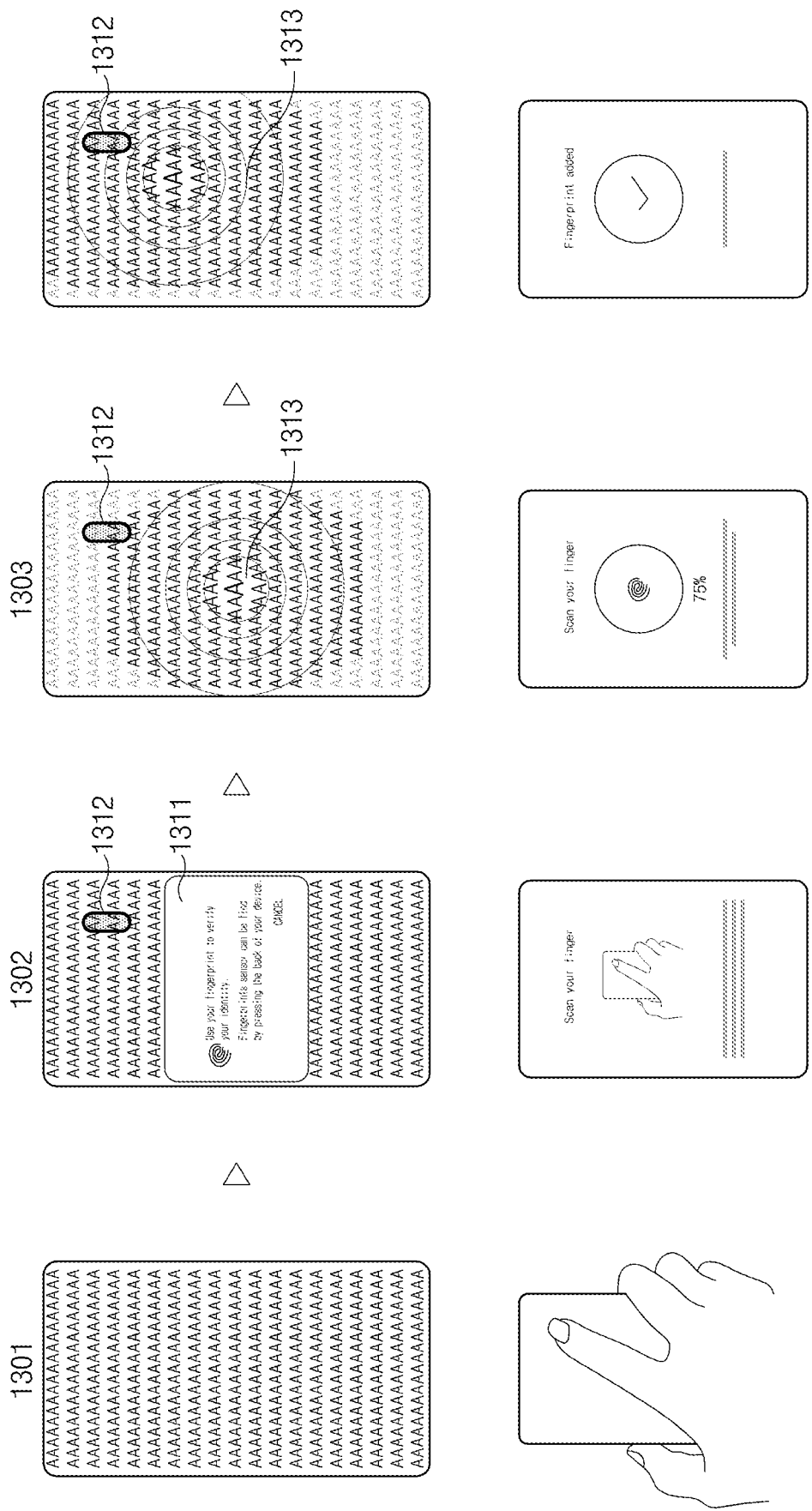
FIG. 13 is a view for describing an operation execution result of an electronic apparatus for a pressure input, according to an embodiment of the disclosure.

FIG. 13 is a view for describing an operation execution result of an electronic apparatus for a pressure input, according to an embodiment of the disclosure.

According to an embodiment, the operation of an electronic apparatus using the input of a rear surface force sensor may be utilized to induce a user operation on a rear surface. In an embodiment below, the electronic apparatus (e.g., the electronic apparatus 100 of FIG. 1) may include a fingerprint sensor on the rear surface.

Referring to FIG. 13, the electronic apparatus (e.g., the electronic apparatus 601 of FIG. 6) may execute an application program (e.g., a fingerprint authentication application). Screen 1301 may be displayed on the display (e.g., the display panel 610 of FIG. 6) of the electronic apparatus by the execution.

According to an embodiment, the electronic apparatus may display screen 1302 including a first object 1311 for requesting a user's operation. For example, the first object 1311 may be content for requesting a fingerprint input for fingerprint recognition.

According to an embodiment, screen 1302 may further include a second object 1312 for inducing a rear surface input of the user. For example, the second object 1312 may be an object associated with the fingerprint sensor. The second object 1312 may indicate the location of the fingerprint sensor. The location of the fingerprint sensor may be stored in a memory.

According to an embodiment, when obtaining a user's pressure input, the electronic apparatus may display screen 1303 including a result 1313 obtained by performing an operation on the pressure input, on a display. The user may watch the second object 1312 and the result 1313 obtained by performing the operation and then may determine the location of the fingerprint sensor on the rear surface.

Figure 14:
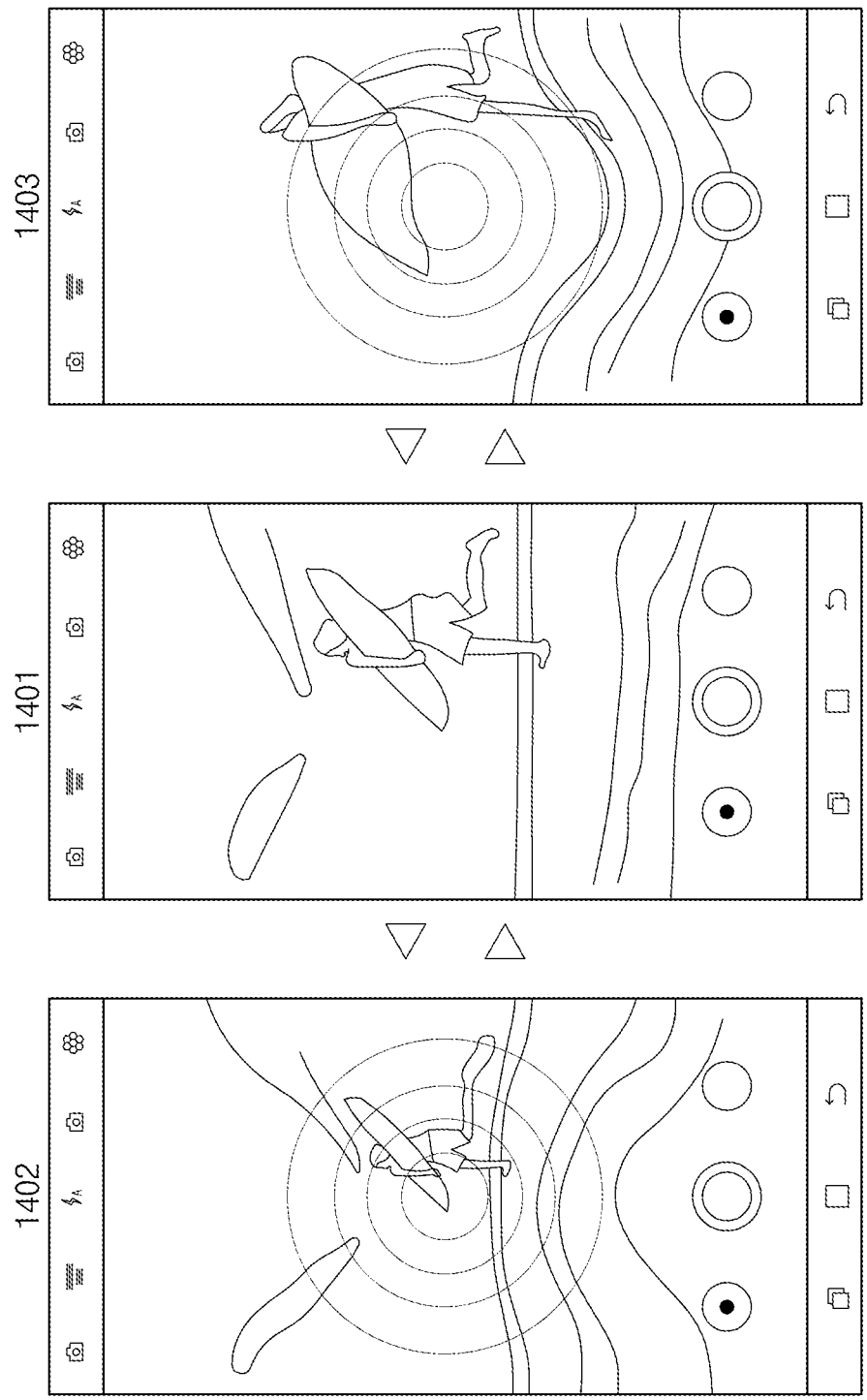
FIG. 14 is a view for describing an operation execution result of an electronic apparatus for a pressure input, according to an embodiment of the disclosure.

FIG. 14 is a view for describing an operation execution result of an electronic apparatus for a pressure input, according to an embodiment of the disclosure.

Referring to FIG. 14, the electronic apparatus (e.g., the electronic apparatus 601 of FIG. 6) may execute an application program (e.g., a photo application or camera application). Screen 1401 may be displayed on the display (e.g., the display panel 610 of FIG. 6) of the electronic apparatus by the execution.

According to an embodiment, the electronic apparatus may apply a reduction filter in response to the front surface pressure input of a user and may apply a magnification filter in response to the rear pressure input of the user. The reduction filter may reduce a target object in response to a user input, and the magnification filter may enlarge the target object in response to the user input.

According to an embodiment, when the electronic apparatus obtains a front surface pressure input, the electronic apparatus may perform an operation of reducing an object, which corresponds to the pressure input, and may display the result obtained by performing the operation, on screen 1402.

According to an embodiment, when the electronic apparatus obtains a rear surface pressure input, the electronic apparatus may perform an operation of enlarging an object, which corresponds to the pressure input, and may display the result obtained by performing the operation, on screen 1403.

Figure 15:
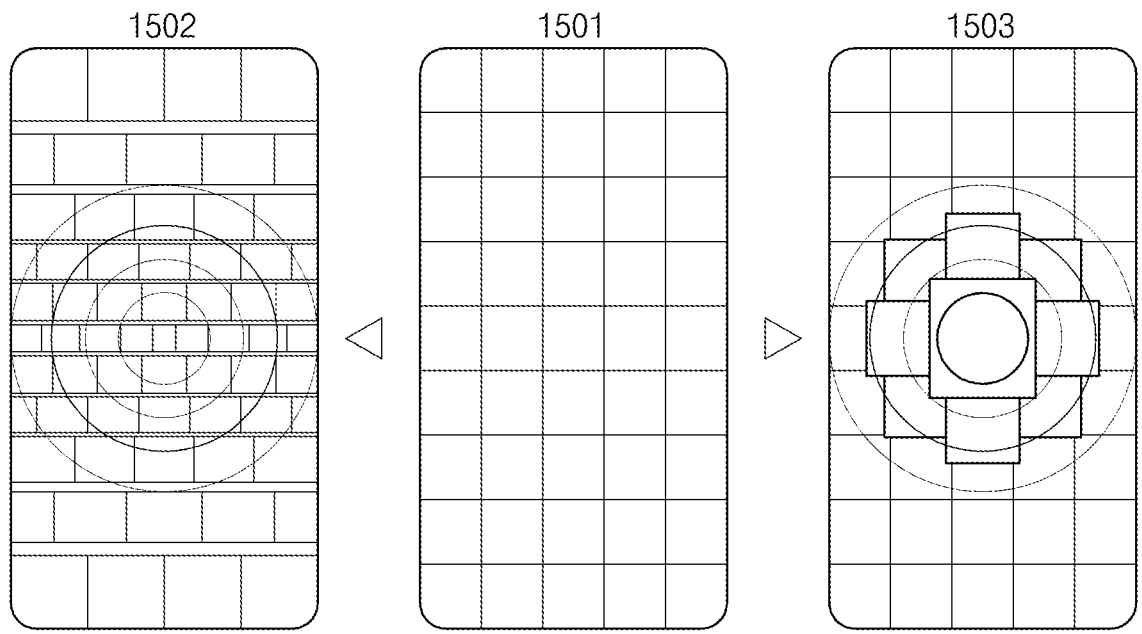
FIG. 15 is a view for describing an operation execution result of an electronic apparatus for a pressure input, according to an embodiment of the disclosure.

FIG. 15 is a view for describing an operation execution result of an electronic apparatus for a pressure input, according to an embodiment of the disclosure.

According to an embodiment, an electronic apparatus may provide a function using a front surface pressure and a rear surface pressure in an application providing a 3D item. Referring to FIG. 15, the electronic apparatus (e.g., the electronic apparatus 601 of FIG. 6) may execute an application program (e.g., a game application). Screen 1501 may be displayed on the display (e.g., the display panel 610 of FIG. 6) of the electronic apparatus by the execution.

According to an embodiment, when the electronic apparatus obtains a front surface pressure input, the electronic apparatus may determine that a target object is a 3D item. The electronic apparatus may determine the pressure area and the 3D object, may perform a reduction operation associated with the 3D item, and may display the result obtained by performing the operation, on screen 1502.

According to an embodiment, when the electronic apparatus obtains a rear surface pressure input, the electronic apparatus may determine that the target object is the 3D object, may perform a magnification operation associated with the 3D item, and may display the result obtained by performing the operation, on screen 1503.

Figure 16:
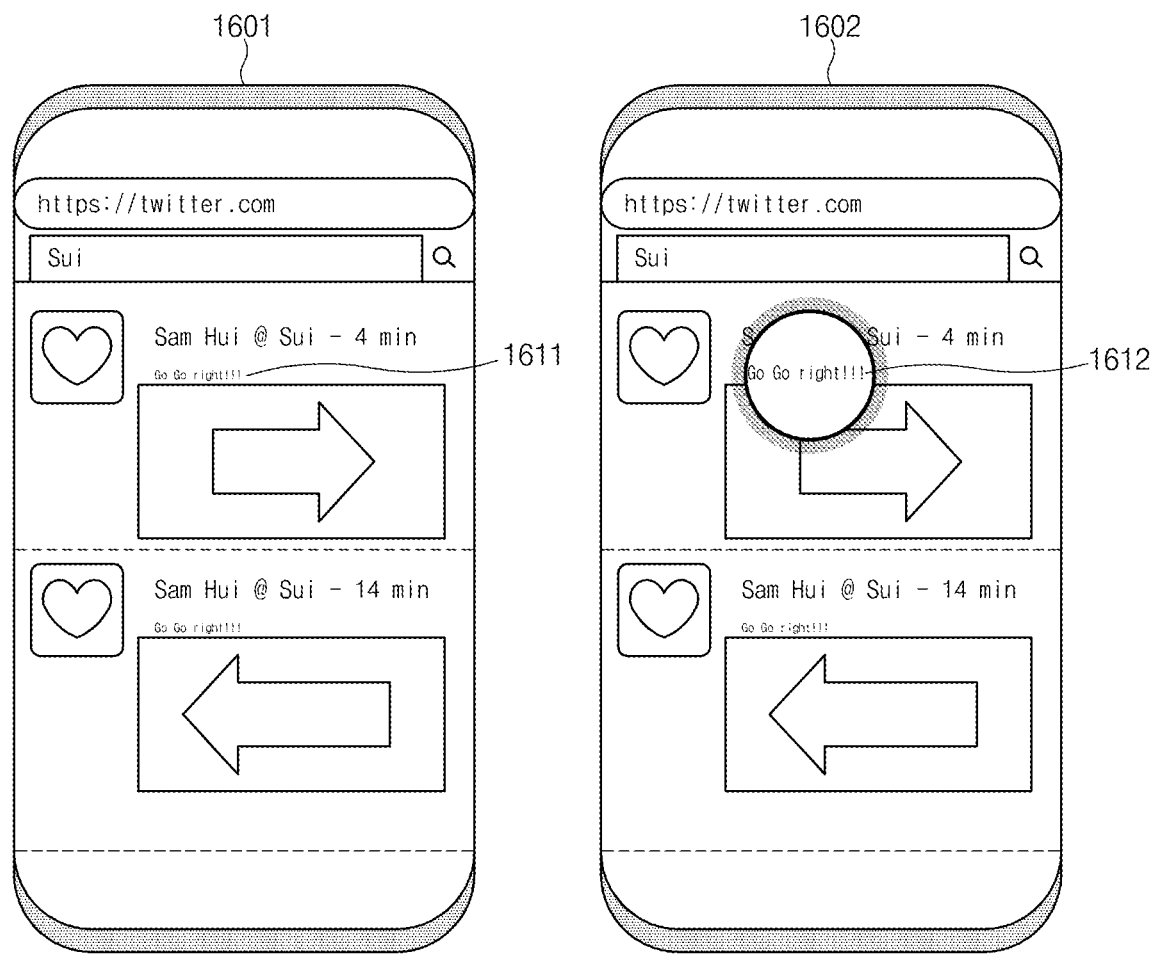
FIG. 16 is a view for describing an operation of an electronic apparatus for a pressure input and an operation execution result, according to an embodiment of the disclosure.

FIG. 16 is a view for describing an operation of an electronic apparatus for a pressure input and an operation execution result, according to an embodiment of the disclosure.

According to an embodiment, an electronic apparatus (e.g., the electronic apparatus 601 of FIG. 6) may provide a magnifier function using a front surface pressure and/or a rear surface pressure. Referring to FIG. 16, the electronic apparatus may execute an application program (e.g., a search program) including a target object. Screen 1601 may be displayed on a display (e.g., the display panel 610 of FIG. 6) of the electronic apparatus by the execution.

According to an embodiment, when the electronic apparatus obtains a pressure input, the electronic apparatus may determine a target object 1611 based on a pressure input and may perform an operation associated with the pressure input, on the target object 1611. For example, when the pressure input is a rear surface pressure, the electronic apparatus may execute the magnifier function.

According to an embodiment, the electronic apparatus may enlarge the target object in response to a rear surface pressure input. According to an embodiment, when obtaining the rear surface pressure input, the electronic apparatus may display the result obtained by executing the magnifier function associated with the rear surface pressure input, on screen 1602.

According to an embodiment, when the rear surface pressure input is generated, the electronic apparatus may maintain a state where a target object 1612 is enlarged. Even while the rear surface pressure input is absent, the electronic apparatus may activate the enlargement state of the target object 1612. When a pressure input is applied again, the electronic apparatus may deactivate the state where the target object 1612 is enlarged and may display screen 1601. The pressure input may include a rear surface pressure input and/or a front surface pressure input.

Figure 17:
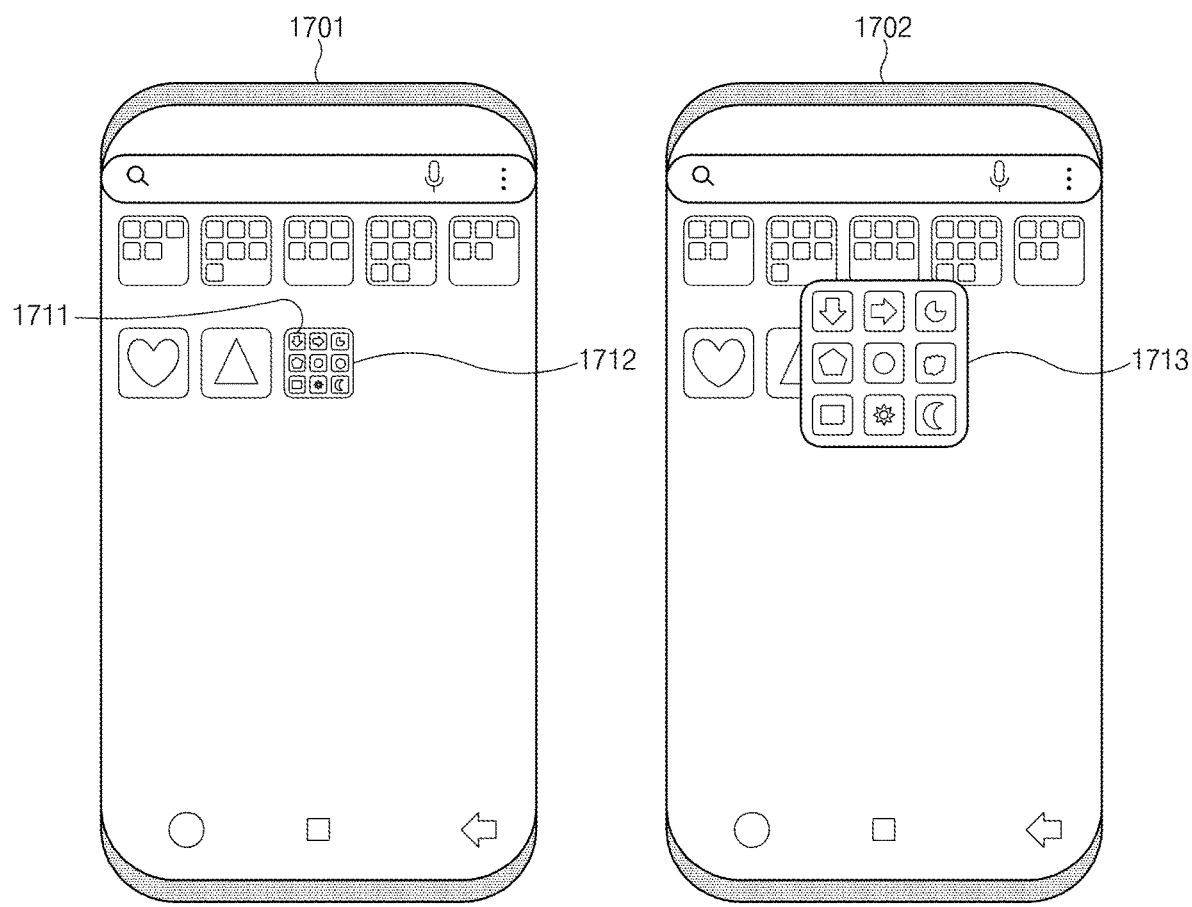
FIG. 17 is a view for describing an operation of an electronic apparatus and an operation execution result, according to an embodiment of the disclosure.

FIG. 17 is a view for describing an operation of an electronic apparatus and an operation execution result, according to an embodiment of the disclosure.

According to an embodiment, an electronic apparatus (e.g., the electronic apparatus 601 of FIG. 6) may provide a function to enlarge a target object, using a front surface pressure and/or a rear surface pressure. Referring to FIG. 17, the electronic apparatus may enlarge an icon 1712 or a folder 1711 including the icons 1712. According to an embodiment, the icon 1712 may be content for executing an application. The folder 1711 may include the icons 1712.

The electronic apparatus may display screen 1701 including the icon 1712 and/or the folder 1711, in a display (e.g., the display panel 610 of FIG. 6). The electronic apparatus may display screen 1701 in response to a user input.

When the electronic apparatus obtains a pressure input for the folder 1711 in a state where screen 1701 is displayed, the electronic apparatus may enlarge the folder 1711 in response to the pressure input. The electronic apparatus may display screen 1702 may display a result 1713 obtained by performing an operation in which the folder 1711 is enlarged, on a display. The pressure input may be a rear surface pressure input. A user may verify the situation in the folder 1711, by using the pressure input.

According to an embodiment, when the rear surface pressure input is generated, the electronic apparatus may maintain the result 1713 obtained by performing an operation on the folder 1711. Even while the rear surface pressure input is absent, the electronic apparatus may activate the state where the folder 1711 is enlarged. When obtaining a pressure input again, the electronic apparatus may interrupt an operation of maintaining the state where the folder 1711 is enlarged, and may display screen 1701. The pressure input may include a rear surface pressure input and/or a front surface pressure input.

Figure 18:
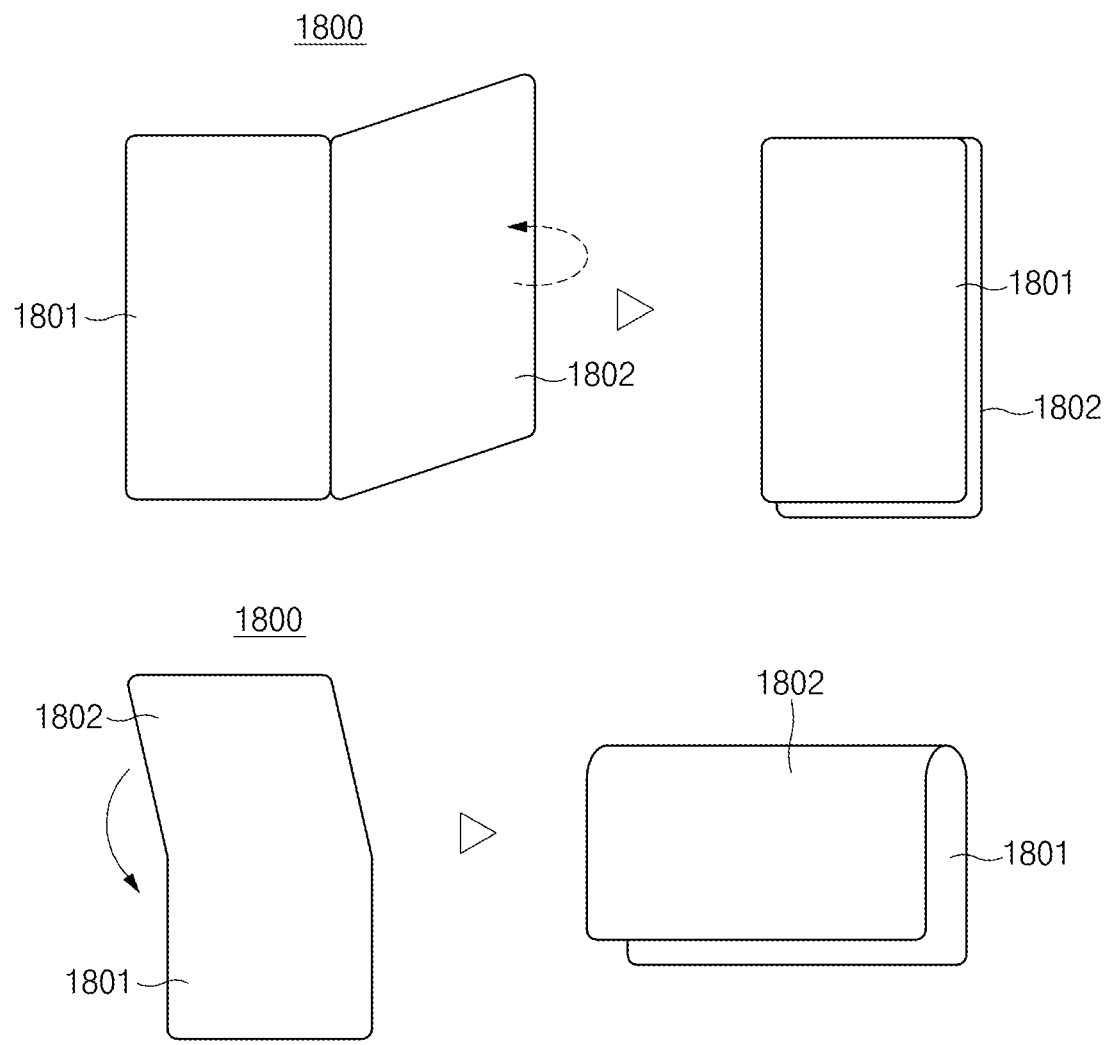
FIG. 18 briefly illustrates an example of an electronic apparatus, according to an embodiment of the disclosure.

FIG. 18 briefly illustrates an example of an electronic apparatus, according to an embodiment of the disclosure.

According to an embodiment, an electronic apparatus 1800 (e.g., the electronic apparatus 100 of FIG. 1) may be a flexible or foldable electronic apparatus. The display (e.g., the display 102 of FIG. 1) of the electronic apparatus 1800 may be a flexible or foldable display.

According to an embodiment, the electronic apparatus 1800 may include a force sensor (e.g., the force sensor 240 of FIG. 2) and touch sensor (e.g., the touch sensor 220 of FIG. 2) therein (or inside the housing). According to an embodiment, the force sensor may be the same as or similar to the force sensor illustrated in FIG. 3N.

According to an embodiment, in a first state where the electronic apparatus 1800 is planar, or in a second state where the electronic apparatus 1800 is folded or bent, the electronic apparatus 1800 may perform different operations based on a pressure input for the same location or the same area. For example, in the first state, the electronic apparatus 1800 may perform the defined operation on the front surface input described in FIGS. 7 to 15; in the second state, the electronic apparatus 1800 may perform the defined operation on the front surface input and/or the rear surface input described in FIGS. 7 to 15.

According to an embodiment, in the second state, the electronic apparatus 1800 may obtain the front surface input and the rear surface input with respect to an item displayed in the display.

According to an embodiment, in the second state, the electronic apparatus 1800 may perform an operation different depending on an area in which a pressure input is obtained. For example, when obtaining a front surface input, the electronic apparatus 1800 may reduce an item; when obtaining a rear surface input, the electronic apparatus 1800 may enlarge the item.

According to an embodiment, the electronic apparatus 1800 may include a display (e.g., the touch screen display 110 of FIG. 1) including the first area 1801 and the second area 1802, which face the same direction in the first state and which face different directions from each other in the second state.

According to an embodiment, the first area 1801 and second area 1802 of the electronic apparatus 1800 in the first state may operate as the front surface (e.g., a first plate).

According to an embodiment, in the electronic apparatus 1800, the first area 1801 in the second state may operate as a front surface (e.g., a first plate), or the second area 1802 may operate as a rear surface (e.g., a second plate). For example, as one display is folded or bent, the first area 1801 and second area 1802 may be divided as the first area and the second area, respectively. For another example, the first area 1801 may be implemented by a first display, and the second area 1802 may be implemented by a second display. The first area 1801 and the second area 1802 may face directions opposite to each other. However, embodiments may not be limited thereto. For example, the first area 1801 and the second area 1802 may face various directions.

According to an embodiment, the electronic apparatus 1800 may include a force sensor structure. For example, a configuration corresponding to the first area 4101 of FIG. 3N may be disposed under the first area 1801; a configuration corresponding to the second area 4102 of FIG. 3N may be disposed under the second area 1802.

According to an embodiment, in the case where the electronic apparatus 1800 is in the second state, the operation of the electronic apparatus 1800 for a pressure input in the first area may be the same as or similar to the operation of the electronic apparatus 1800 for a pressure input in the front surface of FIGS. 7 to 17. The operation of the electronic apparatus 1800 for a pressure input in the second area may be the same as or similar to the operation of the electronic apparatus 1800 for a pressure input in the rear surface of FIGS. 7 to 17.

Figure 19A:
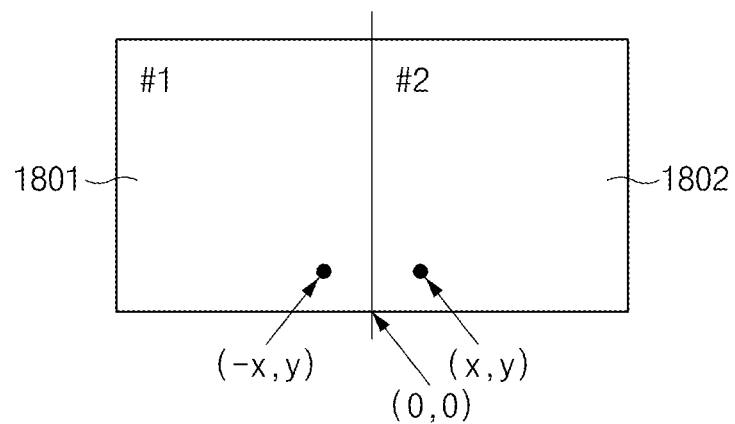
FIGS. 19A and 19B are views for describing an operation in which an electronic apparatus recognizes a rear surface pressure, according to various embodiment of the disclosure.
Figure 19B:
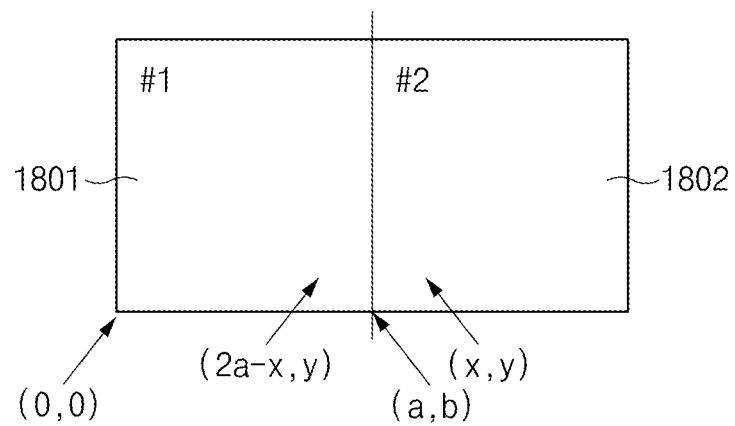

FIGS. 19A and 19B are views for describing an operation in which an electronic apparatus recognizes a rear surface pressure, according to various embodiments of the disclosure.

Referring to FIGS. 19A and 19B, the electronic apparatus 1800 may recognize a pressure input and may correct a pressure input value depending on the state of the electronic apparatus 1800.

Referring to FIGS. 19A and 19B, in the second state of FIG. 18, the electronic apparatus 1800 may recognize that a user's pressure input for the first area 1801 or the second area 1802 is a rear surface pressure. For example, when it is recognized, in the second state of the electronic apparatus 1800, that the pressure of the first area is a front surface pressure, the electronic apparatus 1800 may recognize that the pressure of the second area is a rear surface pressure. In the case where a screen including the specific item is displayed in the first area, the electronic apparatus 1800 may perform an operation on the specific item based on the pressure input obtained through the first area and the second area.

According to an embodiment, when the display disposed in the first area 1801 is activated in the electronic apparatus 1800 of the second state, the electronic apparatus 1800 may recognize that the pressure for the second area 1802 is the rear surface pressure. At this time, it may be recognized that the pressure for the first area 1801 is the front surface pressure. The display may be activated by a user input (e.g., a touch, a pen, or the like).

According to an embodiment, when the display disposed in the second area 1802 is activated in the electronic apparatus 1800 of the second state, the electronic apparatus 1800 may recognize that the pressure for the first area 1801 is the rear surface pressure. At this time, it may be recognized that the pressure for the second area 1802 is the front surface pressure.

According to an embodiment, the electronic apparatus 1800 may be a foldable electronic apparatus. In the foldable electronic apparatus, the whole display may be activated in the first state, and a part of the display may be deactivated in the second state. For example, the display of the first area 1801 and the second area 1802 of an electronic apparatus may be activated in the first state; the display corresponding to one of the first area 1801 or the second area 1802 of the electronic apparatus may be activated in the second state.

According to an embodiment, in the second state, the foldable electronic apparatus may recognize that a pressure for the activated area among the first area and the second area is a front surface pressure of FIGS. 7 to 15, and may recognize that a pressure for the deactivated area is a rear surface pressure of FIGS. 7 to 15.

According to an embodiment, the electronic apparatus 1800 may be a flexible electronic apparatus. The flexible electronic apparatus may include an upper area and a lower area, which face the same direction in the first state. When the upper area is activated in the second state, the flexible electronic apparatus may recognize that a pressure for the upper area is a front surface pressure and may recognize that a pressure for the lower area is a rear surface pressure. For another example, when the lower area is activated in the second state, the flexible electronic apparatus may recognize that the pressure for the lower area is the front surface pressure, in the second state and may recognize that the pressure for the upper area is the rear surface pressure.

Referring to FIGS. 19A and 19B, the electronic apparatus 1800 may correct the coordinates of the rear surface pressure to coordinates corresponding to a front surface.

Referring to FIG. 19A, when sensing a pressure in a force sensor, the electronic apparatus 1800 may display the pressure of each of the first area 1801 and the second area 1802 as x coordinate or y coordinate with respect to a middle area (0, 0). For example, the middle area (0, 0) may be a hinge (e.g., the hinge 4170 of FIG. 3N).

According to an embodiment, in the case where the electronic apparatus 1800 is in a first state, the electronic apparatus 1800 may display pressure locations in the first area 1801 and the second area 1802 as (−x, y) and (x, y), respectively. In the case where the electronic apparatus 1800 is in the second state (e.g., in the case where only the first area 1801 is activated), when the pressure location in the second area 1802 is (x, y), the electronic apparatus 1800 may determine that an input occurs at the location of (−x, y) in the first area 1801 and may display the input.

Referring to FIG. 19B, when sensing a pressure in a force sensor, the electronic apparatus 1800 may display the pressure of each of the first area 1801 and the second area 1802 as x coordinate or y coordinate with respect to a corner area (0, 0). For example, the corner may be the lower left corner of a display (e.g., the touch screen display 110 of FIG. 1).

According to an embodiment, in the case where the electronic apparatus 1800 is in the first state, the electronic apparatus 1800 may display a pressure location in the second area 1802 as (x, y). In the case where the electronic apparatus 1800 is in the second state (e.g., in the case where only the first area 1801 is activated), when the pressure location in the second area 1802 is (x, y), the electronic apparatus 1800 may determine that an input occurs at a location of the first area 1801 corresponding to the location of (x, y) in the second area 1802. The location of the first area 1801 corresponding to (x, y) may be a location symmetrical to (x, y) with respect to an area (a, b) in which the electronic apparatus 1800 is folded in the second state. For example, the location of the first area 1801 corresponding to (x, y) may be (2a-x, y).

According to an embodiment, (a, b) may be variable. For example, the electronic apparatus 1800 may be folded at various locations; in this case, (a, b) may have a variable value. For another example, the size of the first area or the second area may be variable.

Figure 20:
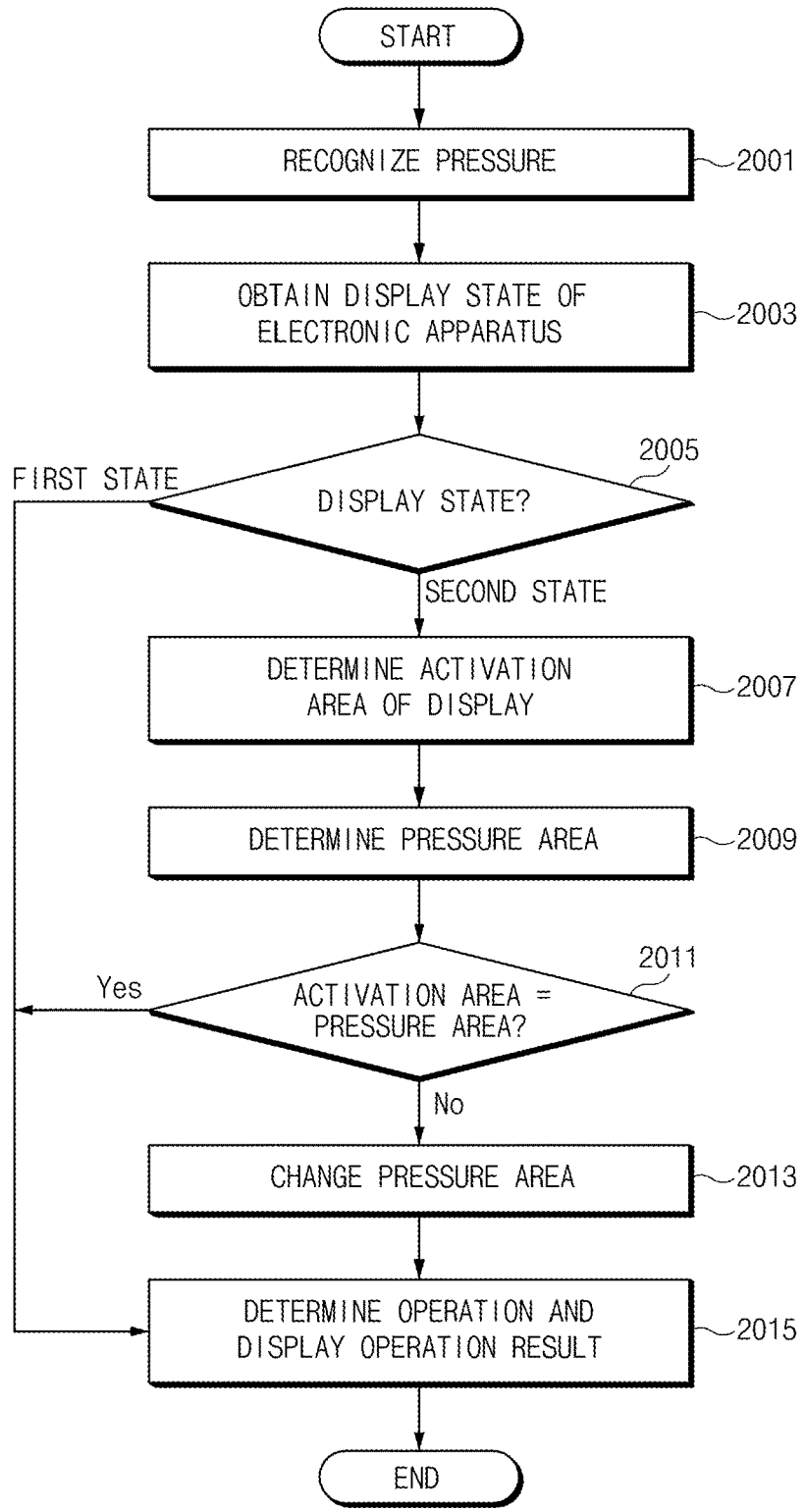
FIG. 20 is a pressure recognizing operation flowchart of an electronic apparatus, according to an embodiment of the disclosure.

FIG. 20 is a pressure recognizing operation flowchart of an electronic apparatus, according to an embodiment of the disclosure.

Referring to FIG. 20, an electronic apparatus (e.g., the electronic apparatus 1800) or a processor (e.g., the processor 660 of FIG. 18) may perform at least part of operation 2001 to operation 2015 described below. For example, each of operation 2001 to operation 2015 may be implemented with instructions capable of being performed (or executed) by the processor of the electronic apparatus. The instructions may be stored in, for example, a computer-readable recording medium or the memory (e.g., the memory 650 of FIG. 6) of the electronic apparatus illustrated in FIG. 6.

In operation 2001, the electronic apparatus may recognize a user's pressure. The electronic apparatus may obtain a pressure input through a force sensor and may recognize the pressure input.

In operation 2003, the electronic apparatus may obtain a display state. For example, the display state may be a first state in which a display is a flat, or a second state in which the display is a flexible or folded.

In operation 2005, the electronic apparatus may determine the state of the display. For example, the electronic apparatus may determine whether the display state is the first state or the second state. Depending on the determination result, the electronic apparatus may perform operation 2007 and the following operations or may perform operation 2015. For example, when the display state is the first state, the electronic apparatus may perform operation 2015 without any further processing of the pressure input obtained in operation 2001.

When the electronic apparatus is in the second state, in operation 2007, the electronic apparatus may determine the activation area of the display. The electronic apparatus may determine whether the activation area in which the display is activated is the first area or the second area of the display or the electronic apparatus.

In operation 2009, the electronic apparatus may determine a pressure area. For example, the electronic apparatus may determine whether a pressure area in which a user's pressure is sensed is the first area or the second area.

In operation 2011, the electronic apparatus may determine whether the activation area is the same as the pressure area. For example, the electronic apparatus may determine whether the pressure input is entered into the activation area. Depending on the determination result, the electronic apparatus may perform operation 2013 and the following operations or may perform operation 2015. For example, when the activation area is the same as the pressure area, the electronic apparatus may perform operation 2015 without any further processing of the pressure input obtained in operation 2001.

When the activation area is different from the pressure area, in operation 2013, the electronic apparatus may change the pressure area. For example, the electronic apparatus may determine the pressure of the pressure area as a rear surface pressure of the activation area. According to an embodiment, the electronic apparatus may change a pressure input value. For example, in the case where a pressure is generated at the pressure location (x, y) of the second area and the second area is not the activation area, the electronic apparatus may change (x, y) to (−x, y).

In operation 2015, the electronic apparatus may determine an operation to be performed based on the pressure input and may display the result obtained by performing the operation, on a display. For example, when obtaining a rear surface input depending on operation 2013, as illustrated in FIG. 9, the electronic apparatus may perform a magnification operation.

According to various embodiments described in the disclosure, the electronic apparatus in which a force sensor is mounted on a front surface and a rear surface may provide various visual effects for 2D and 3D items, through the display. As such, it is possible to provide the user with various experiences for the pressure input. For another example, the electronic apparatus may provide the analog usability of the pressure input as a visual feedback.

According to various embodiments of the disclosure, the electronic apparatus may provide various game experiences using a pressure input, may provide visual function content, and may provide a rear surface pressure and pressure location trace through interaction of the display.

Figure 21:
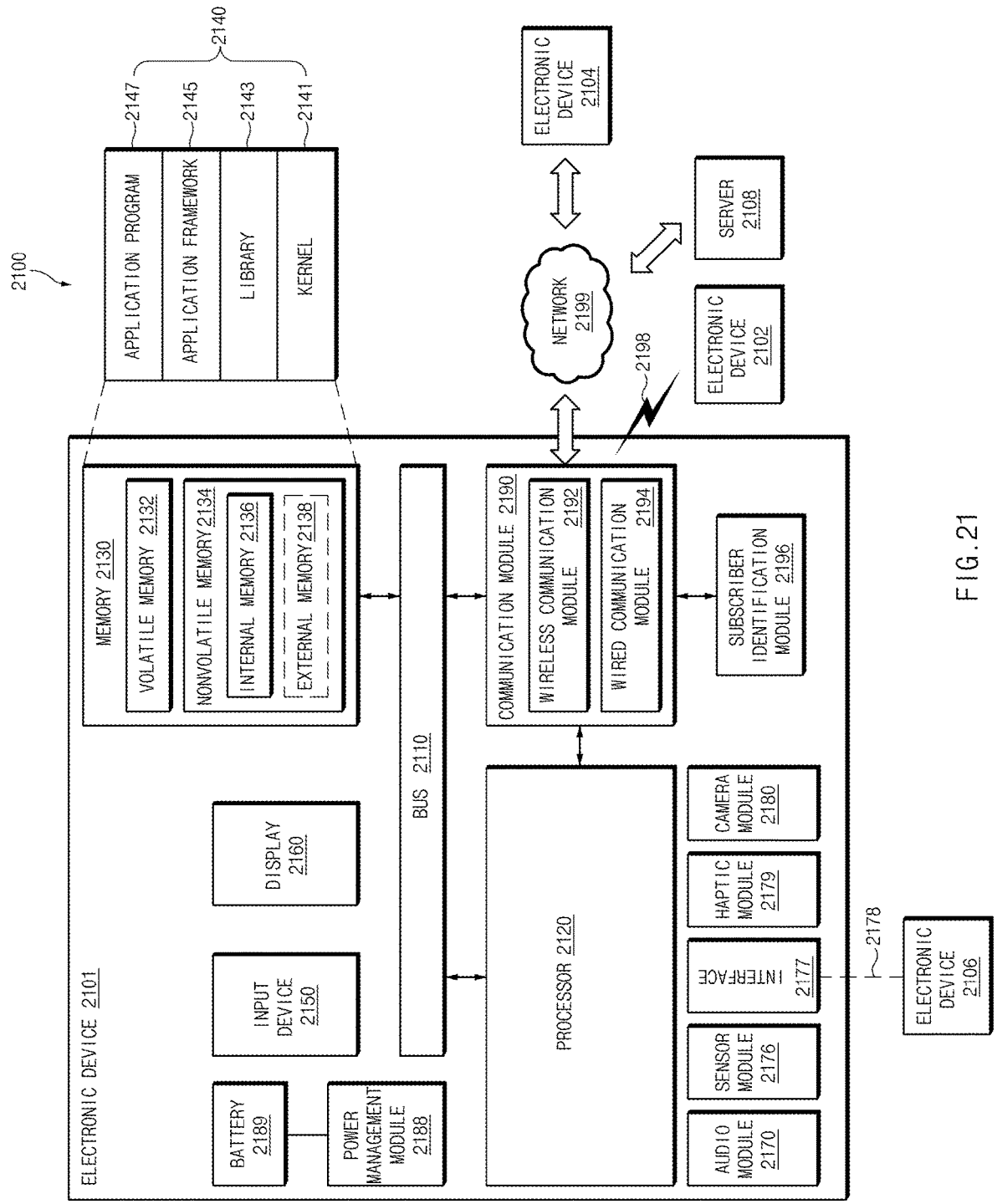
FIG. 21 illustrates a block diagram of an electronic apparatus in a network environment, according to various embodiments of the disclosure.

FIG. 21 illustrates a block diagram of an electronic apparatus 2101 in a network environment 2100, according to various embodiments of the disclosure.

An electronic apparatus according to various embodiments of the disclosure may include various forms of devices. For example, the electronic apparatus may include at least one of, for example, portable communication devices (e.g., smartphones), computer devices (e.g., personal digital assistants (PDAs), tablet personal computers (PCs), laptop PCs, desktop PCs, workstations, or servers), portable multimedia devices (e.g., electronic book readers or Motion Picture Experts Group (MPEG-1 or MPEG-2) audio layer 3 (MP3) players), portable medical devices (e.g., heartbeat measuring devices, blood glucose monitoring devices, blood pressure measuring devices, and body temperature measuring devices), cameras, or wearable devices. The wearable device may include at least one of an accessory type (e.g., watches, rings, bracelets, anklets, necklaces, glasses, contact lens, or head-mounted-devices (HMDs)), a fabric or garment-integrated type (e.g., an electronic apparel), a body-attached type (e.g., a skin pad or tattoos), or a bio-implantable type (e.g., an implantable circuit). According to various embodiments, the electronic apparatus may include at least one of, for example, televisions (TVs), digital versatile disc (DVD) players, audios, audio accessory devices (e.g., speakers, headphones, or headsets), refrigerators, air conditioners, cleaners, ovens, microwave ovens, washing machines, air cleaners, set-top boxes, home automation control panels, security control panels, game consoles, electronic dictionaries, electronic keys, camcorders, or electronic picture frames.

In another embodiment, the electronic apparatus may include at least one of navigation devices, satellite navigation system (e.g., global navigation satellite system (GNSS)), event data recorders (EDRs) (e.g., black box for a car, a ship, or a plane), vehicle infotainment devices (e.g., head-up display for vehicle), industrial or home robots, drones, automated teller machines (ATMs), points of sales (POSs), measuring instruments (e.g., water meters, electricity meters, or gas meters), or internet of things (e.g., light bulbs, sprinkler devices, fire alarms, thermostats, or street lamps). The electronic apparatus according to an embodiment of the disclosure may not be limited to the above-described devices, and may provide functions of a plurality of devices like smartphones which have measurement function of personal biometric information (e.g., heart rate or blood glucose). In the disclosure, the term "user" may refer to a person who uses an electronic apparatus or may refer to a device (e.g., an artificial intelligence electronic apparatus) that uses the electronic apparatus.

Referring to FIG. 21, under the network environment 2100, the electronic apparatus 2101 (e.g., the electronic apparatus of FIG. 1) may communicate with an electronic apparatus 2102 through local wireless communication 2198 or may communication with an electronic apparatus 2104 or a server 2108 through a network 2199. According to an embodiment, the electronic apparatus 2101 may communicate with the electronic apparatus 2104 through the server 2108.

According to an embodiment, the electronic apparatus 2101 may include a bus 2110, a processor 2120 (e.g., the processor of FIG. 1), a memory 2130, an input device 2150 (e.g., a micro-phone or a mouse), a display device 2160, an audio module 2170, a sensor module 2176, an interface 2177, a haptic module 2179, a camera module 2180, a power management module 2188, a battery 2189, a communication module 2190, and a subscriber identification module 2196. According to an embodiment, the electronic apparatus 2101 may not include at least one (e.g., the display device 2160 or the camera module 2180) of the above-described components or may further include other component(s).

The bus 2110 may interconnect the above-described components 2120 to 2190 and may include a circuit for conveying signals (e.g., a control message or data) between the above-described components.

The processor 2120 may include one or more of a central processing unit (CPU), an application processor (AP), a graphic processing unit (GPU), an image signal processor (ISP) of a camera or a communication processor (CP). According to an embodiment, the processor 2120 may be implemented with a system on chip (SoC) or a system in package (SiP). For example, the processor 2120 may drive an operating system (OS) or an application program to control at least one of another component (e.g., hardware or software component) of the electronic apparatus 2101 connected to the processor 2120 and may process and compute various data. The processor 2120 may load a command or data, which is received from at least one of other components (e.g., the communication module 2190), into a volatile memory 2132 to process the command or data and may store the result data into a nonvolatile memory 2134.

The memory 2130 may include, for example, the volatile memory 2132 or the nonvolatile memory 2134. The volatile memory 2132 may include, for example, a random access memory (RAM) (e.g., a dynamic RAM (DRAM), a static RAM (SRAM), or a synchronous DRAM (SDRAM)). The nonvolatile memory 2134 may include, for example, a programmable read-only memory (PROM), a one time PROM (OTPROM), an erasable PROM (EPROM), an electrically EPROM (EEPROM), a mask ROM, a flash ROM, a flash memory, a hard disk drive (HDD), or a solid-state drive (SSD). In addition, the nonvolatile memory 2134 may be configured in the form of an internal memory 2136 or the form of an external memory 2138 which is available through connection only if necessary, according to the connection with the electronic apparatus 2101. The external memory 2138 may further include a flash drive such as compact flash (CF), secure digital (SD), micro-SD (Micro-SD), mini-SD (Mini-SD), extreme digital (xD), a multimedia card (MMC), or a memory stick. The external memory 2138 may be operatively or physically connected with the electronic apparatus 2101 in a wired manner (e.g., a cable or a universal serial bus (USB)) or a wireless (e.g., Bluetooth) manner.

For example, the memory 2130 may store, for example, at least one different software component, such as a command or data associated with the program 2140, of the electronic apparatus 2101. The program 2140 may include, for example, a kernel 2141, a library 2143, an application framework 2145 or an application program (interchangeably, "application") 2147.

The input device 2150 may include a microphone, a mouse, or a keyboard. According to an embodiment, the keyboard may include a keyboard physically connected or a virtual keyboard displayed through the display device 2160.

The display device 2160 may include a display, a hologram device or a projector, and a control circuit to control a relevant device. The display may include, for example, a LCD, a LED display, an OLED display, a MEMS display, or an electronic paper display. According to an embodiment, the display may be flexibly, transparently, or wearably implemented. The display may include a touch circuitry, which is able to detect a user's input such as a gesture input, a proximity input, or a hovering input or a pressure sensor (interchangeably, a "force sensor") which is able to measure the intensity of the pressure by the touch. The touch circuit or the pressure sensor may be implemented integrally with the display or may be implemented with at least one sensor separately from the display. The hologram device may show a stereoscopic image in a space using interference of light. The projector may project light onto a screen to display an image. The screen may be located inside or outside the electronic apparatus 2101.

The audio module 2170 may convert, for example, from a sound into an electrical signal or from an electrical signal into the sound. According to an embodiment, the audio module 2170 may acquire sound through the input device 2150 (e.g., a microphone) or may output sound through an output device (not illustrated) (e.g., a speaker or a receiver) included in the electronic apparatus 2101, an external electronic apparatus (e.g., the electronic apparatus 2102 (e.g., a wireless speaker or a wireless headphone)) or an electronic apparatus 2106 (e.g., a wired speaker or a wired headphone) connected with the electronic apparatus 2101.

The sensor module 2176 may measure or detect, for example, an internal operating state (e.g., power or temperature) of the electronic apparatus 2101 or an external environment state (e.g., an altitude, a humidity, or brightness) to generate an electrical signal or a data value corresponding to the information of the measured state or the detected state. The sensor module 2176 may include, for example, at least one of a gesture sensor, a gyro sensor, a barometric pressure sensor, a magnetic sensor, an acceleration sensor, a grip sensor, a proximity sensor, a color sensor (e.g., a red, green, and blue (RGB) sensor), an infrared sensor, a biometric sensor (e.g., an iris sensor, a fingerprint senor, a heartbeat rate monitoring (HRM) sensor, an e-nose sensor, an electromyography (EMG) sensor, an electroencephalogram (EEG) sensor, an electrocardiogram (ECG) sensor), a temperature sensor, a humidity sensor, an illuminance sensor, or an UV sensor. The sensor module 2176 may further include a control circuit for controlling at least one or more sensors included therein. According to an embodiment, the electronic apparatus 2101 may control the sensor module 2176 by using the processor 2120 or a processor (e.g., a sensor hub) separate from the processor 2120. In the case that the separate processor (e.g., a sensor hub) is used, while the processor 2120 is in a sleep state, the separate processor may operate without awakening the processor 2120 to control at least a portion of the operation or the state of the sensor module 2176.

According to an embodiment, the interface 2177 may include a high definition multimedia interface (HDMI), a USB, an optical interface, a recommended standard 232 (RS-232), a D-subminiature (D-sub), a mobile high-definition link (MHL) interface, a SD card/MMC interface, or an audio interface. A connector 2178 may physically connect the electronic apparatus 2101 and the electronic apparatus 2106. According to an embodiment, the connector 2178 may include, for example, an USB connector, an SD card/MMC connector, or an audio connector (e.g., a headphone connector).

The haptic module 2179 may convert an electrical signal into mechanical stimulation (e.g., vibration or motion) or into electrical stimulation. For example, the haptic module 2179 may apply tactile or kinesthetic stimulation to a user. The haptic module 2179 may include, for example, a motor, a piezoelectric element, or an electric stimulator.

The camera module 2180 may capture, for example, a still image and a moving picture. According to an embodiment, the camera module 2180 may include at least one lens (e.g., a wide-angle lens and a telephoto lens, or a front lens and a rear lens), an image sensor, an ISP, or a flash (e.g., a light emitting diode or a xenon lamp).

The power management module 2188, which is to manage the power of the electronic apparatus 2101, may constitute at least a portion of a power management IC (PMIC).

The battery 2189 may include a primary cell, a secondary cell, or a fuel cell and may be recharged by an external power source to supply power at least one component of the electronic apparatus 2101.

The communication module 2190 may establish a communication channel between the electronic apparatus 2101 and an external device (e.g., the first external electronic apparatus 2102, the second external electronic apparatus 2104, or the server 2108). The communication module 2190 may support wired communication or wireless communication through the established communication channel According to an embodiment, the communication module 2190 may include a wireless communication module 2192 or a wired communication module 2194. The communication module 2190 may communicate with the external device through a first network 2198 (e.g. a wireless local area network (LAN) such as Bluetooth or infrared data association (IrDA)) or a second network 2199 (e.g., a wireless wide area network (WAN) such as a cellular network) through a relevant module among the wireless communication module 2192 or the wired communication module 2194.

The wireless communication module 2192 may support, for example, cellular communication, local wireless communication, GNSS communication. The cellular communication may include, for example, long-term evolution (LTE), LTE-advance (LTE-A), code division multiple access (CDMA), wideband CDMA (WCDMA), universal mobile telecommunications system (UMTS), wireless broadband (WiBro), or global system for mobile communications (GSM). The local wireless communication may include wireless fidelity (Wi-Fi), Wi-Fi direct, light fidelity (Li-Fi), Bluetooth, Bluetooth low energy (BLE), Zigbee, NFC, MST, radio frequency (RF), or a body area network (BAN). The GNSS may include at least one of a global positioning system (GPS), a global navigation satellite system (Glonass), Beidou navigation satellite system (Beidou), the European global satellite-based navigation system (Galileo), or the like. In the disclosure, "GPS" and "GNSS" may be interchangeably used.

According to an embodiment, when the wireless communication module 2192 supports cellar communication, the wireless communication module 2192 may, for example, identify or authenticate the electronic apparatus 2101 within a communication network using the subscriber identification module (e.g., a SIM card) 2196. According to an embodiment, the wireless communication module 2192 may include a CP separate from the processor 2120 (e.g., an AP). In this case, the CP may perform at least a portion of functions associated with at least one of components 2110 to 2196 of the electronic apparatus 2101 in substitute for the processor 2120 when the processor 2120 is in an inactive (sleep) state, and together with the processor 2120 when the processor 2120 is in an active state. According to an embodiment, the wireless communication module 2192 may include a plurality of communication modules, each supporting only a relevant communication scheme among cellular communication, local wireless communication, or a GNSS communication.

The wired communication module 2194 may include, for example, a LAN service, a power line communication, or a plain old telephone service (POTS).

For example, the first network 2198 may employ, for example, Wi-Fi direct or Bluetooth for transmitting or receiving commands or data through wireless direct connection between the electronic apparatus 2101 and the first external electronic apparatus 2102. The second network 2199 may include a telecommunication network (e.g., a computer network such as a LAN or a WAN, the Internet or a telephone network) for transmitting or receiving commands or data between the electronic apparatus 2101 and the second electronic apparatus 2104.

According to various embodiments, the commands or the data may be transmitted or received between the electronic apparatus 2101 and the second external electronic apparatus 2104 through the server 2108 connected with the second network 2199. Each of the first and second external electronic apparatuses 2102 and 2104 may be a device of which the type is different from or the same as that of the electronic apparatus 2101. According to various embodiments, all or a part of operations that the electronic apparatus 2101 will perform may be executed by another or a plurality of electronic apparatuses (e.g., the electronic apparatuses 2102 and 2104 or the server 2108). According to an embodiment, in the case that the electronic apparatus 2101 executes any function or service automatically or in response to a request, the electronic apparatus 2101 may not perform the function or the service internally, but may alternatively or additionally transmit requests for at least a part of a function associated with the electronic apparatus 2101 to any other device (e.g., the electronic apparatus 2102 or 2104 or the server 2108). The other electronic apparatus (e.g., the electronic apparatus 2102 or 2104 or the server 2108) may execute the requested function or additional function and may transmit the execution result to the electronic apparatus 2101. The electronic apparatus 2101 may provide the requested function or service using the received result or may additionally process the received result to provide the requested function or service. To this end, for example, cloud computing, distributed computing, or client-server computing may be used.

Various embodiments of the disclosure and terms used herein are not intended to limit the technologies described in the disclosure to specific embodiments, and it should be understood that the embodiments and the terms include modification, equivalent, and/or alternative on the corresponding embodiments described herein. With regard to description of drawings, similar components may be marked by similar reference numerals. The terms of a singular form may include plural forms unless otherwise specified. In the disclosure disclosed herein, the expressions "A or B", "at least one of A and/or B", "A, B, or C", or "at least one of A, B, and/or C", and the like used herein may include any and all combinations of one or more of the associated listed items. Expressions such as "first," or "second," and the like, may express their components regardless of their priority or importance and may be used to distinguish one component from another component but is not limited to these components. When an (e.g., first) component is referred to as being "(operatively or communicatively) coupled with/to" or "connected to" another (e.g., second) component, it may be directly coupled with/to or connected to the other component or an intervening component (e.g., a third component) may be present.

According to the situation, the expression "adapted to or configured to" used herein may be interchangeably used as, for example, the expression "suitable for", "having the capacity to", "changed to", "made to", "capable of" or "designed to" in hardware or software. The expression "a device configured to" may mean that the device is "capable of" operating together with another device or other parts. For example, a "processor configured to (or set to) perform A, B, and C" may mean a dedicated processor (e.g., an embedded processor) for performing corresponding operations or a generic-purpose processor (e.g., a CPU or an AP) which performs corresponding operations by executing one or more software programs which are stored in a memory device (e.g., the memory 2130).

The term "module" used herein may include a unit, which is implemented with hardware, software, or firmware, and may be interchangeably used with the terms "logic", "logical block", "part", "circuit", or the like. The "module" may be a minimum unit of an integrated part or a part thereof or may be a minimum unit for performing one or more functions or a part thereof. The "module" may be implemented mechanically or electronically and may include, for example, an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media (e.g., the memory 2130) in the form of a program module. The instruction, when executed by a processor (e.g., the processor 2120), may cause the processor to perform a function corresponding to the instruction. The computer-readable recording medium may include a hard disk, a floppy disk, a magnetic media (e.g., a magnetic tape), an optical media (e.g., a compact disc-ROM (CD-ROM) and a DVD, a magneto-optical media (e.g., a floptical disk)), an embedded memory, and the like. The one or more instructions may contain a code made by a compiler or a code executable by an interpreter.

Each component (e.g., a module or a program module) according to various embodiments may be composed of single entity or a plurality of entities, a part of the above-described sub-components may be omitted, or other sub-components may be further included. Alternatively or additionally, after being integrated in one entity, some components (e.g., a module or a program module) may identically or similarly perform the function executed by each corresponding component before integration. According to various embodiments, operations executed by modules, program modules, or other components may be executed by a successive method, a parallel method, a repeated method, or a heuristic method, or at least one part of operations may be executed in different sequences or omitted. Alternatively, other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic apparatus comprising:
   a housing including a first plate facing a first direction and a second plate facing a second direction opposite to the first direction;
   a display exposed through the first plate;
   a first force sensor disposed inside the housing and disposed under the display;
   a second force sensor physically spaced apart from the first force sensor and adjacent to the second plate;
   a processor positioned inside the housing and electrically connected to the display, the first force sensor, and the second force sensor; and
   a memory electrically connected to the processor and positioned inside the housing,
   wherein the memory stores instructions that, when executed, cause the processor to:
      display a screen including an item on the display;
      obtain a first pressure input for the item using the second force sensor;
      determine a range to apply an operation associated with the second force sensor, based on a level of pressure of the first pressure input, the range being a radius from a location of the first pressure input; and
      display a screen including a result of applying the operation associated with the second force sensor to the range on the display in response to the first pressure input, and
   wherein a size of the radius varies depending on the level of pressure of the first pressure input.

2. The electronic apparatus of claim 1, wherein the instructions, when executed, further cause the processor to:
   obtain the level of pressure of the first pressure input; and
   determine a variation in the item based on the pressure level.

3. The electronic apparatus of claim 1, wherein the instructions, when executed, further cause the processor to:
   obtain a second pressure input from the first force sensor; and
   display an operation associated with the first force sensor on the display in response to the second pressure input.

4. The electronic apparatus of claim 1, wherein the instructions, when executed, further cause the processor to:
   obtain a third pressure input from the first force sensor and a fourth pressure input from the second force sensor; and
   display an operation associated with the third pressure input and the fourth pressure input on the display.

5. The electronic apparatus of claim 1, wherein the operation associated with the first force sensor is a magnification operation.

6. The electronic apparatus of claim 3, wherein the operation associated with the second force sensor is a reduction operation.

7. The electronic apparatus of claim 4, wherein the operation associated with the third pressure input and the fourth pressure input is a selection operation.

8. The electronic apparatus of claim 1, wherein the instructions, when executed, further cause the processor to:
   determine an operation associated with an item type based on the type of the item.

9. The electronic apparatus of claim 1, wherein the range includes a first range including the item and a second range not including the item.

10. The electronic apparatus of claim 9, wherein the instructions, when executed, further cause the processor to:
    determine a variation of the item for a respective range.

11. The electronic apparatus of claim 1,
    wherein the first pressure input includes the location at which a pressure is generated, and
    wherein the instructions, when executed, further cause the processor to:
       determine the range of the operation associated with the first force sensor, based on the location.

12. The electronic apparatus of claim 1, wherein the instructions, when executed, further cause the processor to:
    determine the operation associated with the first force sensor to be applied based on the location in which the first pressure input is generated.

13. The electronic apparatus of claim 1, wherein the instructions, when executed, further cause the processor to:
    determine the operation associated with the first force sensor depending on a combination of the first pressure input from the second force sensor and a second pressure input from the first force sensor.

14. The electronic apparatus of claim 1, wherein the item includes at least one of an image, a text, an icon, or a folder.

15. An electronic apparatus comprising:
    a housing including a first plate, a second plate, and a side member surrounding a space between the first plate and the second plate and including a side surface member attached on or formed integrally with the second plate;
    a touch screen display exposed through the first plate;
    a force sensor configured to detect a pressure applied to the second plate by a user;
    a processor, operatively connected to the touch screen display and the force sensor, and disposed inside the housing; and
    a memory disposed inside the housing, operatively connected to the processor, and configured to store instructions, wherein the instructions, when executed, cause the processor to:
       display a user interface on the touch screen display,
       detect a location and a pressure of a user input on the second plate by using at least the force sensor,
       determine a range to apply an operation associated with the force sensor, based on a level of pressure of the user input, the range being a radius from the location, and
       enlarge a part of the user interface by applying the operation to the range based on the detected location and the detected pressure,
    wherein a size of the radius varies depending on the level of pressure of the user input.

16. The electronic apparatus of claim 15,
    wherein the user interface includes a text, and
    wherein the part of the user interface includes a part of the text.

17. The electronic apparatus of claim 15,
    wherein the user interface includes at least one icon and a text associated with the icon, and
    wherein the part of the user interface includes the at least one icon and the text.

18. The electronic apparatus of claim 16, wherein the instructions further cause the processor to:
    after enlarging the part, reduce the enlarged part to a normal size, based on a change in the detected pressure.

19. An electronic apparatus comprising:
    a housing including a first plate facing one direction and a second plate opposite to the first plate, in an unfolded state;
    a flexible display exposed through at least part of the first plate of the housing, the flexible display including a first area and a second area which face different directions from each other as the electronic apparatus is bent;

a force sensor disposed inside the housing and configured to obtain a pressure applied by a user through the flexible display;

a processor positioned inside the housing and electrically connected to the flexible display and the force sensor; and a memory electrically connected to the processor, wherein the memory stores instructions that, when executed, cause the processor to:

obtain a pressure input through at least part of the second area of the flexible display by using at least part of the force sensor in a state where the electronic apparatus is bent, determine a range to apply an operation associated with the force sensor, based on a level of the obtained pressure, the range being a radius from a location of the pressure input, and execute the operation associated with the force sensor to the range in at least part of the first area which is corresponding to the at least part of the second area, in response to the obtained pressure input, wherein a size of the radius varies depending on the level of the obtained pressure input.

20. The electronic apparatus of claim 19, wherein the instructions, when executed, further cause the processor to determine a state of the flexible display.

21. The electronic apparatus of claim 19, wherein an object associated with the location of the obtained pressure input is displayed as transparent.

* * * * *